(12) United States Patent
Dixon

(10) Patent No.: US 9,016,976 B2
(45) Date of Patent: Apr. 28, 2015

(54) MODULAR DUCTING SECTIONS AND NETWORKED UTILITIES DUCTING SYSTEM FORMED THEREFROM

(76) Inventor: Guy Andrew Cotterill Dixon, Woollahra (AU)

( * ) Notice: Subject to any disclaimer, the term of this patent is extended or adjusted under 35 U.S.C. 154(b) by 0 days.

(21) Appl. No.: 13/575,992

(22) PCT Filed: Jul. 29, 2011

(86) PCT No.: PCT/AU2011/000962
§ 371 (c)(1),
(2), (4) Date: Jul. 30, 2012

(87) PCT Pub. No.: WO2012/012845
PCT Pub. Date: Feb. 2, 2012

(65) Prior Publication Data
US 2013/0121761 A1 May 16, 2013

(30) Foreign Application Priority Data
Jul. 30, 2010 (AU) ................................ 2010903400

(51) Int. Cl.
| | |
|---|---|
| *E01C 11/22* | (2006.01) |
| *E01C 15/00* | (2006.01) |
| *E03F 3/00* | (2006.01) |
| *E03F 3/04* | (2006.01) |
| *H02G 9/04* | (2006.01) |
| *H02G 9/06* | (2006.01) |

(52) U.S. Cl.
CPC ............. *E01C 11/227* (2013.01); *E01C 11/222* (2013.01); *E01C 11/223* (2013.01); *E01C 15/00* (2013.01); *E03F 3/00* (2013.01); *E03F 3/04* (2013.01); *H02G 9/04* (2013.01); *H02G 9/06* (2013.01); *E03F 3/043* (2013.01)

(58) Field of Classification Search
USPC ............. 404/2, 3, 4, 5; 405/40; 210/163, 164, 210/170.03
See application file for complete search history.

(56) References Cited

U.S. PATENT DOCUMENTS

| | | | | |
|---|---|---|---|---|
| 314,568 | A * | 3/1885 | Du Bois | .......................... 174/95 |
| 329,343 | A * | 10/1885 | Sutton | .............................. 404/3 |
| 355,330 | A * | 1/1887 | Locke | ................................ 404/3 |
| 533,130 | A * | 1/1895 | Kingsley | .......................... 404/3 |
| 3,272,096 | A * | 9/1966 | Lum | ................................ 404/1 |
| 4,751,945 | A * | 6/1988 | Williams | ...................... 138/117 |
| 7,150,131 | B2 * | 12/2006 | Barker | ........................ 52/220.5 |

\* cited by examiner

*Primary Examiner* — Gary Hartmann
(74) *Attorney, Agent, or Firm* — Benjamin Aaron Adler

(57) ABSTRACT

This invention provides a modular ducting section and a networked utilities ducting system and rain and road water management system formed from two or more modular ducting sections laying end-to-end. Each modular ducting section comprises open-topped utility channels for carrying utility service supply lines such as electricity, gas, water, or communications, an open-topped catchment channel for carrying rain water captured from a building structure or garden, and a supply channel for supplying an end user with utility services via a supply line, while also allowing the end user to feed an end-user generated utility supply back into the corresponding utility service supply line via a return line. Each modular ducting section further comprises a road water runoff flange and a main channel cover, which when combined, form a curb-side structure that functions to keep any contaminated road water from the reusable rain water collected in the catchment channel.

47 Claims, 44 Drawing Sheets

FIG. 2 (ii)

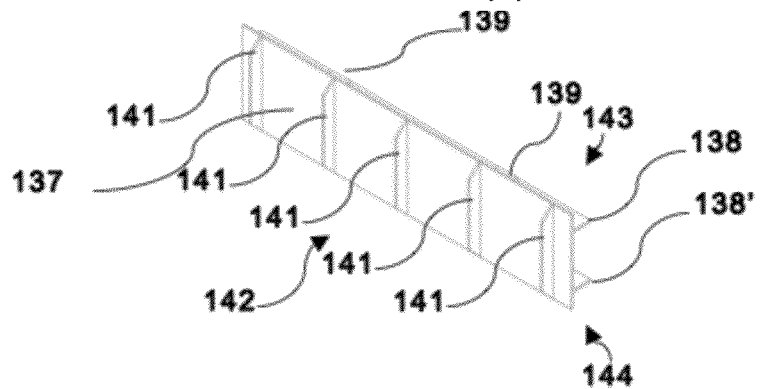
FIG. 3(iii)

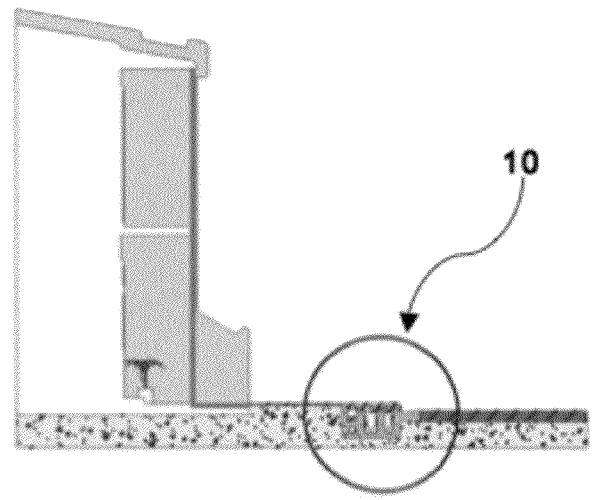
FIG. 4 (i)
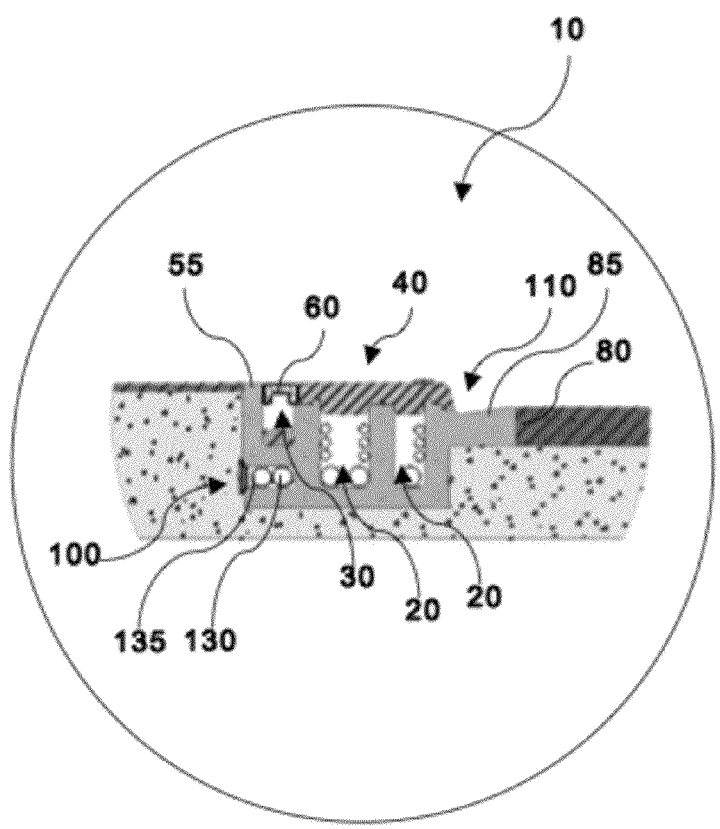
FIG. 4 (ii)

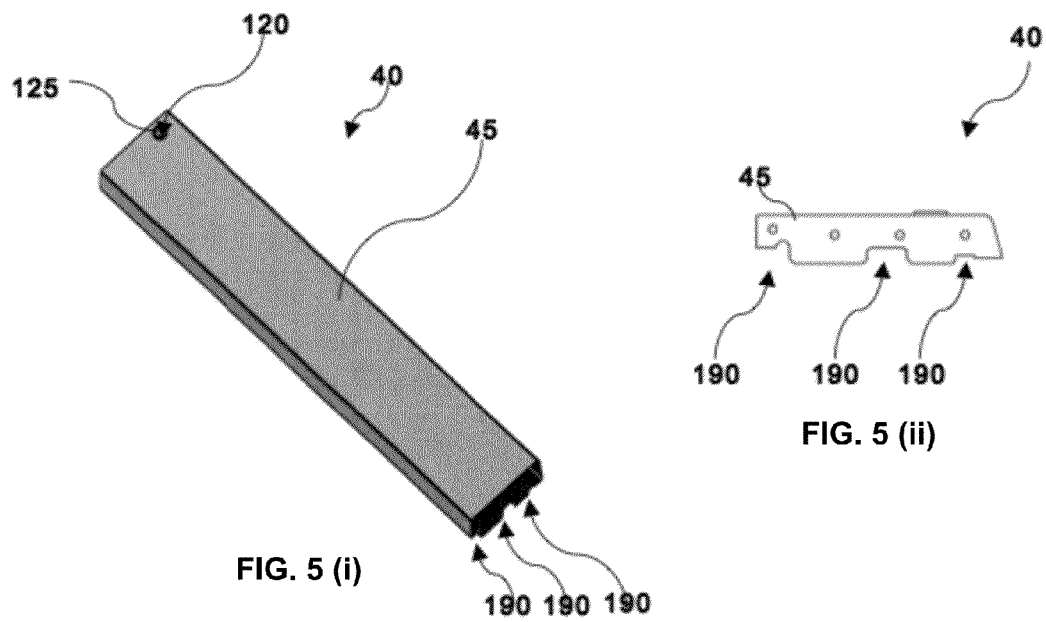
FIG. 5 (i)
FIG. 5 (ii)
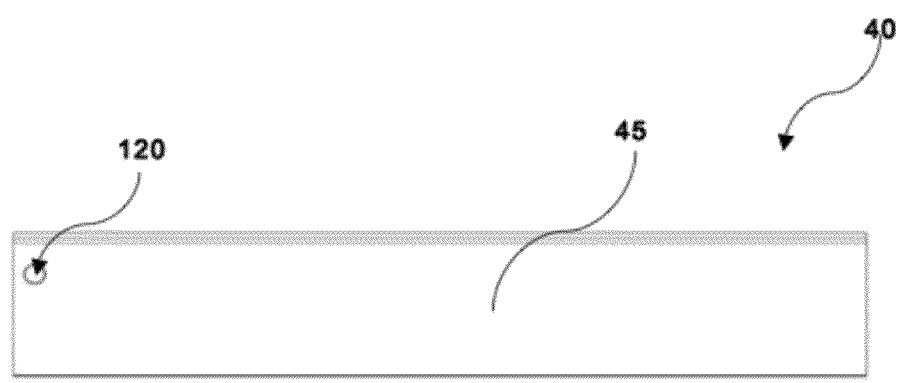
FIG. 5 (iii)

FIG. 6 (ii)

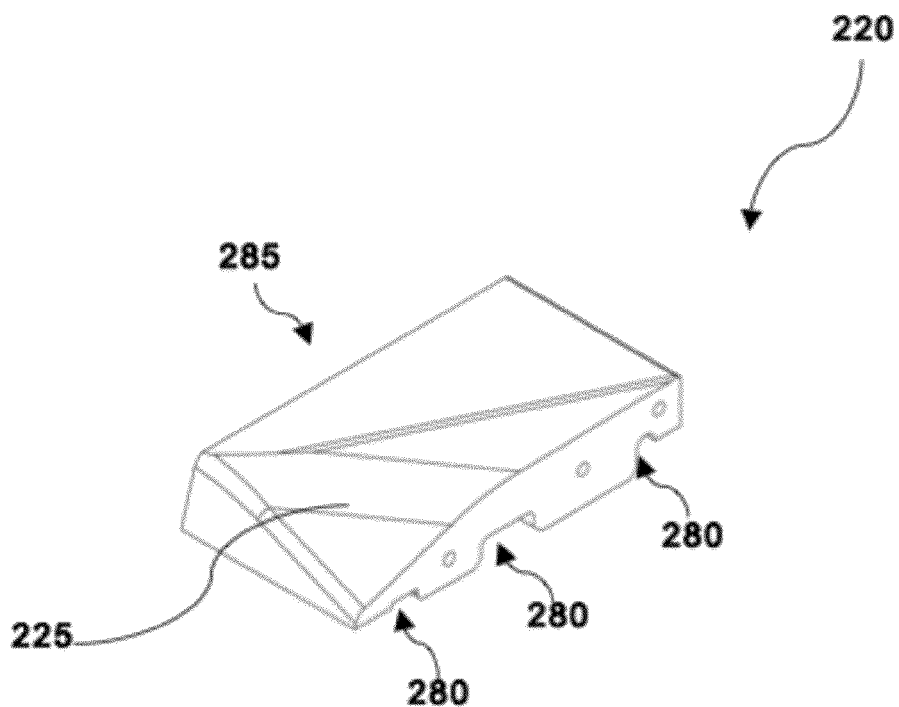
FIG. 8 (i)
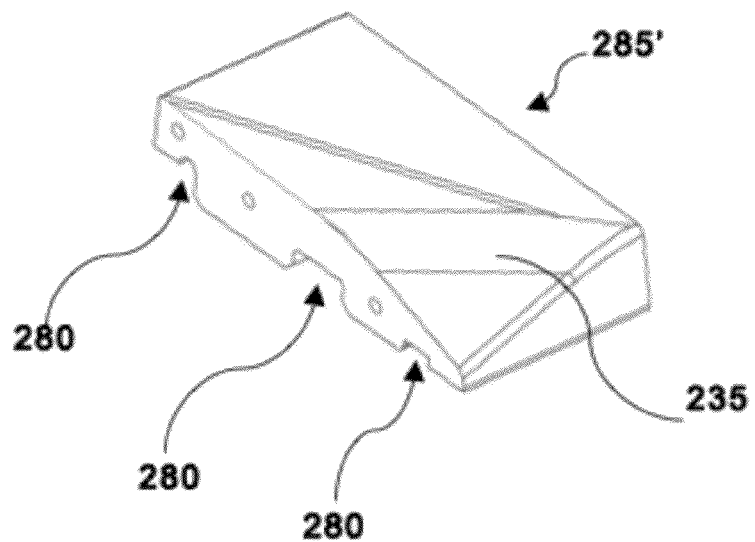
FIG. 8 (ii)

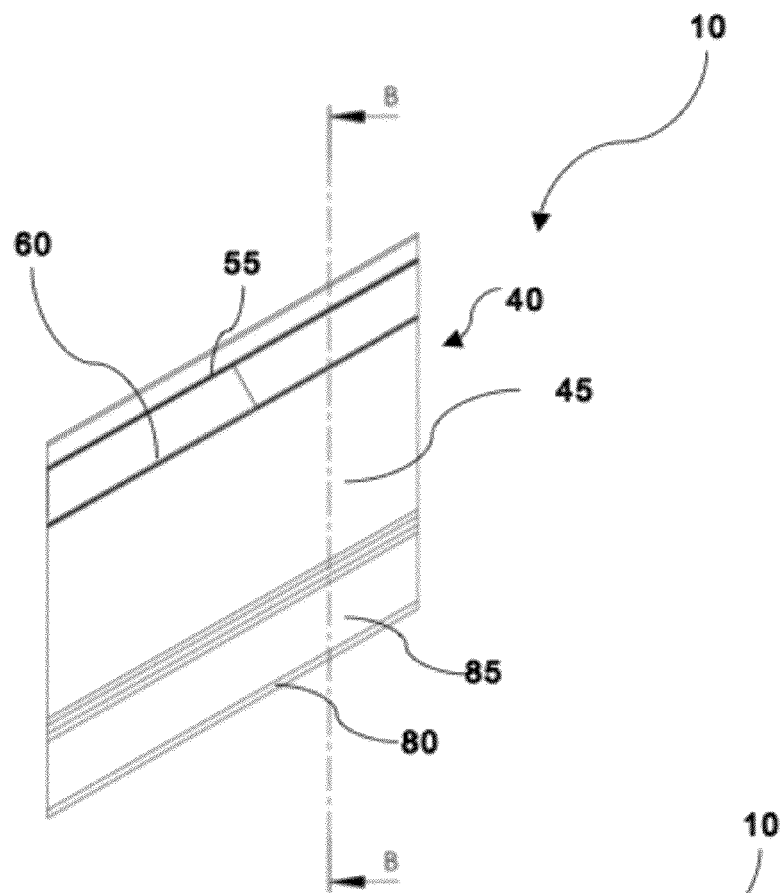
FIG. 10 (i)
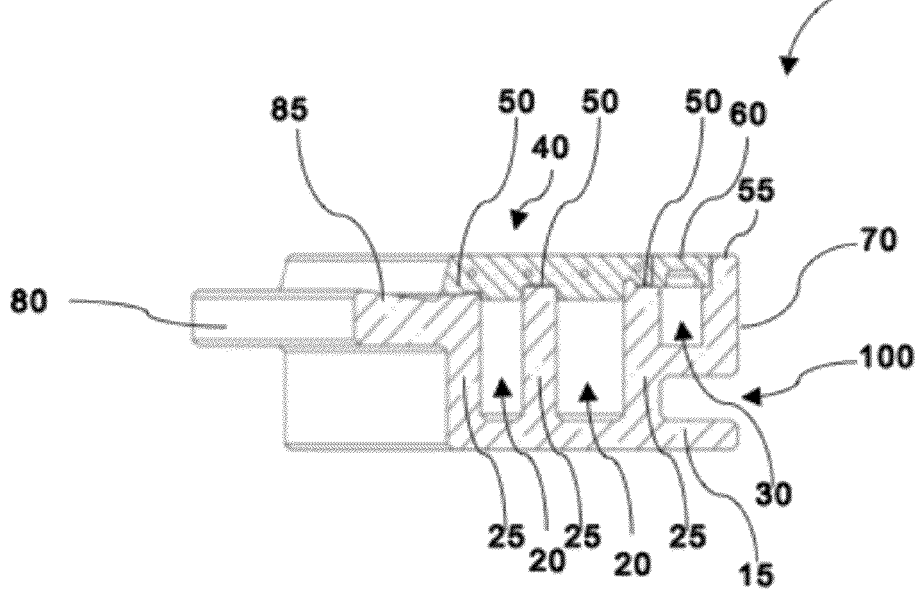
FIG. 10 (ii)

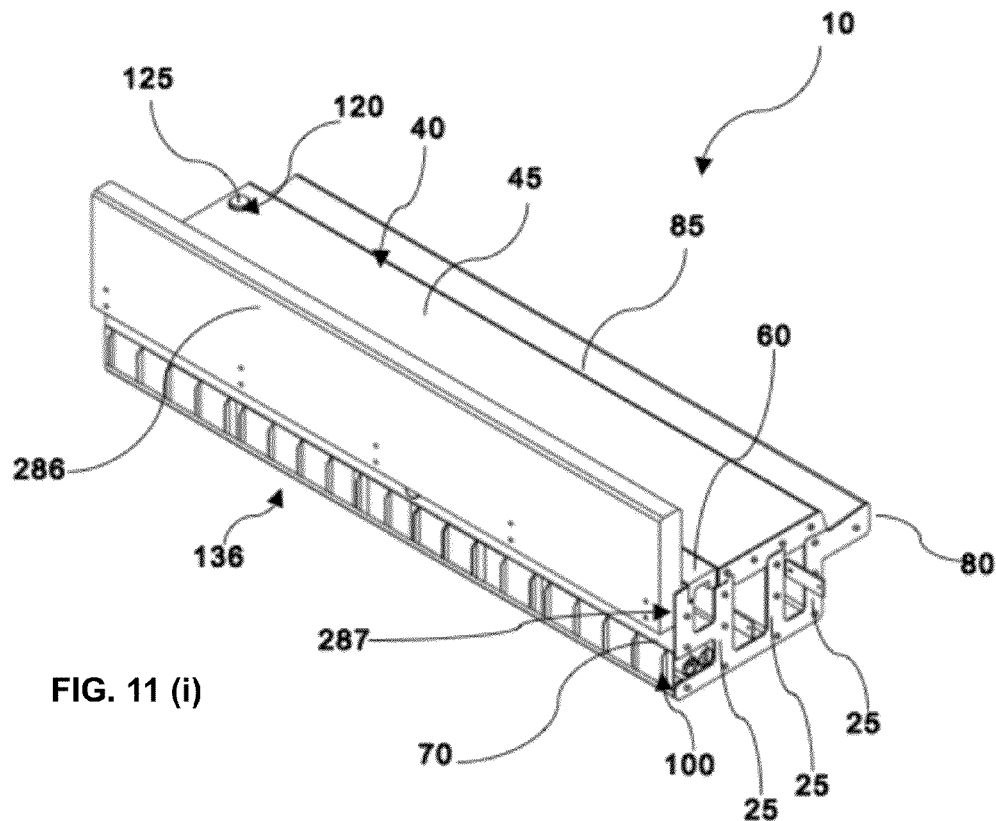
FIG. 11 (i)
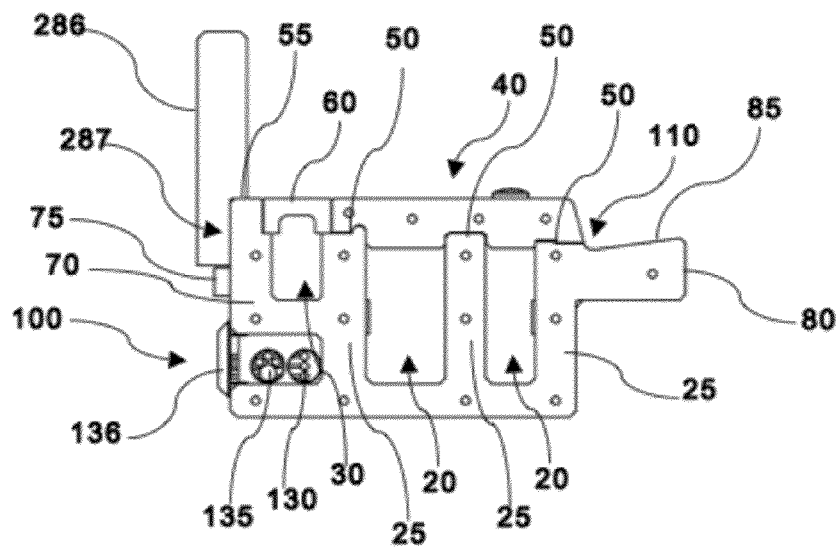
FIG. 11 (ii)

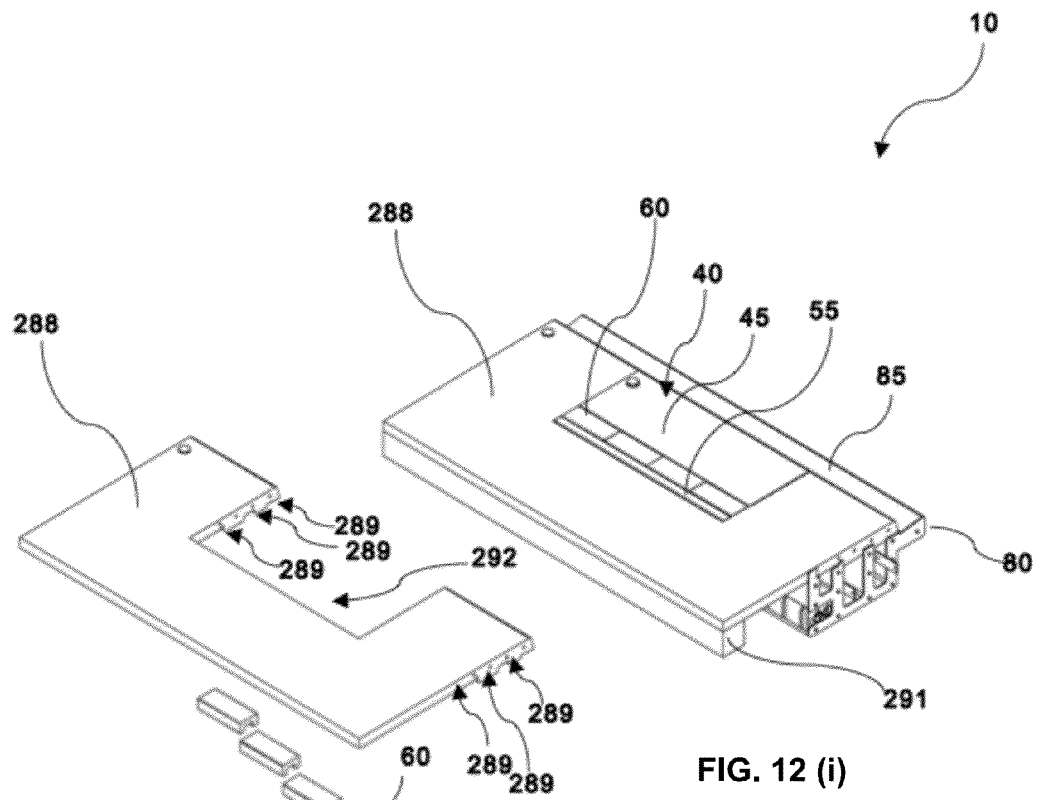
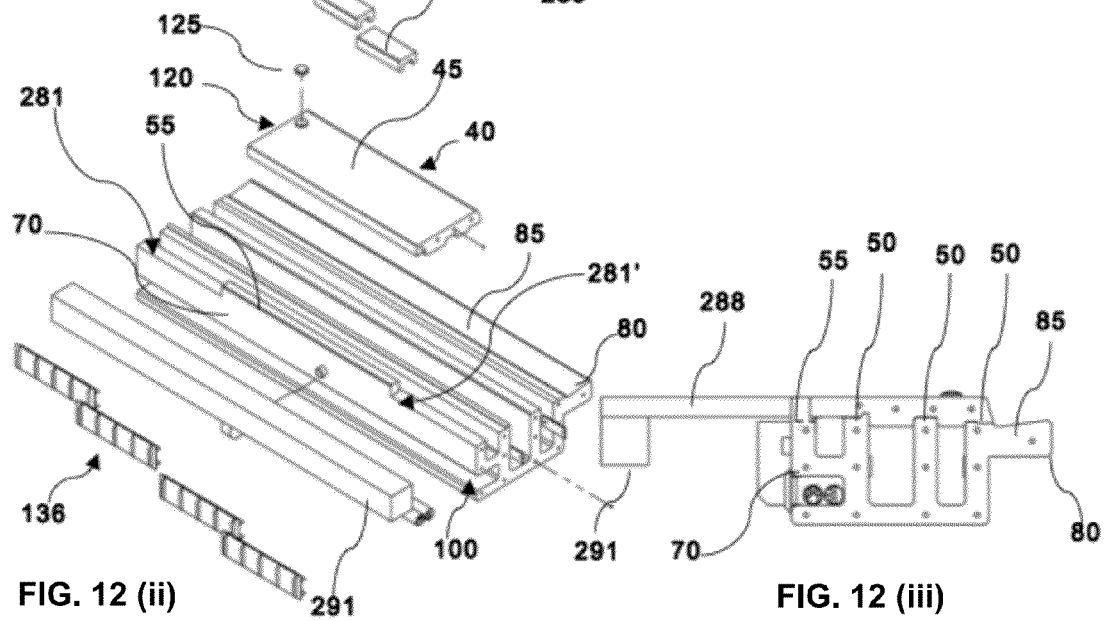
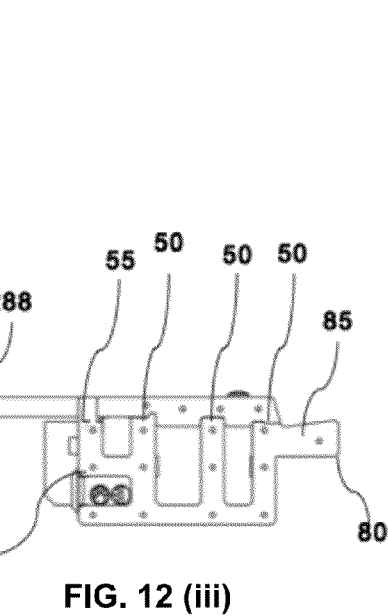
FIG. 12 (i)
FIG. 12 (ii)
FIG. 12 (iii)

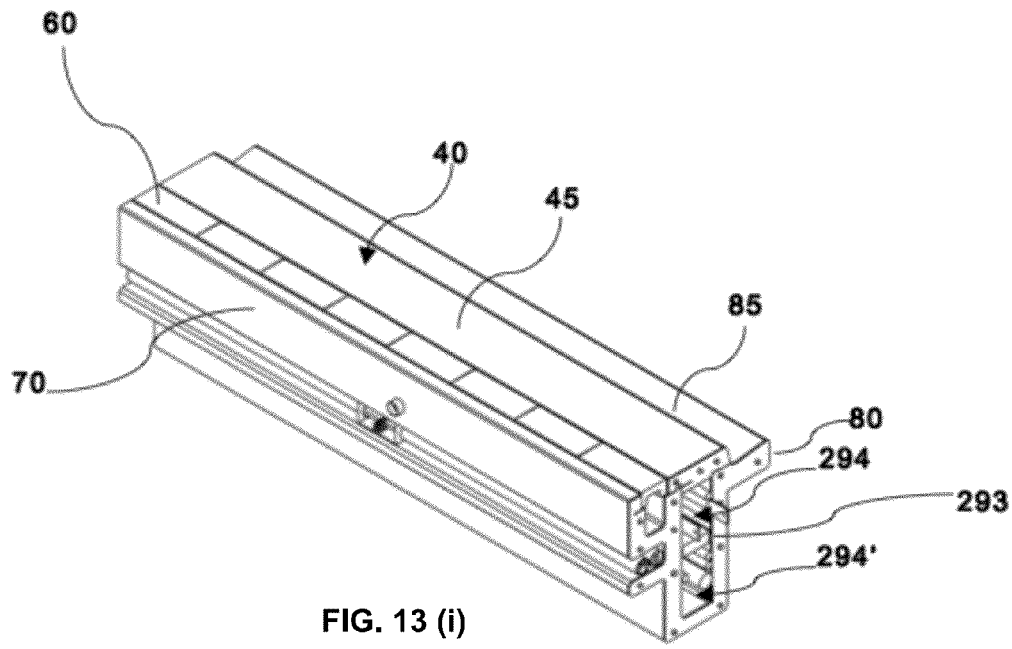
FIG. 13 (i)
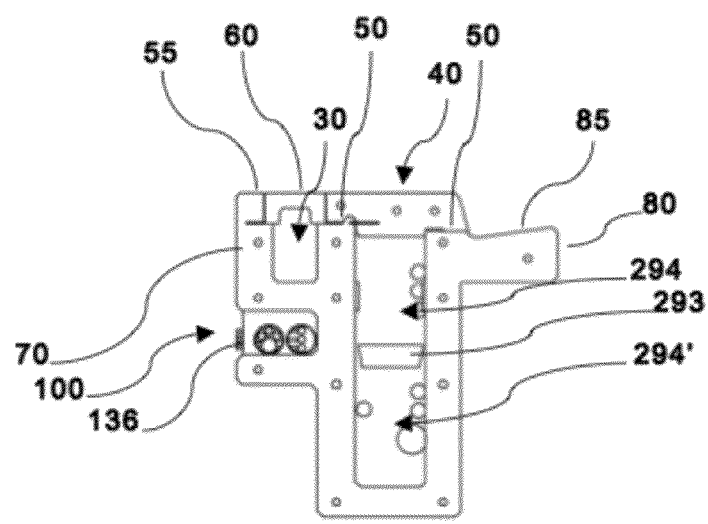
FIG. 13 (ii)

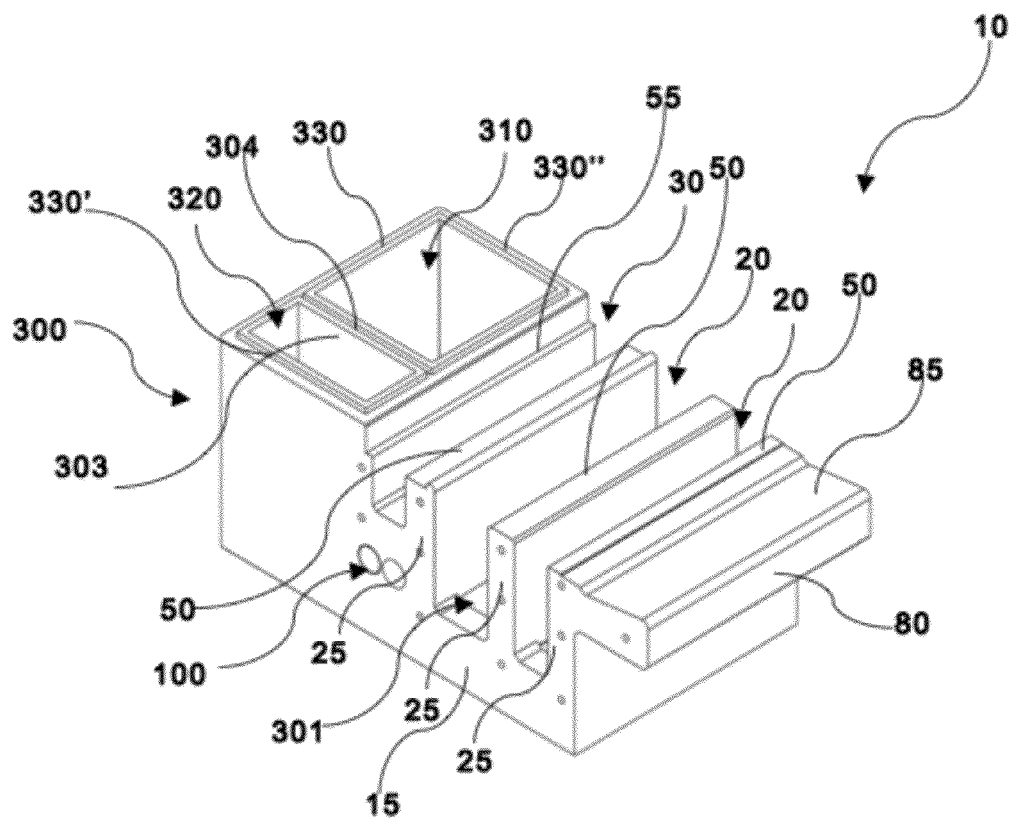
FIG. 14 (i)
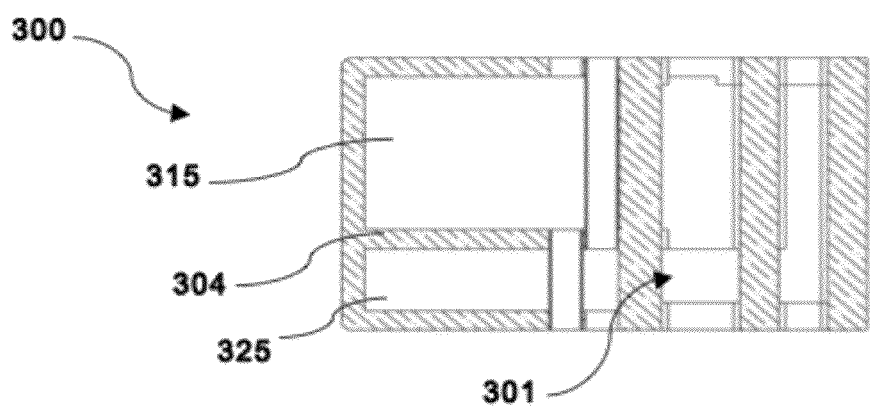
FIG. 14 (ii)

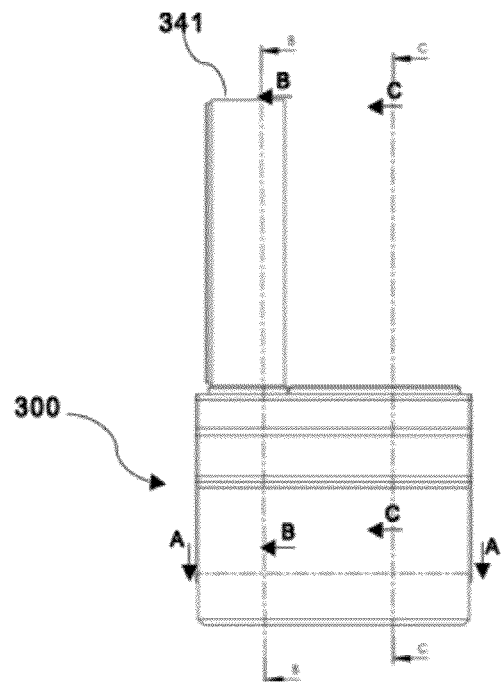
FIG. 15 (i)
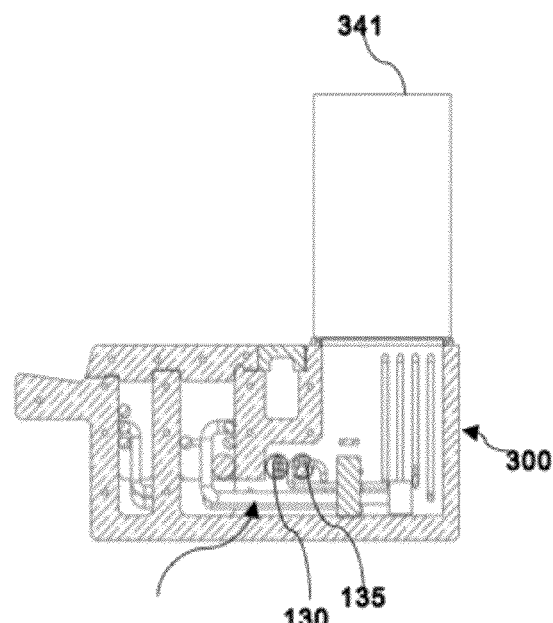
FIG. 15 (ii)
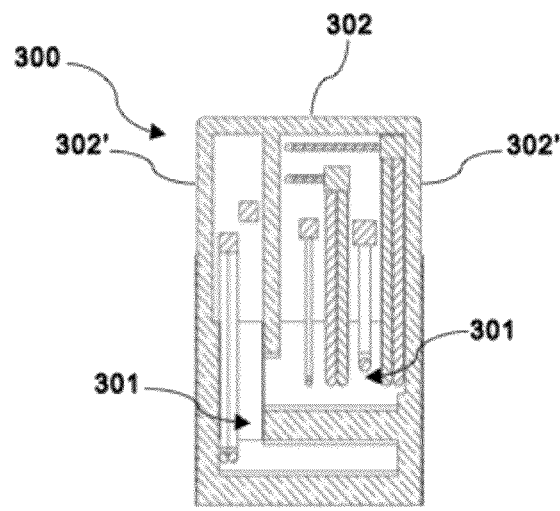
FIG. 15 (iii)
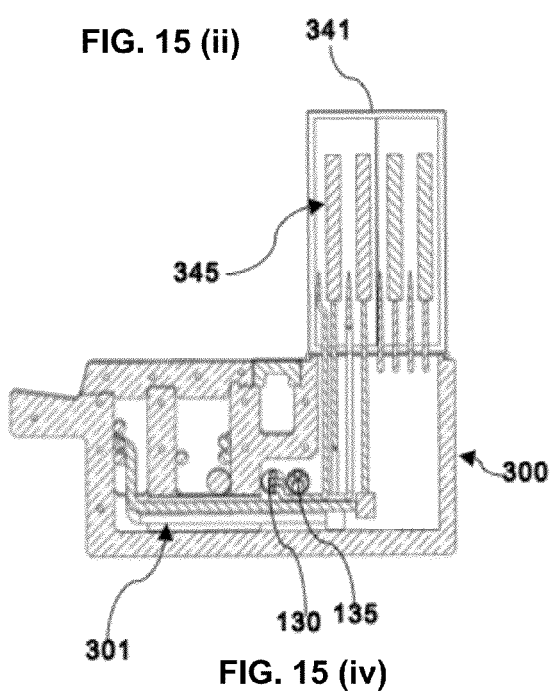
FIG. 15 (iv)

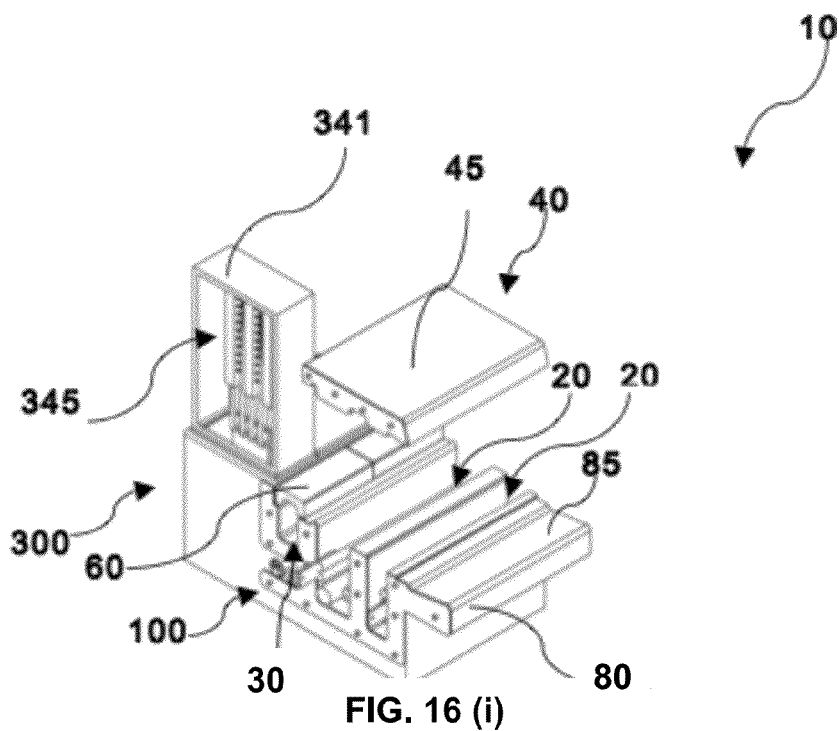
FIG. 16 (i)
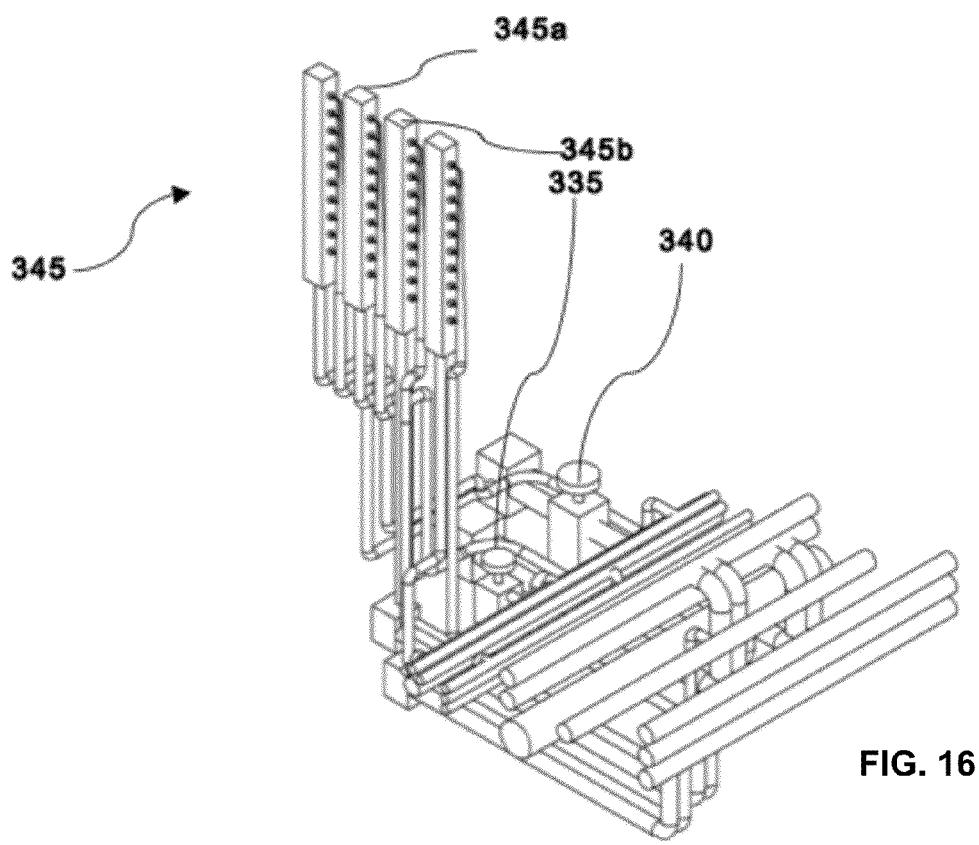
FIG. 16 (ii)

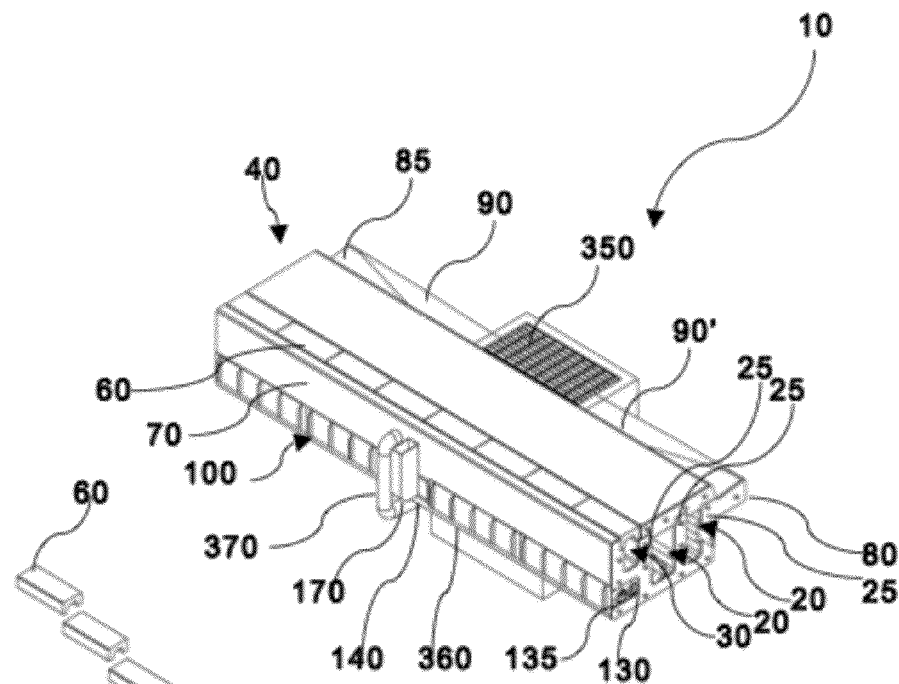
FIG. 17 (i)
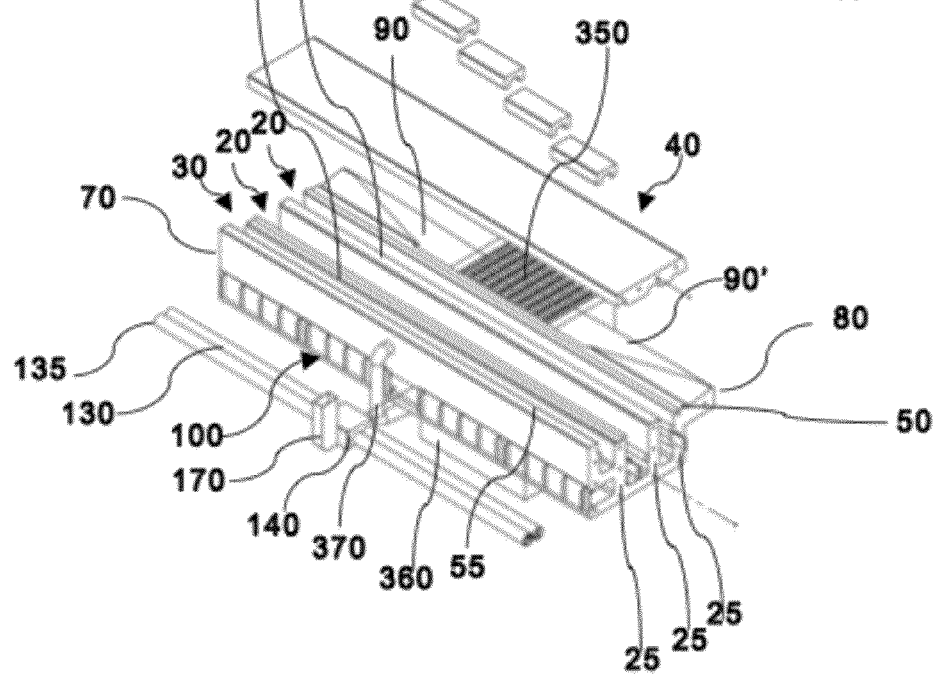
FIG. 17 (ii)

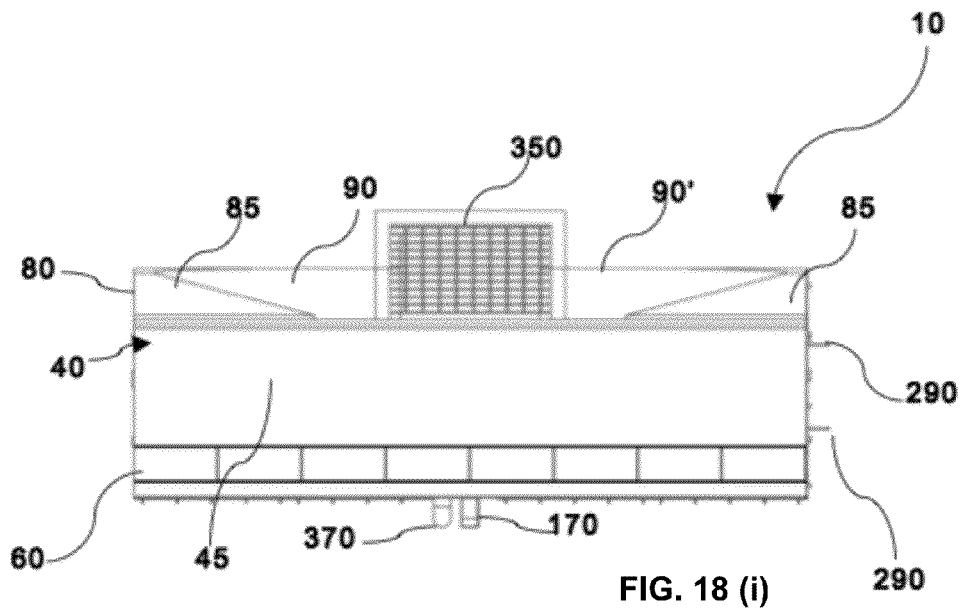
FIG. 18 (i)
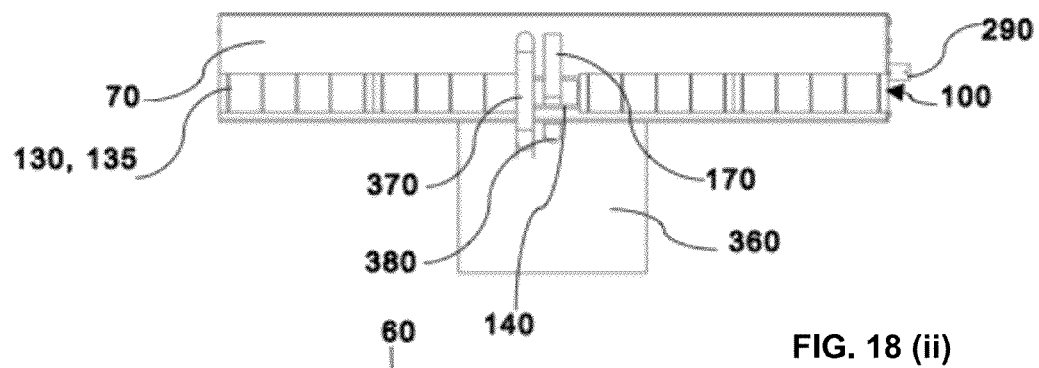
FIG. 18 (ii)
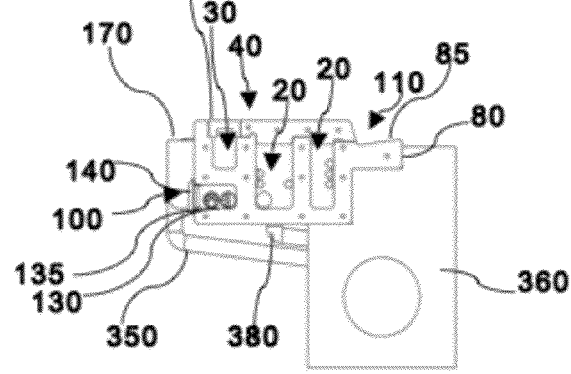
FIG. 18 (iii)

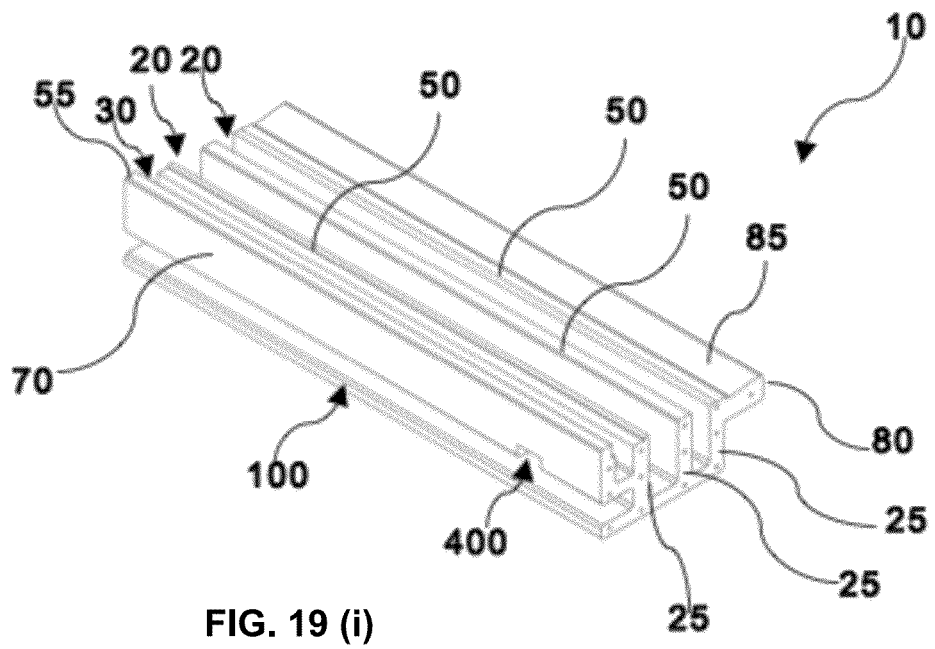
FIG. 19 (i)
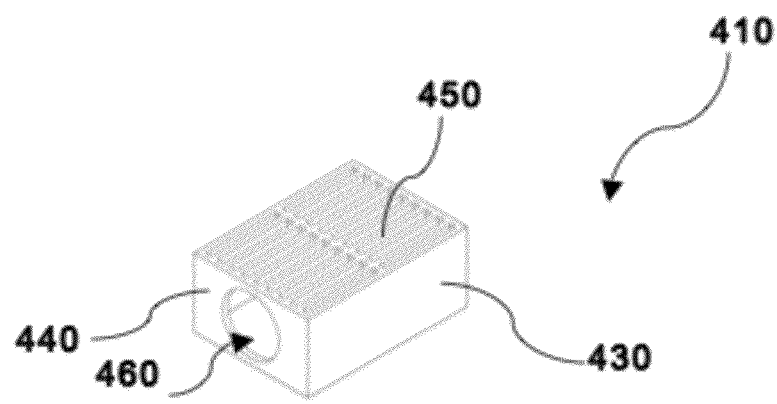
FIG. 19 (ii)
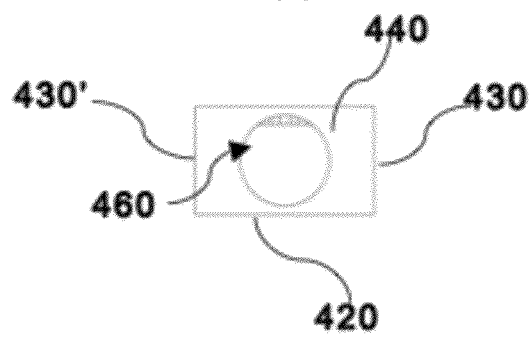
FIG. 19 (iii)

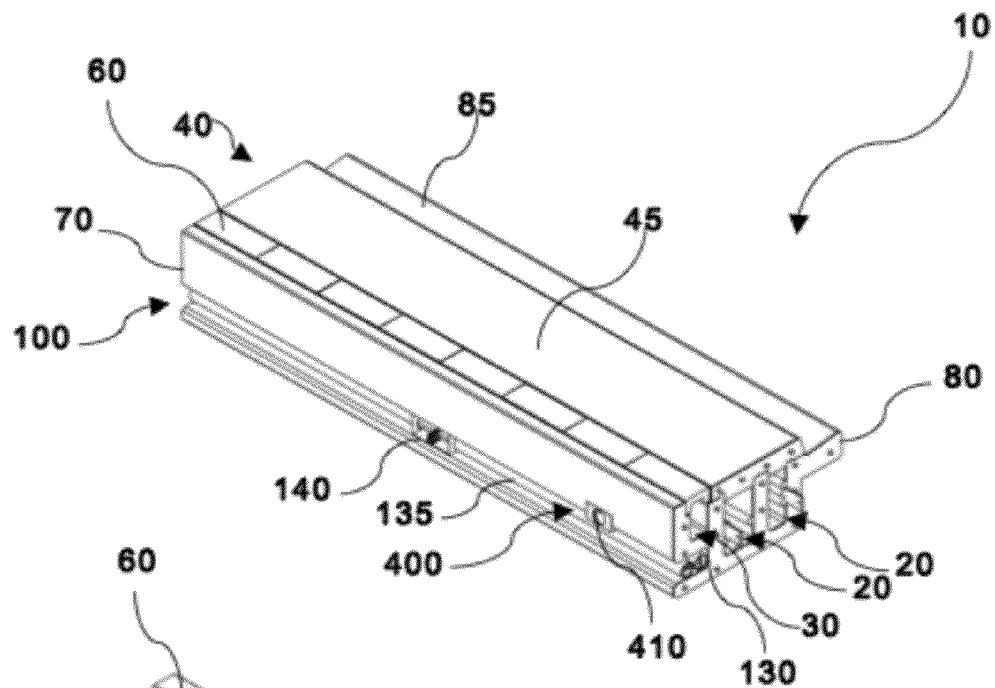
FIG. 20 (i)
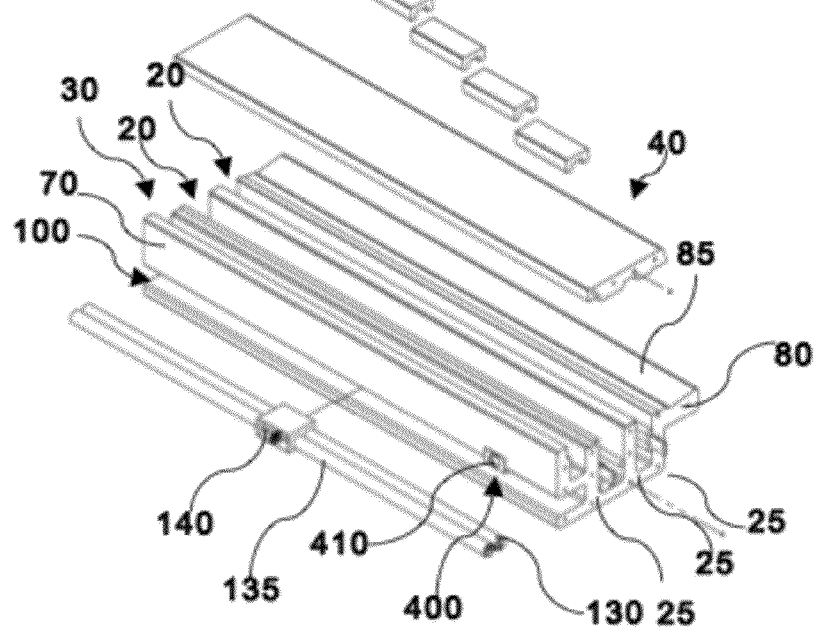
FIG. 20 (ii)

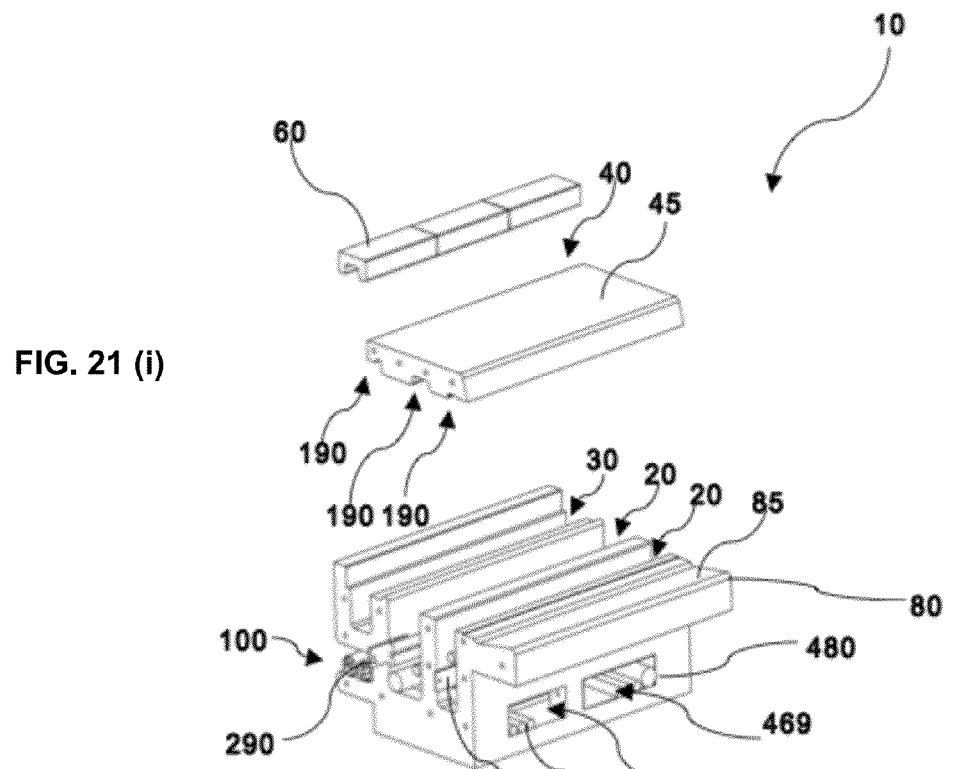
FIG. 21 (i)
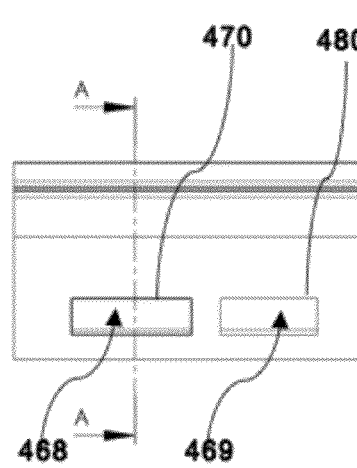
FIG. 21 (ii)
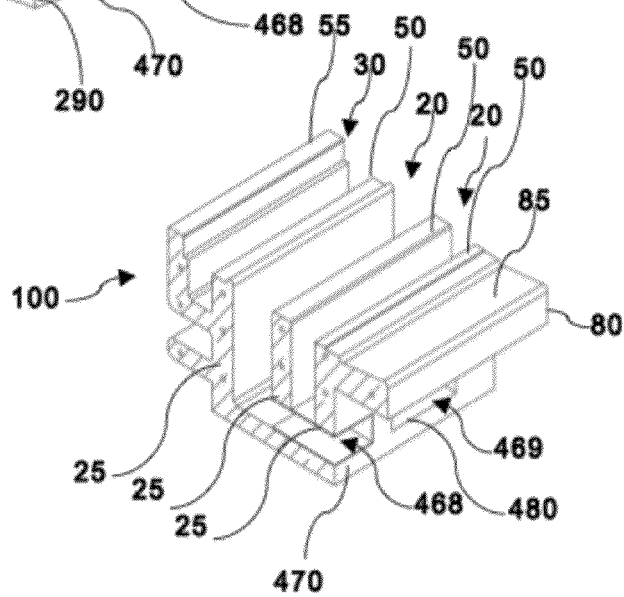
FIG. 21 (iii)

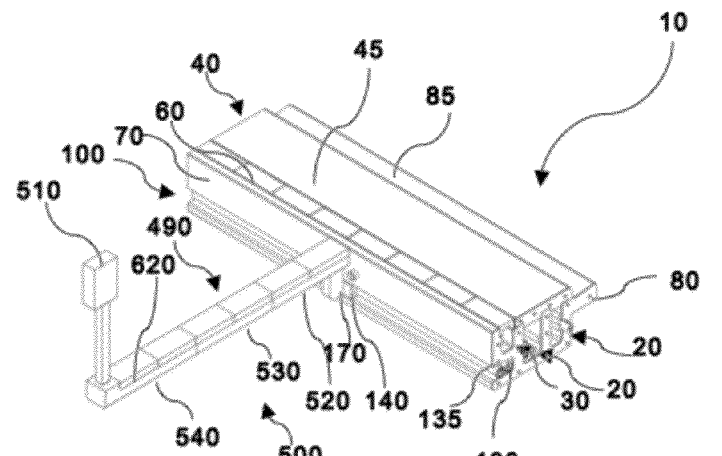
FIG. 22 (i)
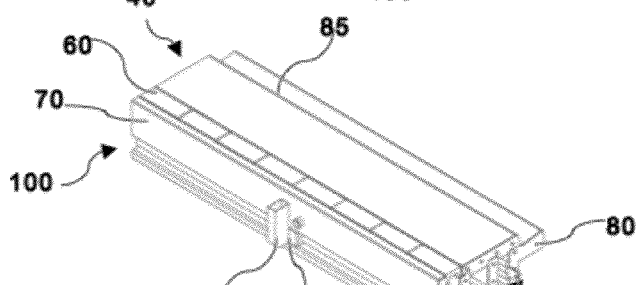
FIG. 22 (ii)
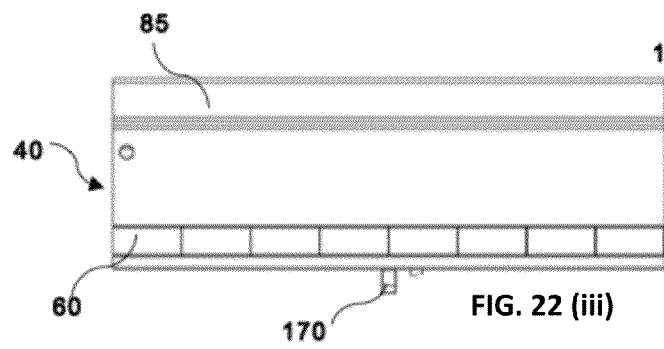
FIG. 22 (iii)
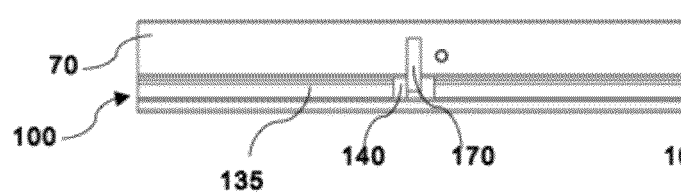
FIG. 22 (iv)
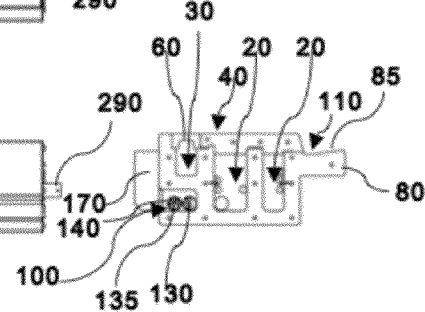
FIG. 22 (v)

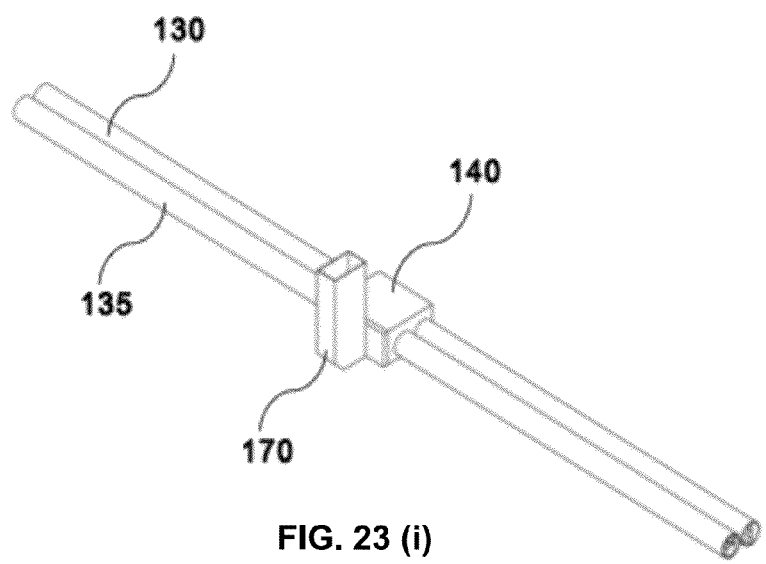
FIG. 23 (i)
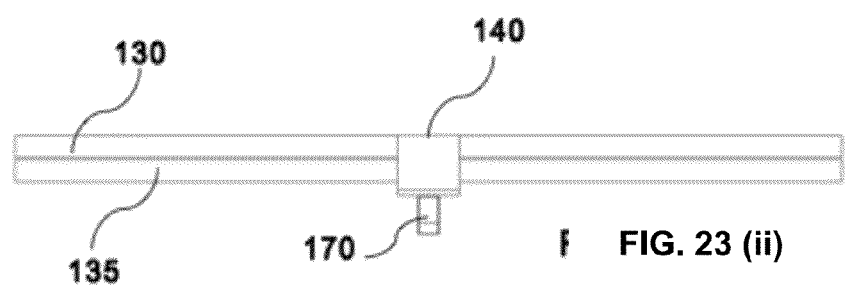
FIG. 23 (ii)
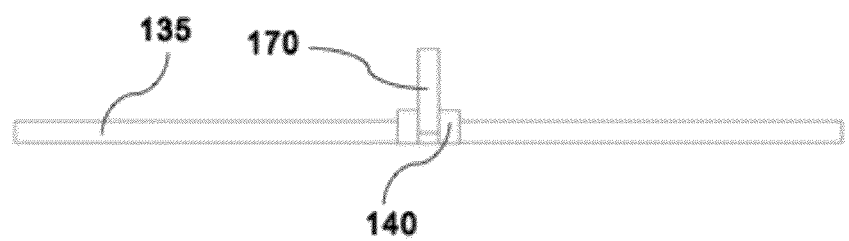
FIG. 23 (iii)
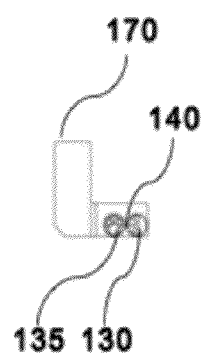
FIG. 23 (iv)

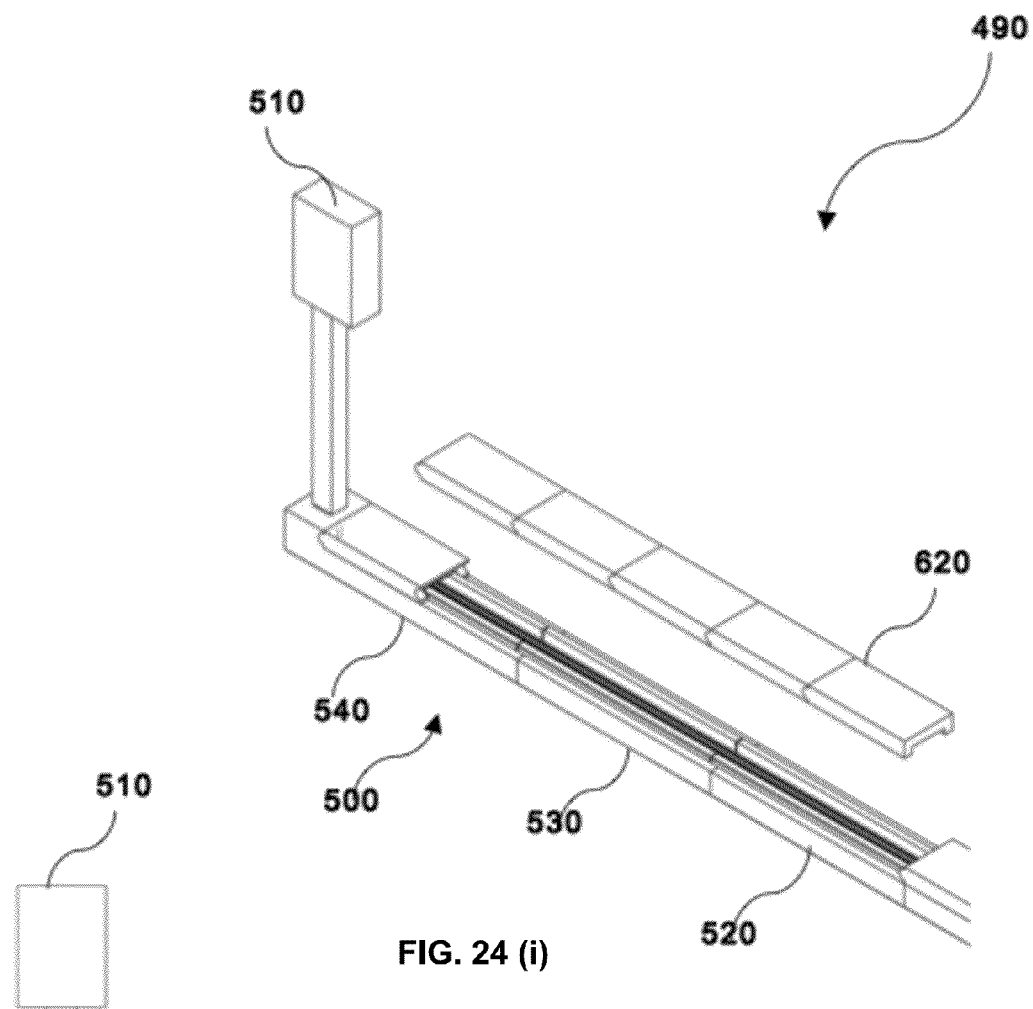
FIG. 24 (i)
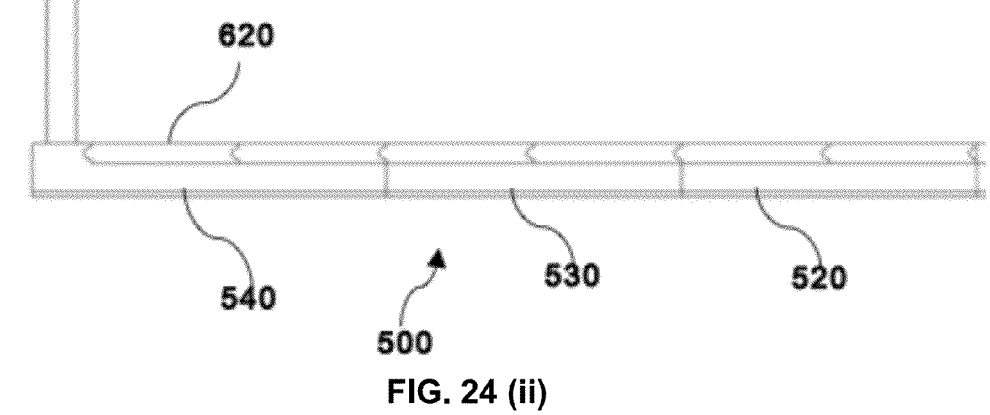
FIG. 24 (ii)

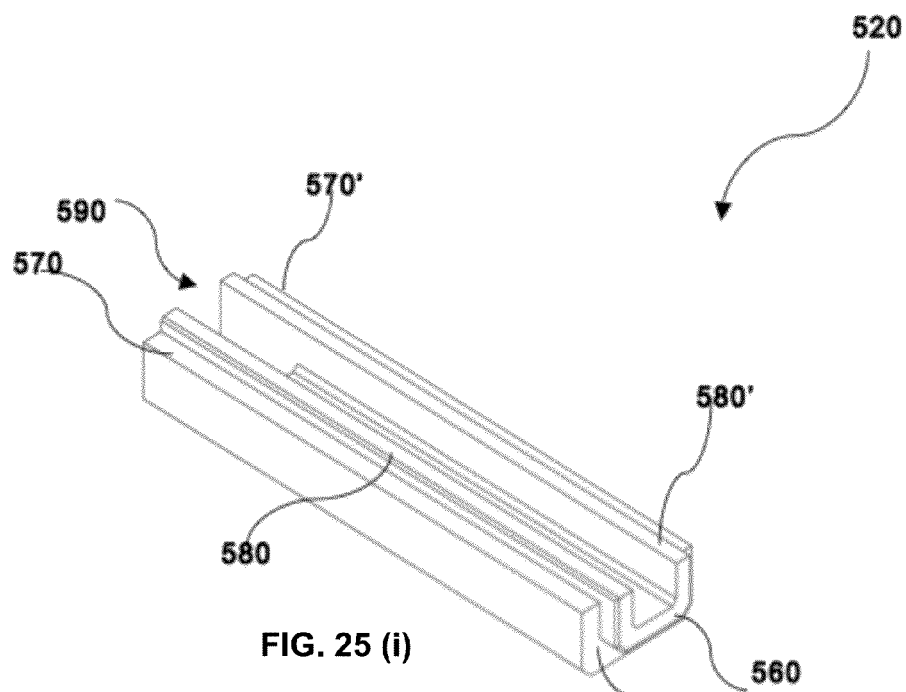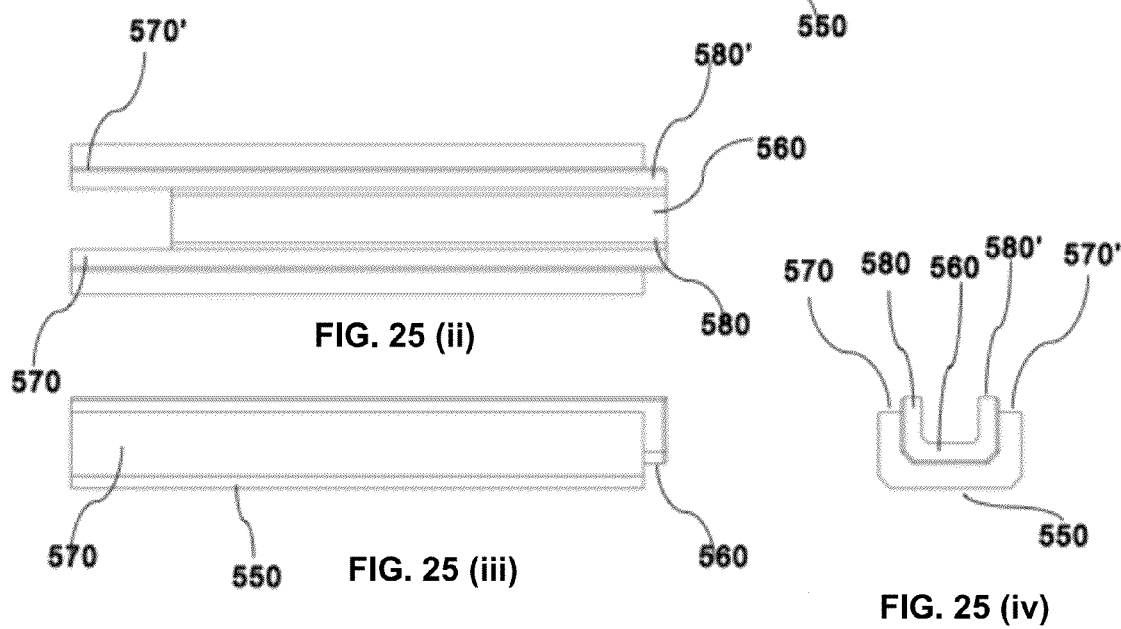
FIG. 25 (i)
FIG. 25 (ii)
FIG. 25 (iii)
FIG. 25 (iv)

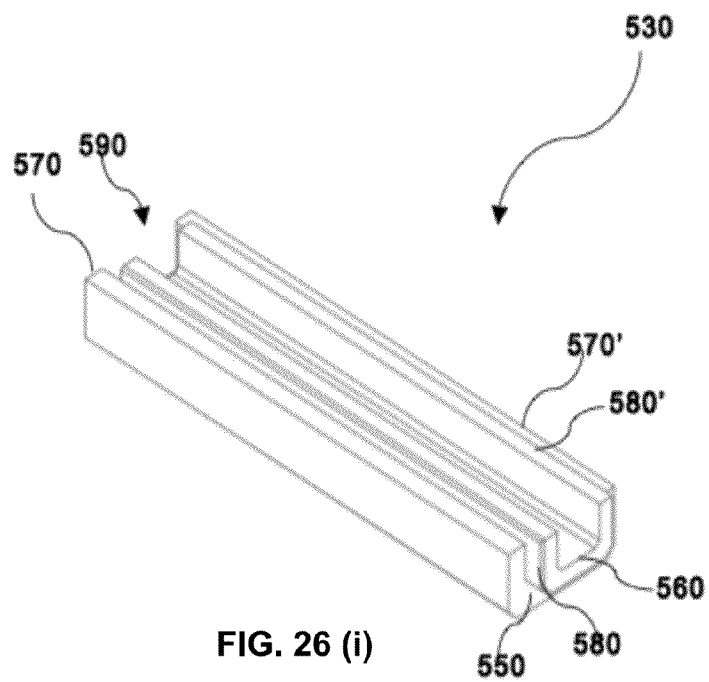
FIG. 26 (i)
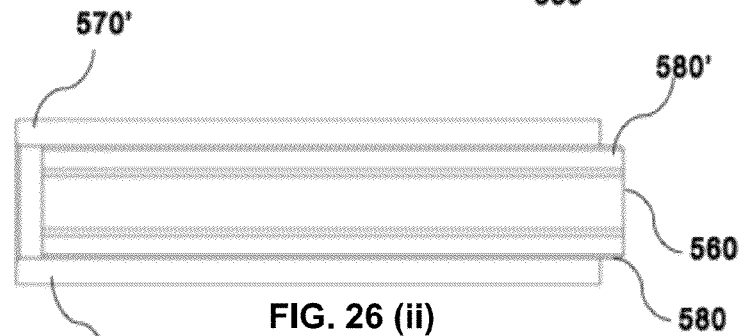
FIG. 26 (ii)
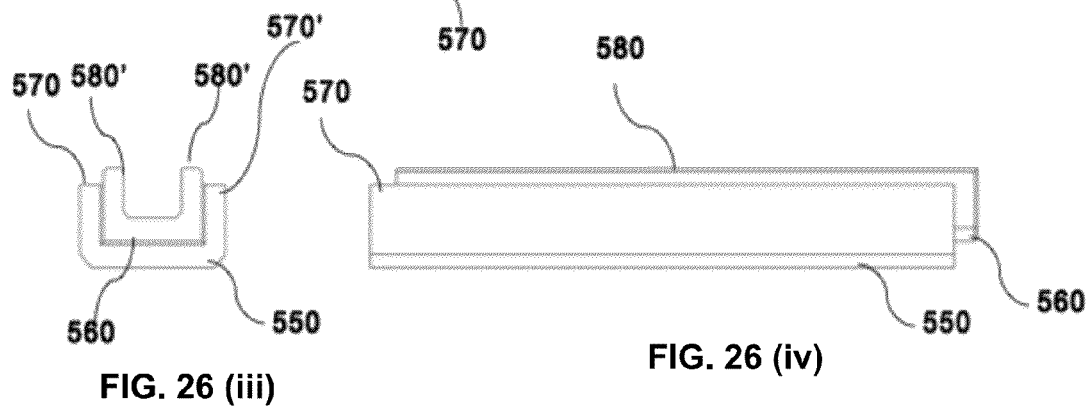
FIG. 26 (iii)
FIG. 26 (iv)

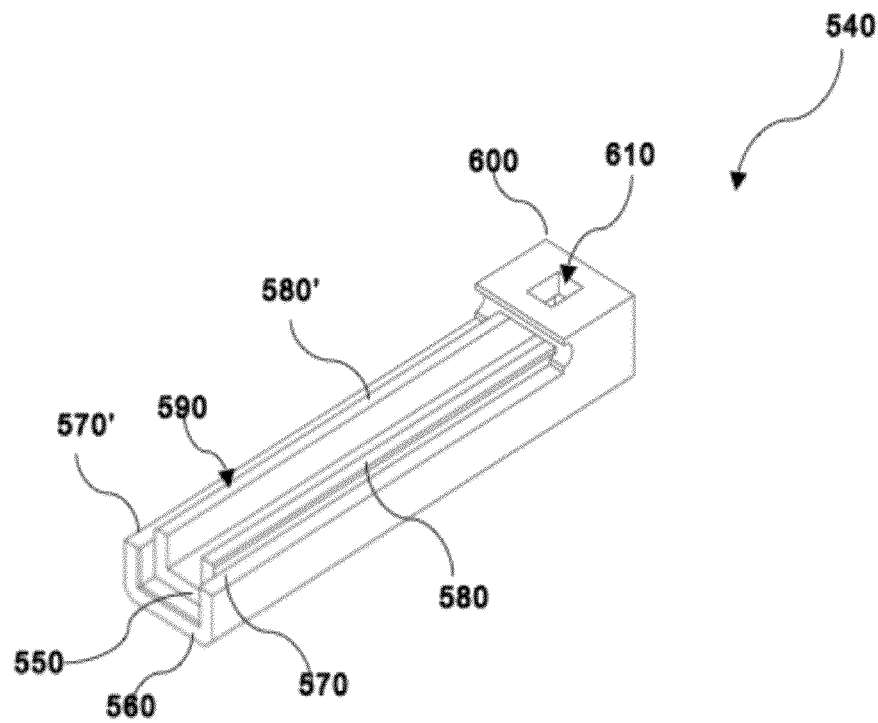
FIG. 27 (i)
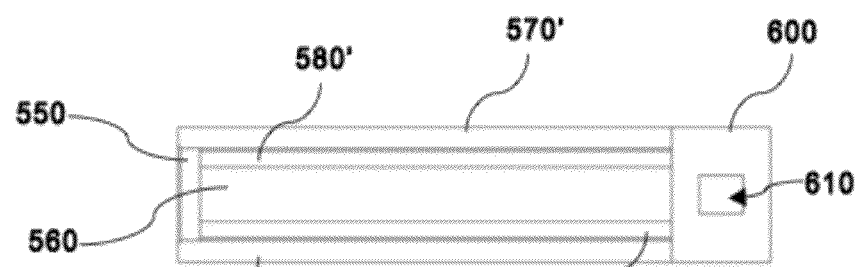
FIG. 27 (ii)
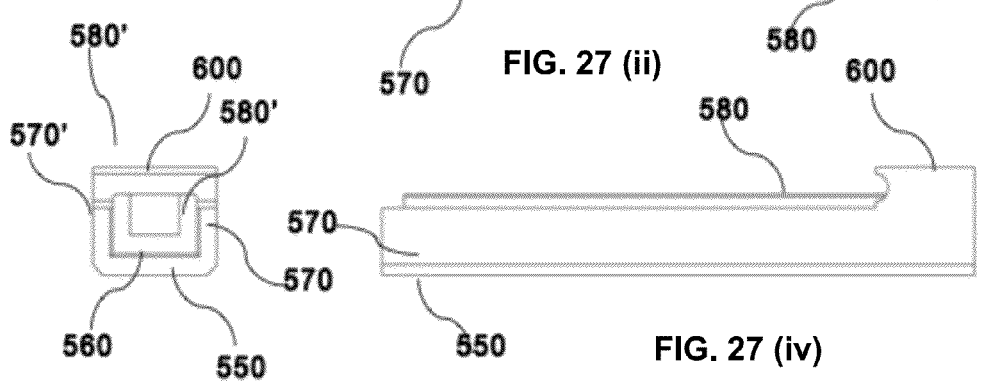
FIG. 27 (iii)
FIG. 27 (iv)

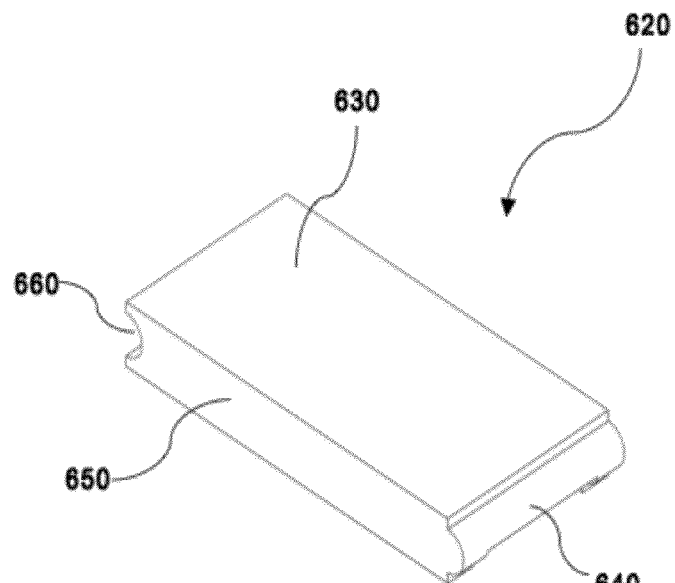
FIG. 28 (i)
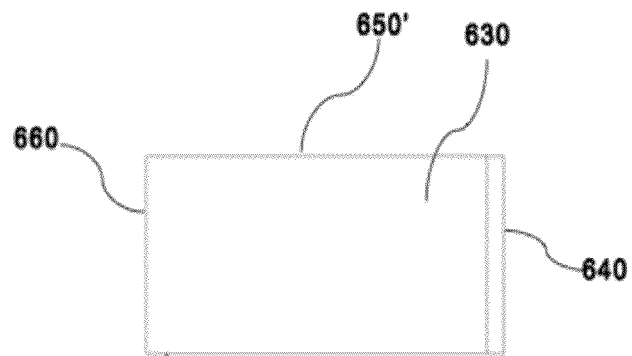
FIG. 28 (ii)
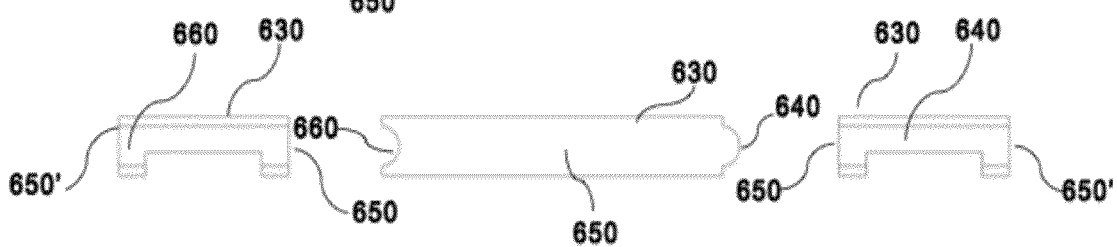
FIG. 28 (iii)   FIG. 28 (iv)   FIG. 28 (v)

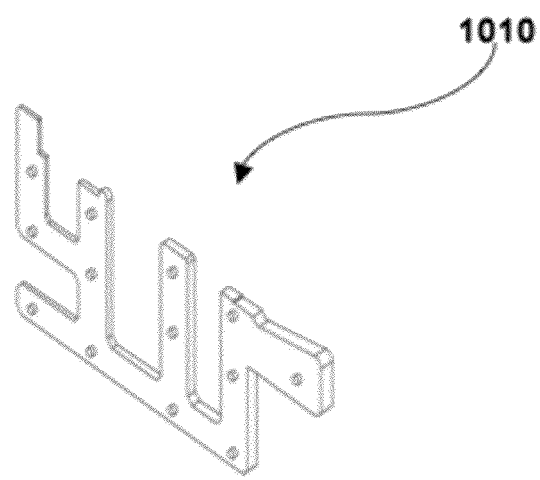
FIG. 32 (i)
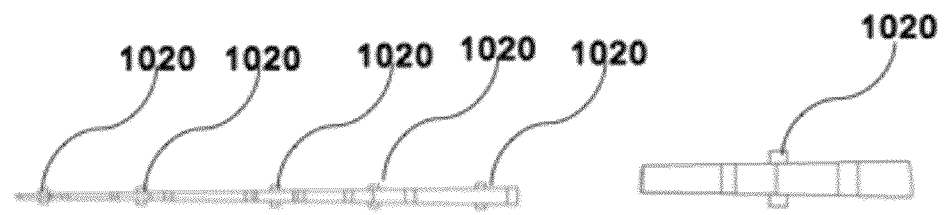 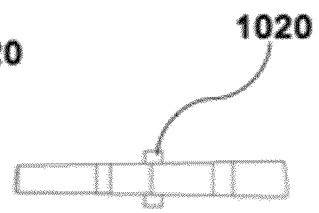
FIG. 32 (ii)  FIG. 32 (iii)
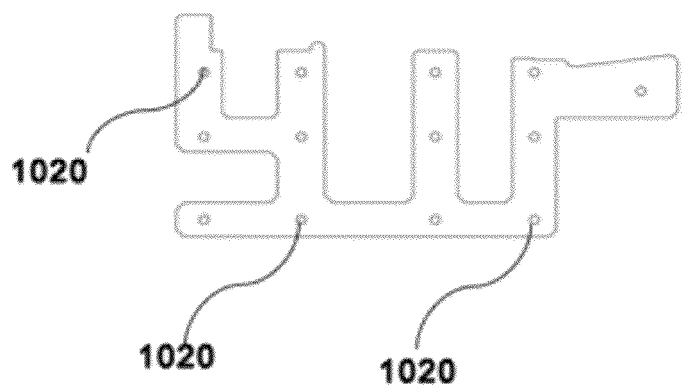
FIG. 32 (iv)

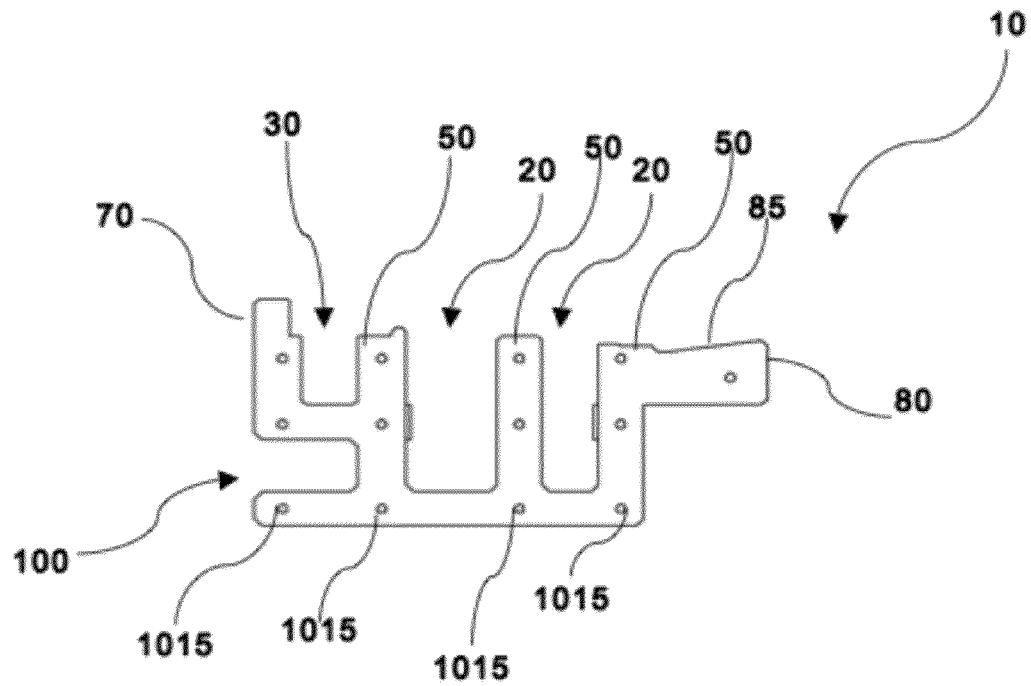
FIG. 33 (i)
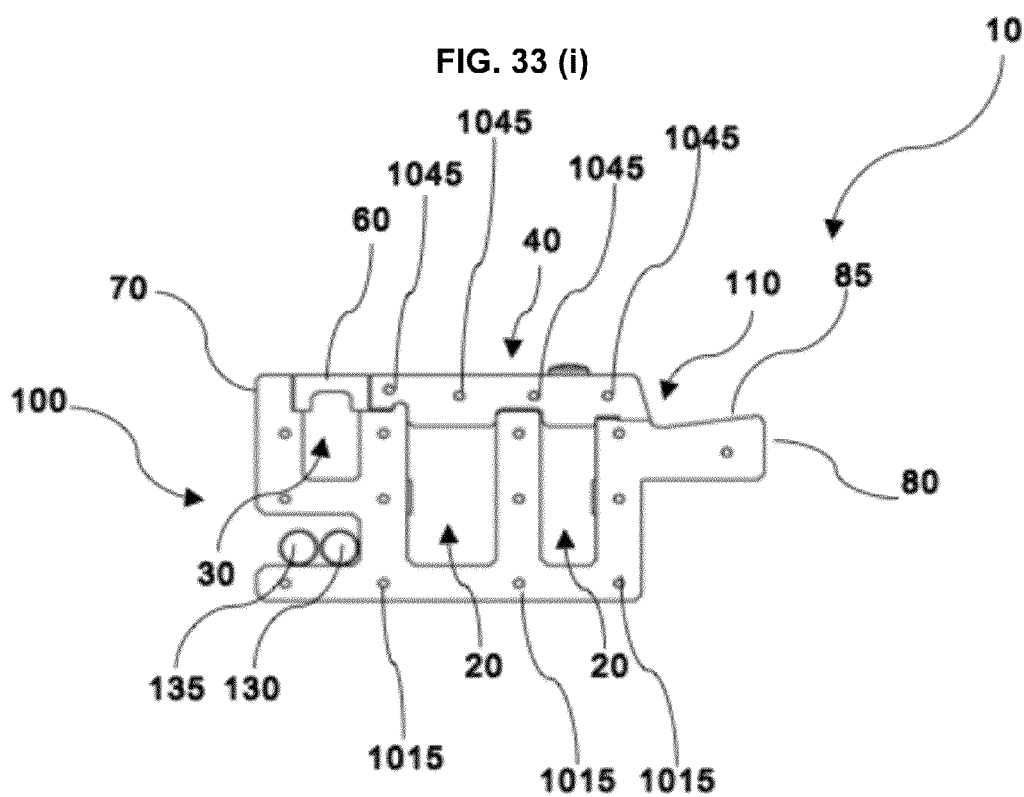
FIG. 33 (ii)

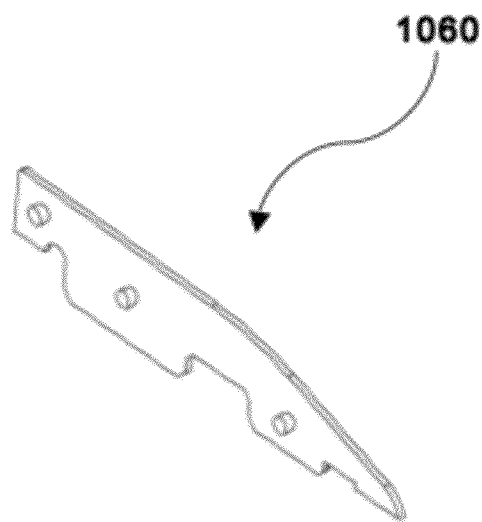
FIG. 34 (i)
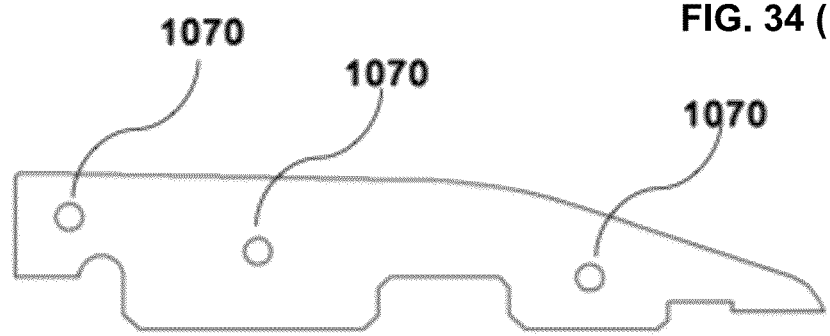
FIG. 34 (ii)
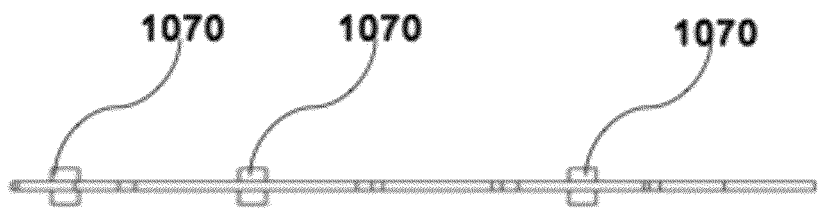
FIG. 34 (iii)

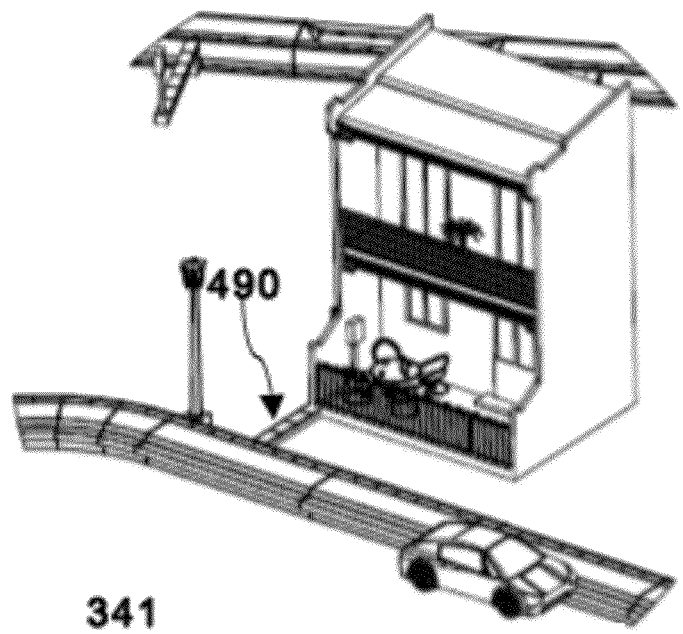
FIG. 37 (i)
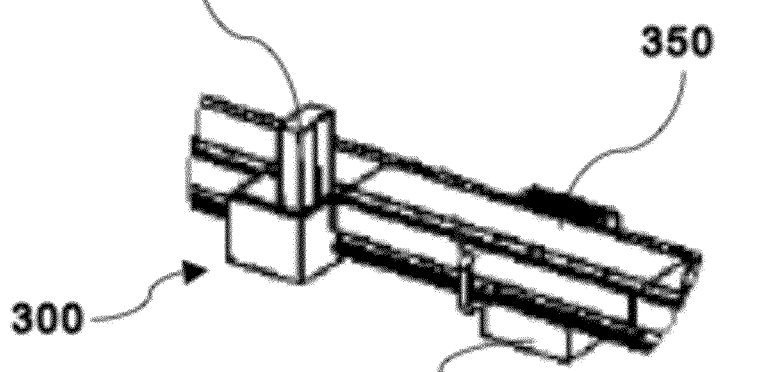
FIG. 37 (ii)
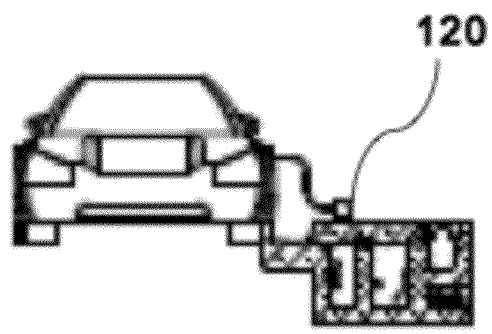
FIG. 37 (iii)

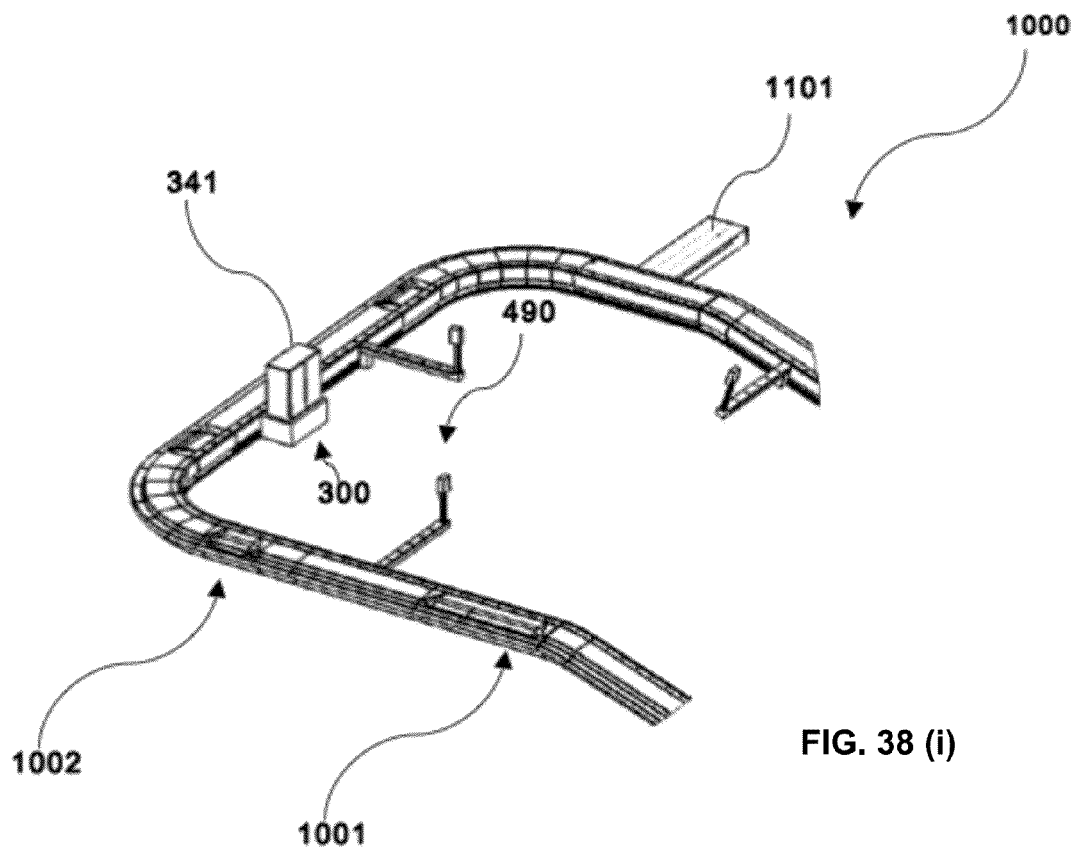
FIG. 38 (i)
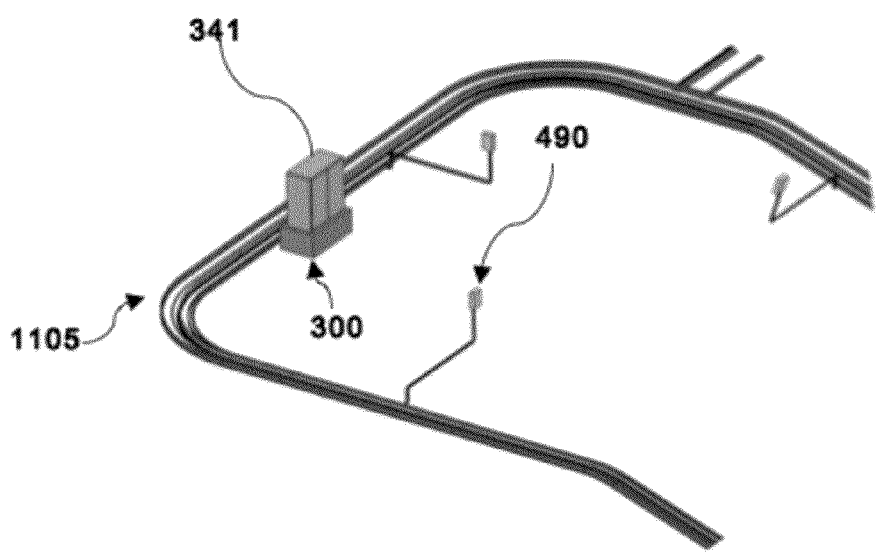
FIG. 38 (ii)

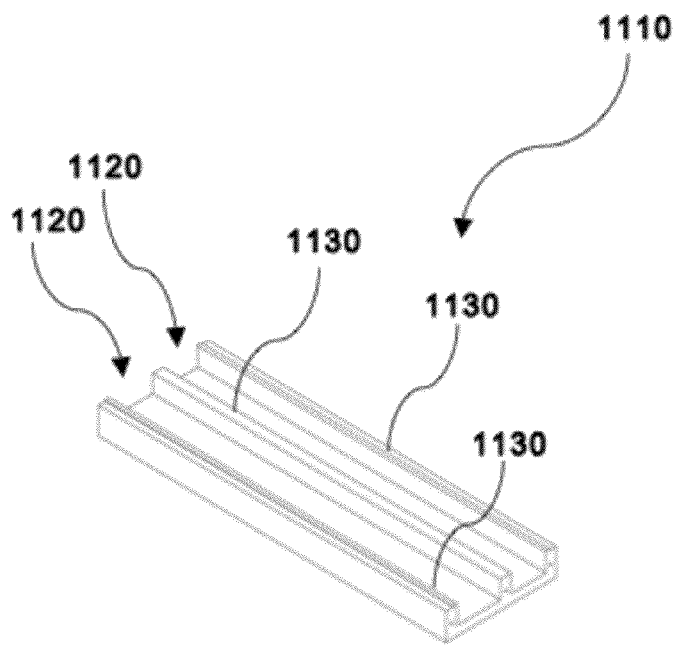
FIG. 39 (i)
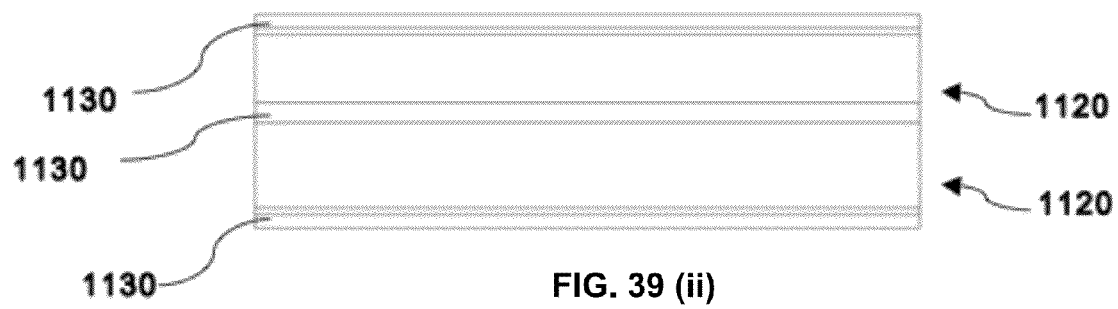
FIG. 39 (ii)
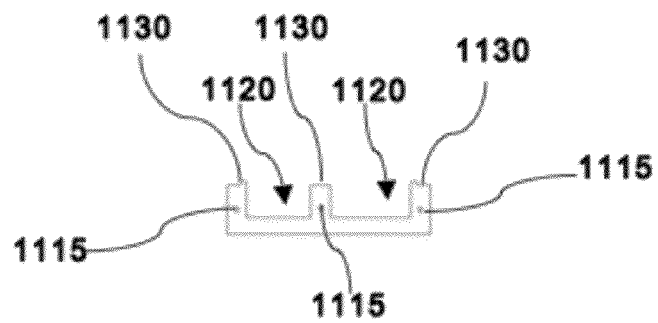
FIG. 39 (iii)

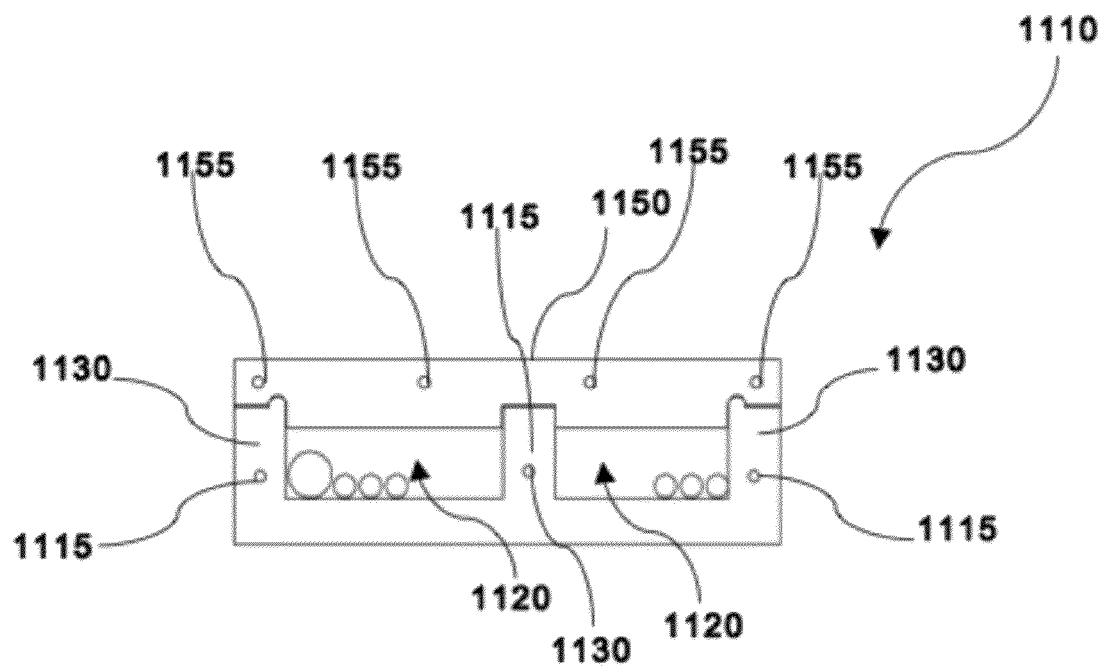
FIG. 40 (i)
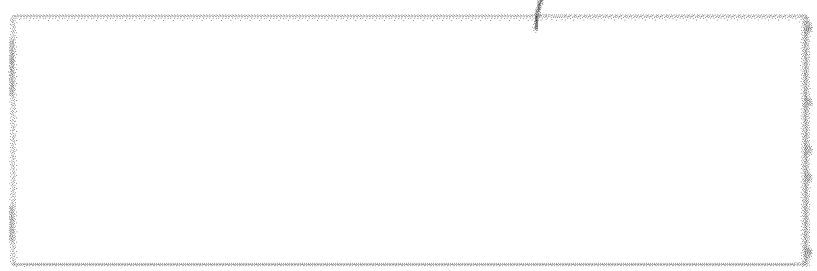
FIG. 40 (ii)
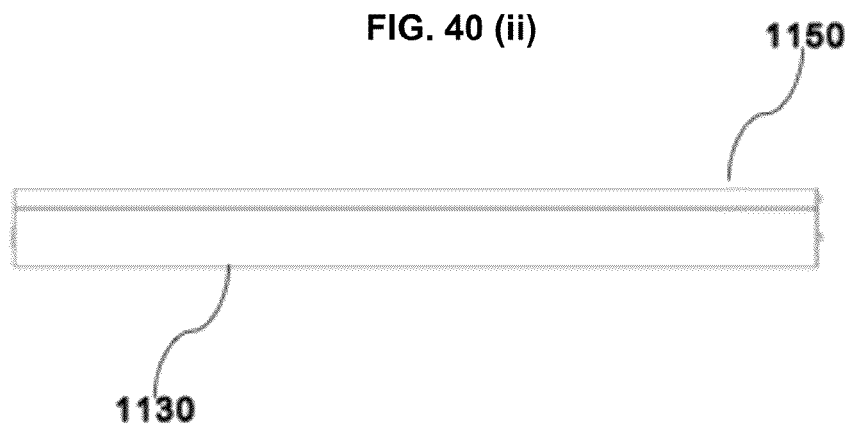
FIG. 40 (iii)

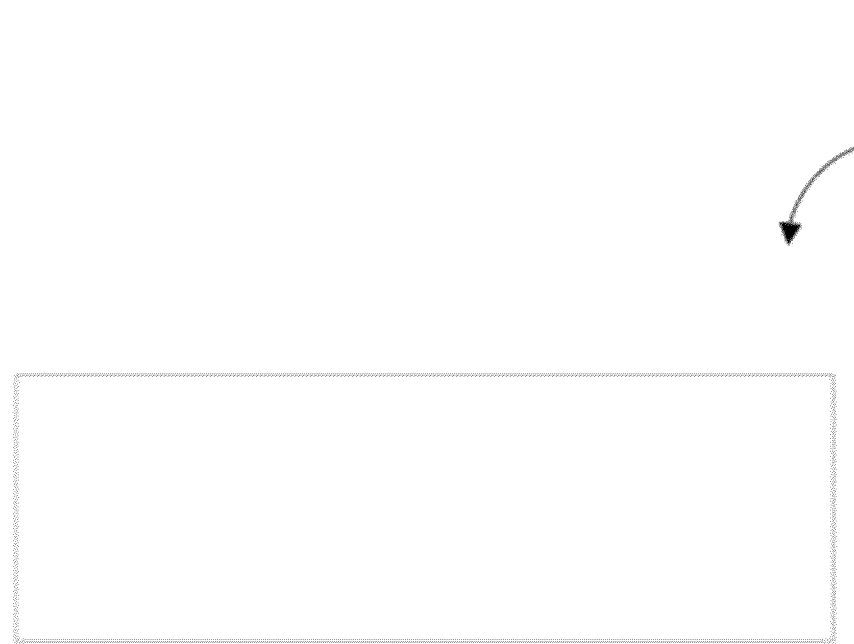
FIG. 41 (i)
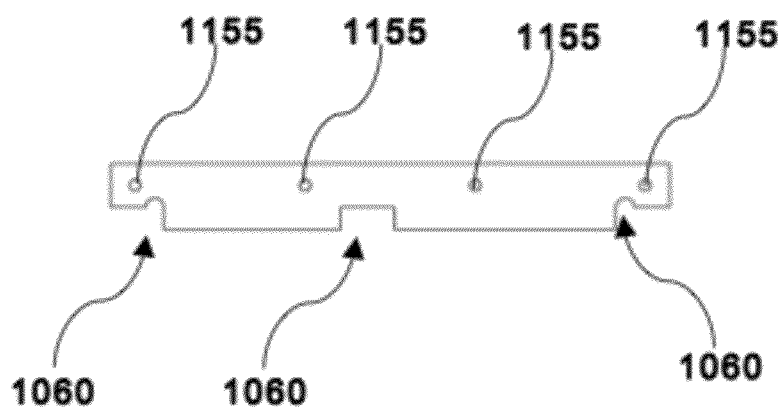
FIG. 41 (ii)

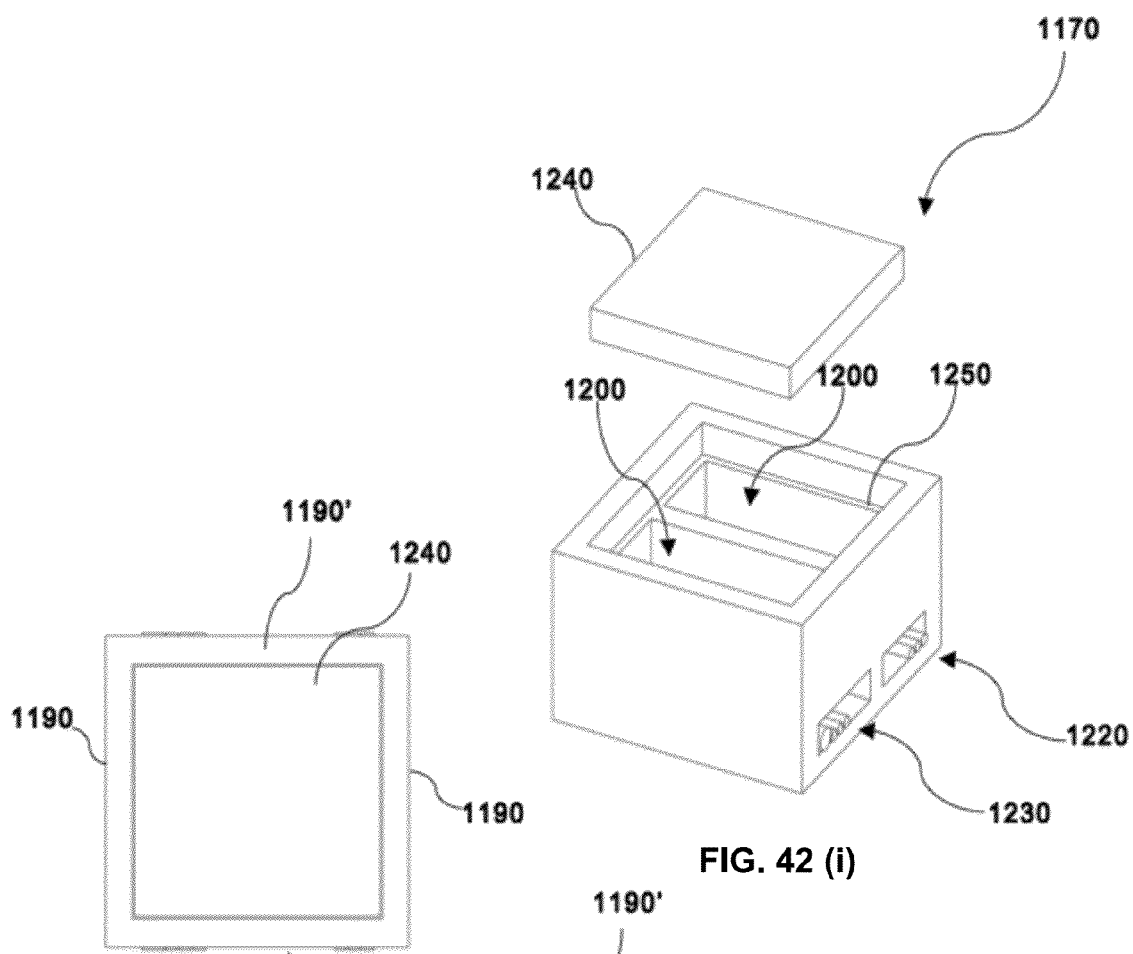
FIG. 42 (i)
FIG. 42 (ii)
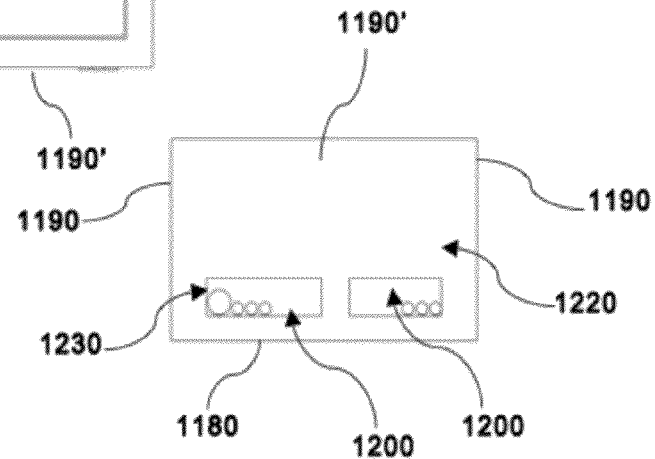
FIG. 42 (iii)

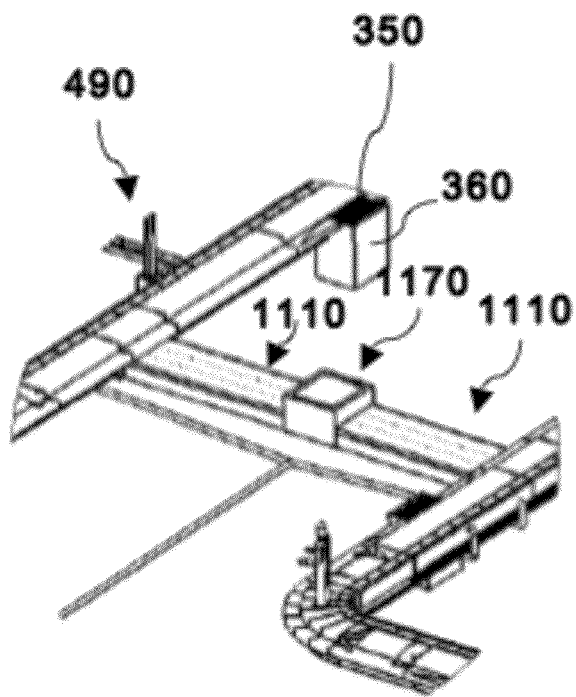
FIG. 43 (i)
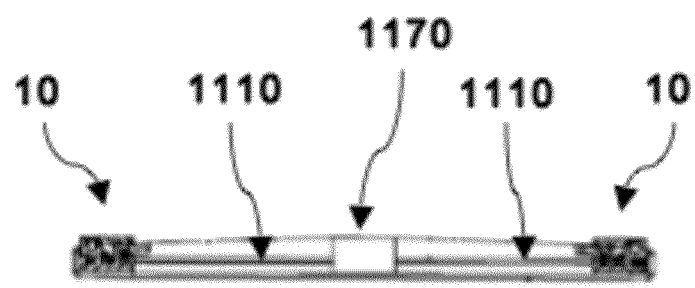
FIG. 43 (ii)

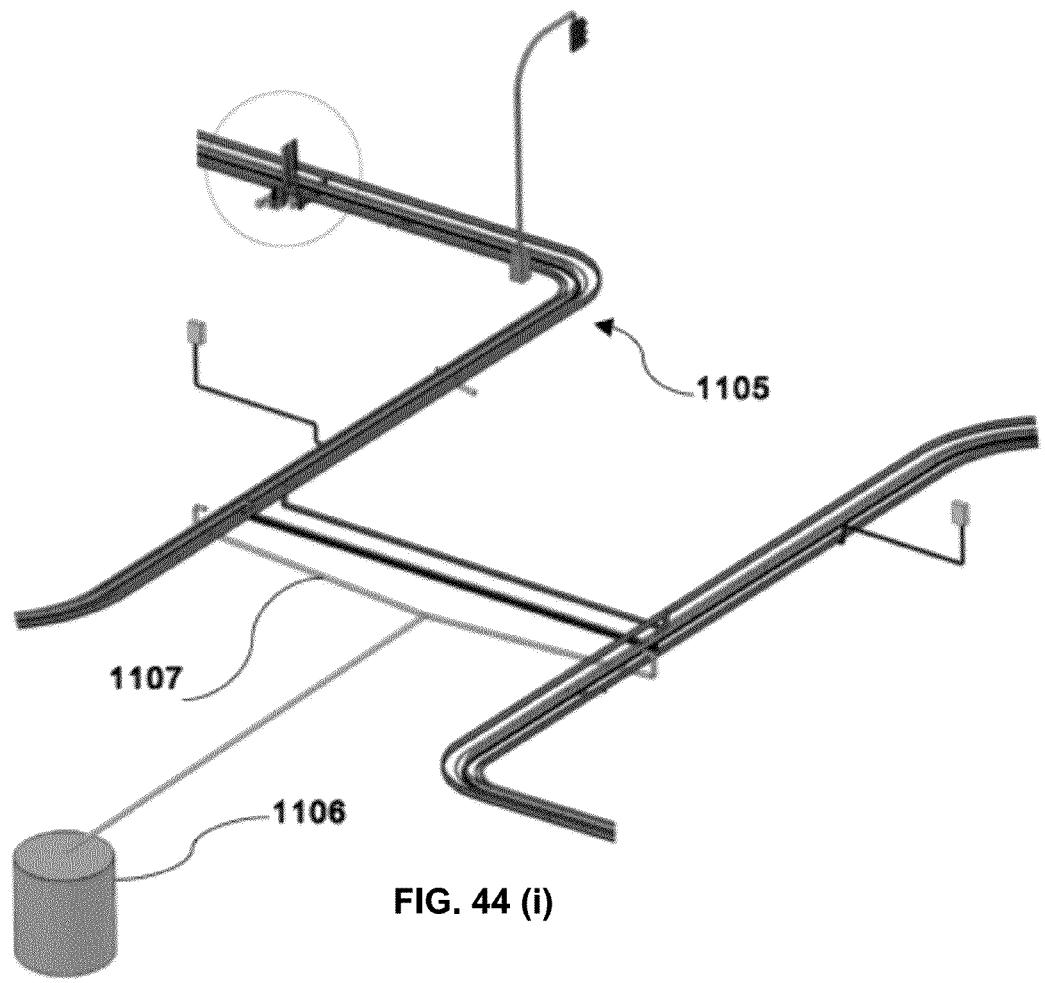
FIG. 44 (i)
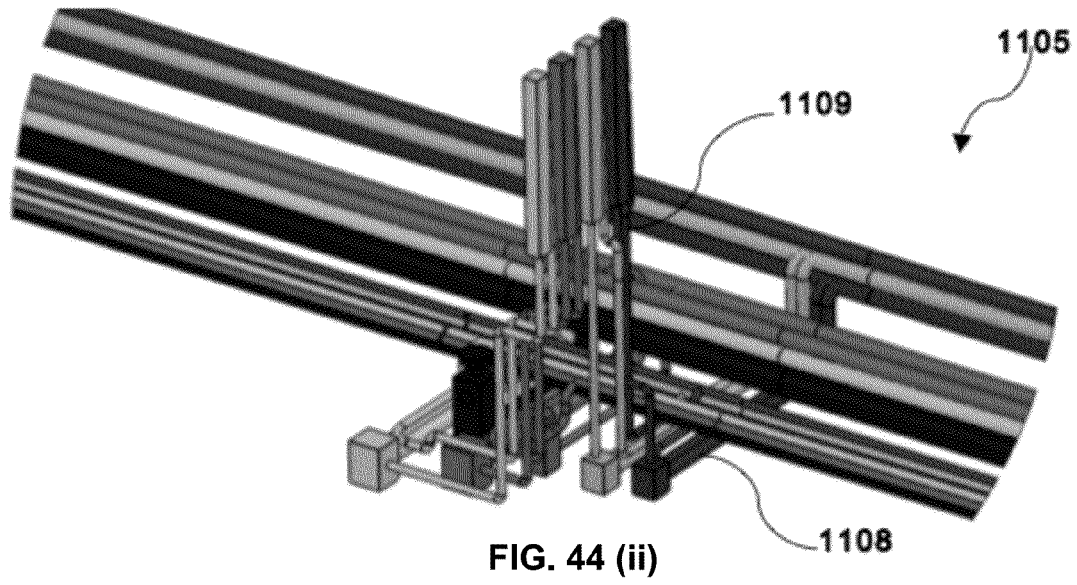
FIG. 44 (ii)

MODULAR DUCTING SECTIONS AND NETWORKED UTILITIES DUCTING SYSTEM FORMED THEREFROM

CROSS-REFERENCE TO RELATED APPLICATIONS

This US national stage application claims benefit of priority under 35 U.S.C. 371 of pending international application PCT/AU2011/000962, filed Jul. 29, 2011, which international application claims benefit of priority under 35 USC 119(a) of provisional Australian Patent Application No. 2010903400, filed Jul. 30, 2010, now abandoned.

FIELD OF THE INVENTION

The present invention relates to road gutters, kerbs and pavements and in particular to a modular ducting section adapted for laying end-to-end and a ducting system comprising two or more modular ducting sections lying end-to-end. When formed as a frame around a block it provides an encased access route for distributed and networked utility services and for rain and run-off water management.

The invention has been developed primarily for use in urban streetscapes and will be described hereinafter with reference to this application. However, it will be appreciated that the invention is not limited to this particular field of use.

BACKGROUND OF THE INVENTION

In urban environments, utility lines such as gas, electricity, water and data/telecommunications, are generally provided to residential or commercial properties either above or below street level. Above street level, utility lines are provided as cables that are carried by poles such as telegraph poles or electricity pylons. Such poles are generally regarded as unattractive and decrease the aesthetics of the streetscape and the value of the surrounding property. Such poles also represent obstacles in urban streetscapes such as pavements in which they hinder pedestrian activity due to the width limitations of the pavement. This is particularly noticeable for pedestrians with prams or pushchairs, or wheelchair bound persons, who may be forced to use the road in order to bypass such obstacles. In addition, such poles and cables when, for example, strung across a road will also preclude high-sided vehicles such as lorries or double-decker buses from being able to pass under the cables safely.

The use of such poles to provide utility lines is often avoided by instead running the utility supplies through a ducting system beneath the streetscape. However, one of the largest disadvantages associated with placing utility lines underground is the cost. This is particularly relevant when maintenance or repair of the underground utility lines is required to be performed, or when a new utility line or utility service is to be introduced. This leads to a further problem where parts of the urban streetscape needs to be dug up in order to gain access to the utility lines to repair them. This in time serves to reduce the quality and durability of the streetscape surface. In many established streetscapes, the economics of constructing a new ducting system based upon existing infrastructure fails due to the high cost associated with the digging and trenching that is required. Moreover, existing ducting system infrastructure is often unsuitable for carrying multiple utility services, particularly those utility services that need to be isolated from one another such as electricity and water or electricity and gas. As such, the cost associated with making additions or modifications to existing ducting systems to introduce multiple utility services is likely to be cost prohibitive. In certain other cases, the use of such ducting systems may also be controlled by just a few parties, thereby creating a barrier to access for other utility companies looking to use the ducting system to supply their own services to residences or businesses. As well as impacting on competition, such control is also likely to have a negative effect on the cost of providing the services to the customer.

The present invention seeks to provide a modular ducting section adapted for laying end-to-end and a ducting system comprising two or more modular ducting sections lying end-to-end which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE INVENTION

According to a first aspect of the present invention, there is provided a modular ducting section adapted for laying end-to-end, comprising:

a base portion;

two or more side walls extending upwardly from the base portion, the base portion and the two or more side walls defining one or more open-topped utility channels adapted for carrying one or more utility lines;

an open-topped catchment channel adapted for carrying water, wherein the open-topped catchment channel is not in liquid communication with the one or more open-topped utility channels, wherein the open-topped catchment channel is defined by a catchment channel wall extending outwardly and then upwardly from a side wall of one of the one or more open-topped utility channels and a supply channel is defined by the base portion, the side wall and an underside of the catchment channel wall.

Advantageously, the modular ducting sections are designed to be installed between a pavement and a road in urban streetscapes at a depth that is level with the general level of the streetscape. This is beneficial as utility lines carrying such utility services as electricity or data/telecommunications can be located below street level thereby removing the need to install, for example, telegraph poles or electricity pylons at street level to carry such utility lines. This has the added benefit of removing such unnecessary obstacles from pavements thereby improving conditions for pedestrians. This has the further added benefit of reducing the possibility of accidents occurring as a result of vehicles colliding with telegraph poles.

Advantageously, the modular ducting sections being designed to be installed between a pavement and a road in urban streetscapes at a depth that is level with the general level of the streetscape means that they are clearly identifiable, thereby reducing the risk of breakage from other digging or trenching activities.

Advantageously, removing telegraph poles or electricity pylons from urban streetscapes increases the aesthetics of the streetscape and maintains the property value of surrounding residential or commercial properties.

Advantageously, as the one or more utility channels are open-topped utility channels, access to the one or more utility lines contained therein for, for example, maintenance or repair, or for introducing a new utility line or utility service is possible.

Advantageously, the open-topped catchment channel enables water collected as water from, for example, roadside structures and gardens, to be isolated from more contaminated water, such as road water. This is beneficial as the water can be channelled to, for example, a water storage tank or reservoir to be stored for future use.

Advantageously, the open-topped catchment channel is isolated from the one or more open-topped utility channels to prevent the water in the open-topped catchment channel from entering the one or more open-topped utility channels. This is particularly beneficial from a safety aspect where the one or more utility lines are carrying gas, electricity and data/telecommunications, such that these utilities need to be isolated from the water in the open-topped catchment channel.

Advantageously, the open-topped catchment channel is also isolated from other sources of contamination such as water from the road surface. This is beneficial as it reduces the cost of cleaning the water in the catchment channel to make it suitable for other uses.

Advantageously, the open-topped catchment channel being able to collect water from, for example, roadside structures and gardens, is beneficial as it reduces the volume of water on the streetscape or road, thereby reducing the risk of flooding and improving road safety.

Advantageously, the modular ducting section is designed to be compliant with standard road configurations to ensure that no unnecessary additional work is required to install the modular ducting sections into existing streetscape infrastructure.

Advantageously, the utility services associated with the one or more utility lines, such as gas, electricity, water, data/telecommunications, can be distributed to, for example, one or more end users via the supply channel to supply the end users with the corresponding utility services.

Advantageously, when installed in urban streetscapes, the modular ducting sections lying end-to-end are located at a depth such that an upper portion of the catchment channel wall is substantially level with the general level of the streetscape.

Preferably, the modular ducting section further comprises a road water runoff flange extending outwardly from a side wall of one of the one or more open-topped utility channels furthest from the open-topped catchment channel.

Preferably, the road water runoff flange is a sloped road water runoff flange and wherein at least a portion of an upper surface of the sloped runoff water flange is substantially sloped downwards in a direction toward the side wall of the open-topped utility channel furthest from the open-topped catchment channel.

Advantageously, the sloped road water runoff flange allows road water to be channelled along the upper surface of the sloped road water runoff flange until it reaches a storm water drain where it can be drained.

Advantageously, the profile of the road water runoff flange is designed to be compliant with a standard road configuration to ensure that no unnecessary additional work is required to install the modular ducting sections into existing streetscape infrastructure.

Preferably, the modular ducting section further comprises a main channel cover being adapted to removably engage an upper portion of the side walls of each of the one or more open-topped utility channels to substantially seal the one or more open-topped utility channels in use.

Advantageously, the one or more open-topped utility channels can be isolated from one another and from the open-topped catchment channel. This is particularly beneficial from a safety aspect where the one or more utility lines are carrying gas and electricity or water and electricity, such that these utilities need to be isolated from one another.

Advantageously, the main channel cover can be removed from the one or more open-topped utility channels to enable easy access to the one or more utility lines carried therein in case of repair or maintenance, or when a new utility line or utility service is to be introduced.

Preferably, the modular ducting section further comprises one or more catchment channel covers being adapted to removably engage an upper portion of the catchment channel wall and an upper portion of the side wall of the open-topped utility channel from which the catchment channel wall extends, wherein each of the upper portion of the catchment channel wall and the upper portion of the side wall of the open-topped utility channel from which the catchment channel wall extends, are adapted to receive respective bottom edges of the one or more catchment channel covers to substantially seal the open-topped catchment channel in use.

Advantageously, the open-topped catchment channel can be substantially sealed thereby preventing the water contained within the catchment channel from becoming contaminated with debris or road water.

Advantageously, the upper portion of the open-topped catchment channel and the upper portion of the side wall of the open-topped utility channel from which the catchment channel wall extend together form a seating recess to receive the catchment channel covers. This is beneficial as when the one or more catchment channel covers are in place, they are substantially level with an upper portion of the catchment channel wall, and therefore, substantially level with the general level of the streetscape.

Advantageously, the catchment channel covers can be mounted on or removed from the open-topped catchment channel quickly and easily. This is beneficial in the case where, for example, the open-topped catchment channel needs to be repaired or undesirable debris or contaminants need to be removed from the water contained within the open-topped catchment channel.

Preferably, the main channel cover comprises a channel cover side region defining at least one of the following:
  a kerb and a pathway in use;
  a kerb and a pathway formed as a ramp or driveway for vehicles to transition to or from an access driveway to a road in use; and
  a kerb and a pathway formed as a wheelchair transition point between the and/or the pathway to a road in use.

Advantageously, the channel cover side region of the main channel cover defines a kerb of a sufficient height to prevent, for example, road water being channelled along the road water runoff flange from overlapping the main channel cover and flooding the open-topped utility channels or contaminating the water in the open-topped catchment channel.

Preferably, the modular ducting section is pre-cast and made from concrete.

Advantageously, the modular ducting sections are made using concrete for permanent and long duration applications.

Advantageously, the modular ducting sections can be manufactured easily and reproducibly using, for example, a mould to receive the concrete mix for curing within the mould under controlled conditions.

Advantageously, pre-cast concrete cured in controlled conditions ensures increased quality of the material.

Advantageously, the modular ducting sections can be mass produced offsite.

Advantageously, the use of concrete, in particular, concrete that has low porosity to prevent concrete cancer or surface degradation (spelling) will ensure the lifetime of the modular ducting sections.

Advantageously, the modular ducting sections can be purposely designed to match the geography or streetscape layout. This is beneficial in situations where the general layout of a streetscape is non grid-like such that one or more modular ducting sections would need to be manufactured to account for, for example, curved or inclined sections of the streetscape.

Advantageously, the modular ducting sections can also be made from a moulded or extruded plastic such as polyvinyl chloride (PVC) or other suitable plastics, where the moulded plastic can be manufactured as a solid or hollow modular ducting section. This is beneficial; as when the modular ducting section has a hollow core, it can be filled with material, such as, for example, water, concrete or a resinous material, to provide structural stiffness.

Advantageously, moulded or extruded modular ducting sections can be applied to environments which may not be permanent or where cost constraints do not permit the use of concrete.

Preferably, the concrete is reinforced by one or more of the following reinforcing means:
reinforcing bars;
reinforcing grids; or
reinforcing fibres.

Advantageously, reinforcing the concrete with bars, grids or fibres will increase the rigidity of the concrete and prevent the modular ducting section from becoming damaged as a result of, for example, vibrations caused by constant heavy traffic or impacts.

Advantageously, reinforcing the concrete will increase the overall lifetime of the concrete.

Preferably, an underside of the main channel cover comprises one or more main channel cover recesses adapted to engage with the upper portion of the side walls of each of the one or more open-topped utility channels in use.

Advantageously, the main channel cover is adapted to fit flush with the upper portion of the side walls of each of the one or more open-topped utility channels.

Advantageously, the main channel covers can be mounted on or removed from the open-topped utility channels quickly and easily.

Advantageously, the use of main channel cover recesses to engage with the upper portion of the side walls of each of the open-topped utility channels ensures a good and secure seal is formed between the main channel cover and the open-topped utility channels and prevents undesirable lateral movement of the main channel cover caused by, for example, vibrations from heavy traffic or impacts.

Preferably, the modular ducting section further comprises one or more channel seal members adapted for location between the upper portion of the side walls of each of the one or more open-topped utility channels and the corresponding one or more main channel cover recesses on the underside of the main channel cover in use.

Advantageously, the use of channel seal members ensures a good and substantially secure seal is formed between the main channel cover and the open-topped utility channels. This is beneficial for preventing water or debris from entering the open-topped utility channels.

Advantageously, the channel seal members can also be used to absorb vibration caused by, for example, heavy traffic along the road, impacts, or in the event a vehicle mounts the kerb.

Preferably, the main channel cover comprises a power supply port in power communication with a power utility line carried in one of the one or more open-topped utility channels and adapted to receive a power plug in use.

Advantageously, electric vehicles, for example, can be recharged at the side of the road without needing to connect the electric vehicle to a power supply port from a roadside structure such as a residential or commercial property. This is beneficial as the power supply port is close to the electric vehicle such that there is no need to have power cables running between the roadside structure and the electric vehicle across, for example a pedestrian thoroughfare, thus ensuring the safety of pedestrians.

Preferably, an upper surface of the main channel cover comprises one or more guide protrusions for guiding a sight challenged person in use.

Advantageously, the upper surface of the main channel cover can be modified with guide protrusions to warn sight challenged persons of, for example, areas of pending danger. For example, the guide protrusions could be arranged in a continuous line running along the kerb parallel with the road so that a sight-challenged person would understand that they are close to the side of the road.

Advantageously, the one or more guide protrusions can be arranged in any one of a number of patterns on the main channel cover to indicate to sight-challenged persons that certain facilities such as, for example, a post office, a bank, a telephone box, a police station, a library, are nearby.

Preferably, the main channel cover is a sloped channel cover and wherein at least a portion of an upper surface of the sloped channel cover is substantially sloped downwards in a direction away from the open-topped catchment channel.

Advantageously, the downwardly sloped upper surface of the main channel cover away from the open-topped catchment channel and toward the road provides, for example, a driveway access for vehicles, or a ramp to allow wheelchair bound users or pedestrians pushing prams, pushchairs or other wheeled devices a smoother transition from the pavement to the road and vice versa, when crossing the road.

Advantageously, the main channel covers can be mounted on or removed from the open-topped utility channels quickly and easily. This is beneficial as it permits the easy and low cost installation of a new driveway or wheelchair ramp simply by replacing the main channel cover with a sloped channel cover and a pair of sloped corner channel covers located either side of the sloped channel cover.

Preferably, at least one of the one or more open-topped utility channels comprises an electromagnetic shield lining to shield the one or more utility lines carried therein in use.

Preferably, the electromagnetic shield lining is a conductive material lining.

Advantageously, electromagnetic shielding limits the penetration of electromagnetic fields from utility lines carrying electricity into the environment. This is beneficial in the case where utility lines carrying data/telecommunications are in close proximity to the utility lines carrying electricity.

Preferably, at least a portion of the modular ducting section is substantially curved in profile when viewed from above.

Advantageously, the modular ducting sections can be purposely designed and moulded to match the geography of the terrain or streetscape layout. This is beneficial where the streetscape is curved such as at a street corner.

Preferably, at least a portion of the main channel cover is substantially curved in profile when viewed from above.

Advantageously, the main channel covers can be purposely designed and moulded to match the geography of the terrain or streetscape layout. This is beneficial where the streetscape is curved such as at a street corner.

Preferably, at least a portion of the one or more catchment channel covers is substantially curved in profile when viewed from above.

Advantageously, the catchment channel covers can be purposely designed and moulded to match the geography of the terrain or streetscape layout. This is beneficial where the streetscape is curved such as at a street corner.

Preferably, at least a portion of the modular ducting section is substantially curved in profile when viewed from the side.

Advantageously, the modular ducting sections can be purposely designed and moulded to match the geography of the terrain or streetscape layout. This is beneficial where the streetscape has a change in gradient.

Preferably, at least a portion of the main channel cover is substantially curved in profile when viewed from the side.

Advantageously, the main channel covers can be purposely designed and moulded to match the geography of the terrain or streetscape layout. This is beneficial where the streetscape has a change in gradient.

Preferably, at least a portion of the one or more catchment channel covers is substantially curved in profile when viewed from the side.

Advantageously, the catchment channel covers can be purposely designed and moulded to match the geography of the terrain or streetscape layout. This is beneficial where the streetscape has a change in gradient.

Preferably, the modular ducting section further comprises a service distribution box adjacent to the open-topped catchment channel, wherein the base portion comprises one or more service channels extending from the one or more open-topped utility channels to the service distribution box, an extension of each of the one or more utility lines passing from the one or more open-topped utility channels into the service distribution box via the one or more service channels in use.

Advantageously, the extension of each of the one or more utility lines connects the one or more utility lines from the corresponding one or more open-topped utility channels to the service distribution box via the one or more service channels.

Advantageously, the one or more service channels are isolated from one another, such that in use, the extensions of the one or more utility lines extending from the one or more open-topped utility channels to the service distribution box remain isolated from one another.

Advantageously, the utility services associated with the one or more utility lines, such as electricity, gas, water, data/telecommunications, can be distributed to, for example, one or more end users via the supply line to supply the end users with the corresponding utility services.

Advantageously, in the case where an end user has a means for generating renewable energy such as, for example, solar panels, a wind turbine, a water turbine, any excess energy generated by these renewable energy sources that is not being used by the end user, can be fed back to the corresponding utility line in the open-topped utility channel via the supply line and thus back into the power grid. This is beneficial as the end user can reduce the cost of their energy bill for the electricity they receive from a utility supplier by not only limiting the amount of electricity they draw from the supplier, but also by being able to effectively "sell back" to the supplier the excess energy they have generated themselves from the renewable energy sources. This is also beneficial as such renewable energy can be locally networked to provide power to the local community.

Advantageously, the service distribution box can comprise one or more isolation switches to enable a service engineer or any other authorized person to isolate one or more of the utilities. For example, in the event of a gas leak, the gas supply can be isolated at the service distribution box.

Advantageously, the service distribution box can comprise one or more utility meters to enable, for example, a service engineer, to monitor the status of the utility. For example, the utility meter could be a gas meter to enable the service engineer to monitor the gas pressure.

Preferably, the service distribution box comprises one or more service ports.

Advantageously, in the case where the one or more utility lines are gas and electricity lines or water and electricity lines, and these utilities need to be isolated from one another for safety reasons, the extensions of the one or more utility lines can be directed into separate service ports to retain their isolation from one another. In this case, the One or more utility lines that need to be isolated are best directed from the corresponding open-topped utility channels through the one or more dedicated service channels to the corresponding one or more service ports in the service distribution box.

Preferably, the sloped road water runoff flange is adapted to receive a storm water grate of a storm water drain, and wherein at least a portion of the upper surface of the sloped runoff water flange is substantially sloped downwards in a direction toward the storm water grate.

Advantageously, the sloped road water runoff flange is adapted such that the modular ducting section can be installed at locations with pre-existing storm water drains, such that the existing infrastructure can be used without incurring additional and unnecessary cost to install a new drainage system.

Advantageously, the surface of the sloped road water runoff flange is sloped downwards in the direction of the storm water grate of the storm water drain such that road water runoff is channelled along the upper surfaces of the road water runoff flanges of the modular ducting sections lying end-to-end and directed into the pre-existing storm water grate.

Preferably, the modular ducting section further comprises a catchment channel overflow aperture located in the catchment channel wall and a catchment channel overflow pipe having one end engaged with the catchment channel overflow aperture for draining water from the open-topped catchment channel to the storm water drain in use.

Advantageously, in the event of, for example, a heavy rainfall, where a large volume of water is captured from one or more nearby roadside structures and channelled into the open-topped catchment channel, the level of water can be eased by transferring the excess water from the open-topped catchment channel to, for example, a storm water drain, via the catchment channel overflow pipe.

Advantageously, the catchment channel overflow aperture can be set at any height in the catchment channel wall. This will be beneficial in areas where there is a higher than average annual rainfall.

Preferably, the modular ducting section further comprises a utility channel drainage aperture located in a bottom portion of at least one of the one or more open-topped utility channels and a utility channel drainage pipe having one end engaged with the utility channel drainage aperture for draining water from the at least one of the one or more open-topped utility channels to the storm water drain in use.

Advantageously, in the event of, for example, a heavy rainfall, where road water runoff enters into the one or more open-topped utility channels, the level of water can be eased by transferring the excess water from the one or more open-topped utility channels to a storm water drain via the utility channel drainage pipe.

Preferably, the modular ducting section further comprises a catchment channel drainage aperture located in a bottom portion of the open-topped catchment channel and a catchment channel drainage pipe having one end engaged with the catchment channel drainage aperture for draining water from the open-topped catchment channel in use.

Advantageously, in the event of, for example, a heavy rainfall, where a large volume of water is captured from one or more nearby roadside structures and channelled into the open-topped catchment channel, the level of water can be eased by transferring the excess water from the open-topped catchment channel to, for example, a water storage tank or reservoir for future use.

Preferably, the modular ducting section further comprises a link region, wherein the base portion comprises one or more link channels extending from the one or more open-topped utility channels in the link region and terminating in one or more apertures in the side wall of the open-topped utility channel from which the road water runoff flange extends outwardly from, an extension of each of the one or more utility lines passing from the one or more open-topped utility channels to the one or more apertures via the one or more link channels in use.

Advantageously, the extension of each of the one or more utility lines can be carried from the one or more open-topped utility channels to the one or more apertures and allowed to pass therethrough.

Advantageously, the one or more link channels are isolated from one another, such that in use, the extensions of the one or more utility lines passing from the one or more open-topped utility channels to the one or more apertures via the one or more link channels remain isolated from one another.

Preferably, the one or more open-topped utility channels are two or more open-topped utility channels.

Advantageously, at least one of the two or more open-topped utility channels is located between two open-topped utility channels or between an open-topped utility channel and the open-topped catchment channel. This is beneficial where the at least one open-topped utility channel has channels located either side of the at least one open-topped utility channel to collect any water or debris that might emanate from road water runoff or from flooding to prevent or at least reduce the possibility of the at least one open-topped utility channel from becoming flooded. As such, the at least one open-topped utility channel can be designated to carry one or more utility lines that need to be isolated from water.

According to a second aspect of the present invention, there is provided a ducting system comprising two or more modular ducting sections of the first aspect of the present invention lying end-to-end, wherein the corresponding one or more open-topped utility channels, the open-topped catchment channel, the supply channel, and the road water runoff flange of the two or more modular ducting sections are substantially aligned.

Advantageously, the corresponding one or more open-topped utility channels of the two of more modular ducting sections are connected, extending the lengths of the one or more open-topped utility channels. This allows the one or more open-topped utility channels to carry one or more utility lines that have lengths larger than a single modular ducting section continuously.

Advantageously, the open-topped catchment channels of the two or more modular ducting sections are connected allowing the water, carried within the open-topped catchment channel, to flow continuously from one modular ducting section to another. Furthermore, the length of the open-topped catchment channel is extended further than the length of a single modular ducting section, increasing the range the water can travel.

Advantageously, the supply channels of the two of more modular ducting sections are connected, extending the lengths of the supply channels. This allows the supply channels to carry the one or more supply lines that have lengths larger than a single modular ducting section continuously.

Advantageously, the road water runoff flange of the two or more modular ducting sections are connected allowing the road water to flow continuously from one modular ducting section to another. Furthermore, the length of the road water runoff flange is extended further than the length of a single modular ducting section, allowing the road water to reach the storm water drain located at further distances.

Preferably, the two or more modular ducting sections are removably coupled to each other via one or more joining members.

Advantageously, the two or more modular ducting sections are coupled together to prevent them from moving apart and to thus keep the one or more open-topped utility channels, open-topped catchment channel, and supply channel of the two or more modular ducting sections substantially aligned. This will be beneficial to prevent the one or more utility lines in the open-topped utility channels from becoming trapped between, for example, adjacent pairs of modular ducting sections or severed as a result of undesirable movement of the modular ducting sections. This will also be beneficial to prevent the substantially aligned open-topped catchment channels of the two or more modular ducting sections from becoming displaced from one another causing water to leak out of the open-topped catchment channel.

Preferably, the ducting system further comprises ducting section gaskets being adapted for location between facing ends of adjacent pairs of modular ducting sections.

Advantageously, the ducting section gaskets ensure a good seal is formed between the adjacent pairs of modular ducting sections to prevent the substantially aligned open-topped catchment channels of the two or more modular ducting sections from becoming displaced from one another causing water to leak out of the open-topped catchment channel.

Advantageously, any movement of the two or more modular ducting sections caused by, for example, heavy machinery, or traffic, can be absorbed by the ducting section gaskets to prevent the adjacent pairs of modular ducting sections from becoming displaced or misaligned.

Advantageously, the ducting section gaskets prevent the facing ends of the adjacent pairs of modular ducting sections from becoming damaged due to wear caused by the two facing ends rubbing against one another.

Advantageously, the ducting section gaskets reduce undesirable cracking of any of the two or more modular ducting sections by allowing for thermal expansion of the modular ducting sections. This is particularly beneficial in environments prone to high temperatures.

Preferably, the ducting section gaskets comprise one or more ducting section locating lugs on each side and the facing ends of the adjacent pairs of modular ducting sections each comprise one or more ducting section recesses to receive the one or more ducting section locating lugs of the corresponding side of one of the ducting section gaskets therein for positively locating the ducting section gasket between the facing ends of the adjacent pairs of modular ducting sections.

Advantageously, the one or more ducting section locating lugs ensure that the ducting section gasket is held in place between the facing ends of adjacent pairs of modular ducting sections.

Preferably, the ducting system further comprises main channel cover gaskets adapted for location between facing ends of adjacent pairs of main channel covers.

Advantageously, the main channel cover gaskets between adjacent pairs of main channel covers ensure a good seal is formed between the main channel covers to prevent water and other debris from contaminating the one or more open-topped utility channels of the two or more modular ducting sections.

Preferably, each of the main channel cover gaskets comprises one or more main channel cover locating lugs on each side and the facing ends of the adjacent pairs of main channel covers each comprise one or more main channel cover lug recesses to receive the one or more main channel cover locating lugs of the corresponding side of one of the main channel cover gaskets therein for positively locating the main channel cover gasket between the facing ends of the adjacent pairs of main channel covers.

Advantageously, the one or more main channel cover locating lugs ensure that the main channel cover gasket is held in place between the facing ends of adjacent pairs of main channel covers.

Preferably, each of the ducting section gaskets is generally wedge-shaped in cross-section, such that in use, the adjacent pairs of modular ducting sections lying end-to-end define a bend.

Advantageously, the ducting section gaskets can be purposely designed and moulded to fit between adjacent pairs of modular ducting sections such that the adjacent pairs of modular ducting sections lying end-to-end can conform to the geography of the terrain or streetscape layout.

Advantageously, where the terrain is undulating, the ducting section gaskets being wedge-shaped can be located between adjacent pairs of modular ducting sections in a substantially upward or downward configuration depending on the geography of the terrain that is required to be replicated.

Advantageously, where the streetscape layout comprises a step or stairs arrangement, the adjacent pairs of modular ducting sections lying end-to-end can be located along the side of the stairs and arranged so that they follow the general slope of the stairs. In this case, the ducting section gaskets will again be shaped in the form of a wedge and located between the adjacent pairs of modular ducting sections in a substantially upward or downward configuration depending on the slope of the stairs that is required to be replicated. This will be beneficial to, for example, cyclists, who can use the modular ducting sections lying end-to-end as a ramp for pushing the cycle up or down the stairs.

Advantageously, where the streetscape layout comprises one or more curves, the one or more ducting section gaskets can again be shaped in a wedge, but this time oriented such that the widest portion of the wedge is closest to the catchment channel or the road water runoff flange depending on the direction of the curve that is required to replicate the streetscape layout.

Preferably, each of the main channel cover gaskets is generally wedge-shaped in cross-section, such that in use, the adjacent pairs of main channel covers lying end-to-end define a bend.

Advantageously, the one or more main channel cover gaskets can be purposely designed and moulded to fit within the two or more main channel covers to match the geography of the terrain or streetscape layout.

Advantageously, where the terrain is undulating, the one or more main channel cover gaskets can be shaped in the form of a wedge which can be located between two main channel covers in a substantially upward or downward configuration depending on the geography of the terrain that is required to be replicated.

Advantageously, where the streetscape layout comprises one or more curves, the one or more main channel cover gaskets can again be shaped in a wedge, but this time oriented such that the widest portion of the wedge is closest to the catchment channel or the road water runoff flange depending on the direction of the curve that is required to replicate the streetscape layout.

Preferably, the two or more modular ducting sections form a first closed ducting loop.

Preferably, at least one of the two or more modular ducting sections in the first closed ducting loop is a modular ducting section comprising a link region as described in a preceding paragraph.

Advantageously, the at least one link region in the first closed ducting loop provides a means to connect the first closed ducting loop to a second closed ducting via the link region in the second closed ducting loop.

Preferably, the ducting system further comprises one or more subsurface modular ducting sections each comprising one or more open-topped utility link channels, the one or more subsurface modular ducting sections adapted for laying end-to-end to form a series of subsurface modular ducting sections, wherein a first end of the series of subsurface modular ducting sections is adapted to connect to and substantially align with the one or more apertures in the link region of the first closed ducting loop, and a second end of the series of subsurface modular ducting sections is adapted to connect to and substantially align with the one or more apertures in a link region of a second closed ducting loop to form an interconnected network of closed ducting loops.

Preferably, the ducting system further comprises a subsurface channel cover being adapted to removably engage an upper portion of a side wall of each of the one or more open-topped utility link channels of the subsurface modular ducting section to substantially seal the one or more open-topped utility link channels in use.

Advantageously, when the subsurface channel cover is in place, the one or more open-topped utility link channels are effectively isolated from one another.

Advantageously, the subsurface channel cover can be removed to enable, for example, a service engineer to access the open-topped utility link channels in the case where maintenance or repair is required, or when a new utility line or utility service is to be introduced.

Preferably, an underside of the subsurface channel cover comprises one or more subsurface channel cover recesses adapted to engage with an upper portion of each of the side walls of the one or more open-topped utility link channels of the subsurface modular ducting section in use.

Advantageously, the one or more subsurface channel cover recesses enable the subsurface channel cover to be returned to its correct location on the corresponding subsurface modular ducting section if it has been removed for a particular reason, for example, maintenance or repair, or when a new utility line or utility service is to be introduced.

Preferably, the ducting system further comprises a utility access box having a base portion and two pairs of opposing end walls extending upwardly from the base portion, wherein the utility access box is adapted for location between facing ends of an adjacent pair of subsurface modular ducting sections in the series of subsurface modular ducting sections, the utility access box comprising one or more open-topped utility access channels, such that in use, the one or more open-topped utility access channels of the utility access box and the one or more open-topped utility link channels of the adjacent pair of subsurface modular ducting sections are substantially aligned.

Advantageously, when the utility access box is installed, the upper portions of the two pairs of opposing end walls of the utility access box are substantially level with the general level of the road surface thus providing an access point to the one or more utility access channels without needing to dig up the corresponding portion of road.

Preferably, the ducting system further comprises a utility access cover being adapted to removably engage with an upper portion of the side walls of each of the one or more open-topped utility access channels.

Advantageously, when the utility access cover is in place, it is substantially level with the general level of the road surface.

Advantageously, the installation of the ducting system at the kerb not only leverages the space coincident with the kerb, but by doing so, it effectively bypasses or avoids existing utility access systems, thereby providing a unique opportunity for cost effective installation of utility services in direct competition with the existing utility access systems.

Advantageously, the co-location of utility services such as power, data transmission, gas, and water allows for low-cost installation and delivery of the utility services to end users.

Advantageously, the ducting system provides an economy of scale whereby the application of this system to a wide range of existing utility services and future utility services results in cost advantages due to possible expansion.

Preferably, the one or more utility lines carried in the one or more open-topped utility channels of the two or more modular ducting sections in the closed ducting loops of the interconnected network of closed ducting loops are adapted to supply to an end user any one of the following types of utility service; power, gas, water and data/telecommunications.

Advantageously, the ducting system is able to provide a conduit for most utilities that are required in a typical residential or commercial setting.

Preferably, the one or more utility lines adapted to supply the data/telecommunications utility service include any one of the following types of utility lines; copper cable, optical fibre cable or coaxial cable.

Advantageously, the ducting system is able to house any type of data/telecommunication line and also facilitate a relatively simple and economical roll-out. Other aspects of the invention are also disclosed.

Preferably, water within the substantially aligned open-topped catchment channels of the two or more modular ducting sections lying end-to-end in use is isolated from water captured from the substantially aligned road water runoff flanges of the two or more modular ducting sections in use.

BRIEF DESCRIPTION OF THE DRAWINGS

Notwithstanding any other forms which may fall within the scope of the present invention, preferred embodiments of the invention will now be described, by way of example only, with reference to the accompanying drawings in which:

FIG. 4 is (i) a side view of the modular ducting section of FIG. 2 installed at a kerbside of a street, and (ii) a magnified view of FIG. 4 (i);

FIG. 5 is a perspective view (i), an end view (ii) and top view (iii) of the main channel cover of FIG. 2;

FIG. 8 is (i) a perspective view of the first sloped corner cover and (ii) a perspective view of the second sloped corner cover shown as part of FIG. 6;

FIG. 10 is (i) a top view of the modular ducting section of FIG. 1 wherein the modular ducting section is substantially parallelogram in shape when viewed from above and (ii) is a cross-sectional view of the modular ducting section of FIG. 10 (i) across line B-B;

FIG. 11 is (i) a perspective view, and (ii) is an end view of the modular ducting section of FIG. 1 further comprising a main channel cover, one or more catchment channel covers and a removably mounted retainer wall;

FIG. 12 is a perspective view of the modular ducting section of FIG. 1 further comprising a main channel cover, one or more catchment channel covers and a pavement cover in (i) assembled form and (ii) exploded form, and (iii) is an end view of the modular ducting section of FIG. 12 (i);

FIG. 13 is (i) a perspective view, and (ii) is an end view of the modular ducting section of FIG. 1 being substantially narrow having a single open-topped utility channel and further comprising a main channel cover and one or more catchment channel covers;

FIG. 14 is (i) a perspective view of the modular ducting section of FIG. 1 further a service distribution box adjacent to the open-topped catchment channel, the service distribution box comprising one or more service ports, and (ii) a top view of the service distribution box comprising service port covers;

FIG. 15 is (i) a front view of the modular ducting section of FIG. 14 further comprising a cabinet, the cabinet comprising one or more utility service distribution boards, (ii) is a cross-sectional view across line C-C of FIG. 15 (i), (iii) is a cross-sectional view across line A-A of FIGS. 15(i), and (iv) is a cross-sectional view across line B-B of FIG. 15(i);

FIG. 16 is (i) a perspective view of the modular ducting section of FIG. 15, and (ii) is a perspective view of the one or more utility service distribution boards, one or more utility lines and one or more isolation valves inside the modular ducting section of FIG. 16 (i);

FIG. 17 shows perspective views of the modular ducting section of FIG. 2 in (i) assembled form, and (ii) exploded form, further comprising a catchment channel overflow aperture located in a catchment channel wall of the open-topped catchment channel and a catchment channel overflow pipe having one end engaged with the catchment channel overflow aperture and another end adapted to engage with a storm water drain, wherein the road water runoff flange is adapted to receive a storm water grate of the storm water drain;

FIG. 18 is (i) a top view, (ii) a back view, and (iii) an end view of the modular ducting section of FIG. 17;

FIG. 19 is (i) a perspective view of the modular ducting section of FIG. 1 further comprising a catchment channel drainage aperture located in a bottom portion of the open-topped catchment channel, (ii) a perspective view of a drainage grille adapted for location in the catchment channel drainage aperture, and (iii) a front end view of the drainage grille;

FIG. 20 is a perspective view of the modular ducting section of FIG. 19 in (i) assembled form, and (ii) exploded form, further comprising the main channel cover, the one or more catchment channel covers, the supply line, the return line and the junction box of FIG. 2;

FIG. 21 is (i) a perspective view (in exploded form) of a modular ducting section of FIG. 2, further comprising a link region (not shown), wherein the base portion comprises one or more link channels extending from the one or more open-topped utility channels in the link region and terminating in one or more apertures in the side wall of the open-topped utility channel from which the road water runoff flange extends outwardly from, (ii) a front view of the one or more link channels and one or more apertures in the side wall of one of the one or more open-topped utility channels, and (iii) is a cross-sectional view of the link region along one of the one or more link channels across line A-A of FIG. 21 (ii);

FIG. 22 is (i) a perspective view of the modular ducting section of FIG. 2 further comprising an end user open sided supply channel having a first end adapted for connecting to the supply line via an end user channel connector and the junction box and a second end adapted for connecting to an end user supply box, and (ii) a perspective view, (iii) a top view, (iv) a front view and (v) a side view of the modular ducting section showing the end user channel connector connected to the junction box;

FIG. 23 is (i) a perspective view, (ii) a top view, (iii) a front view, and (iv) an end view of the end user channel connector connected to the junction box of FIG. 22;

FIG. 24 is (i) a perspective view, and (ii) a side view of the end user supply channel, of FIG. 22, wherein the end user supply channel comprises one or more open-topped supply ducting sections adapted for laying end-to-end, and one or more supply ducting covers;

FIG. 25 is (i) a perspective view, (ii) a top view, (iii) a side view, and (iv) an end view of a first modular ducting section of the one or more open-topped supply ducting sections of the end user supply channel of FIG. 24;

FIG. 26 is (i) a perspective view, (ii) a top view, (iii) a side view, and (iv) an end view of a central modular ducting section of the one or more open-topped supply ducting sections of the end user supply channel of FIG. 24;

FIG. 27 is (i) a perspective view, (ii) a top view, (iii) a side view, and (iv) an end view of an end modular ducting section of the one or more open-topped supply ducting sections of the end user supply channel of FIG. 24;

FIG. 28 is (i) a perspective view, (ii) a top view, (iii) a rear view, (iv) a side view, and (v) an front view of the supply ducting cover of FIG. 24;

FIG. 32 is a (i) a perspective view, (ii) a top view, (iii) an enlarged top view, and (iv) a front view of a ducting section gasket adapted for location between facing ends of adjacent pairs of modular ducting sections of the two or more modular ducting sections of FIG. 30, the ducting section gasket comprising one or more ducting section locating lugs on each side;

FIG. 33 is (i) an end view of one of the modular ducting sections of FIG. 30 comprising one or more ducting section recesses to receive the one or more ducting section locating lugs of the corresponding side of the ducting section gasket of FIG. 32, and (ii) an end view of one of the modular ducting sections of FIG. 2(*i*) comprising one or more ducting section recesses to receive the one or more ducting section locating lugs of the corresponding side of the ducting section gasket of FIG. 32;

FIG. 34 is a (i) a perspective view, (ii) a front view, and (iii) a top view of a sloped corner cover gasket comprising one or more sloped corner cover locating lugs.

FIG. 37 is (i) a perspective view of an end user linked to the to the second closed ducting loop of FIG. 36 via an end user supply channel, (ii) a perspective view of one of the two or more modular ducting sections of FIG. 30 further comprising a service distribution box and one of the two or more modular ducting sections further comprising a catchment channel overflow aperture located in a catchment channel wall of the open-topped catchment channel and a catchment channel overflow pipe having one end engaged with the catchment channel overflow aperture and another end adapted to engage with a storm water drain, wherein the road water runoff flange is adapted to receive a storm water grate of the storm water drain, (iii) a perspective view of one of the two or more modular ducting sections of FIG. 30 further comprising a main channel cover comprising a power supply port in power communication with a power utility line carried in one of the one or more utility channels, the power supply port adapted to provide a means to recharge an electric vehicle;

FIG. 38 is (i) a perspective view of a section of the first closed ducting loop of FIG. 36, and (ii) is a perspective view of one or more utility lines of the section of FIG. 38 (i);

FIG. 39 is a (i) perspective view, (ii) a top view, and (iii) an end view of one of one or more subsurface modular ducting sections comprising one or more open-topped utility link channels, the one or more subsurface modular ducting sections being adapted for laying end-to-end to form a series of subsurface modular ducting sections, wherein a first end of the series of subsurface modular ducting sections is adapted to connect to a link region of the first closed ducting loop of FIG. 36, and a second end of the series of subsurface modular ducting sections is adapted to connect to a link region of the second closed ducting loop of FIG. 36;

FIG. 40 is (i) an end view, (ii) a top view, and (iii) a side view of the subsurface modular ducting section of FIG. 39;

FIG. 41 is (i) a top view and (ii) an end view of a subsurface channel cover comprising one or more subsurface channel cover recesses adapted to engage with an upper portion of each of side walls of the one or more open-topped utility link channels of the subsurface modular ducting section of FIG. 39;

FIG. 42 is (i) a perspective view, (ii) a top view, and (iii) an end view of a utility access box having a base portion and two pairs of opposing end walls extending upwardly from the base portion, the utility access box further comprising a utility access cover, wherein the utility access box is adapted for location between facing ends of an adjacent pair of subsurface modular ducting sections in the series of subsurface modular ducting sections of FIG. 39, the utility access box comprising one or more open-topped utility access channels, such that in use, the one or more open-topped utility access channels of the utility access box and the one or more open-topped utility link channels of the adjacent pair of subsurface modular ducting sections are substantially aligned;

FIG. 43 is (i) a perspective view and (ii) side view of a link between the second closed ducting loop and third closed ducting loop of FIG. 36; and FIG. 44 is (i) a perspective view of a section of the second closed ducting loop showing the one or more utility lines, one or more utility service distribution boards and a water storage tank of FIG. 36, and (ii) is a perspective close up view of the one or more utility service distribution boards of FIG. 44 (i).

DETAILED DESCRIPTION OF SPECIFIC EMBODIMENTS

Figure 1:
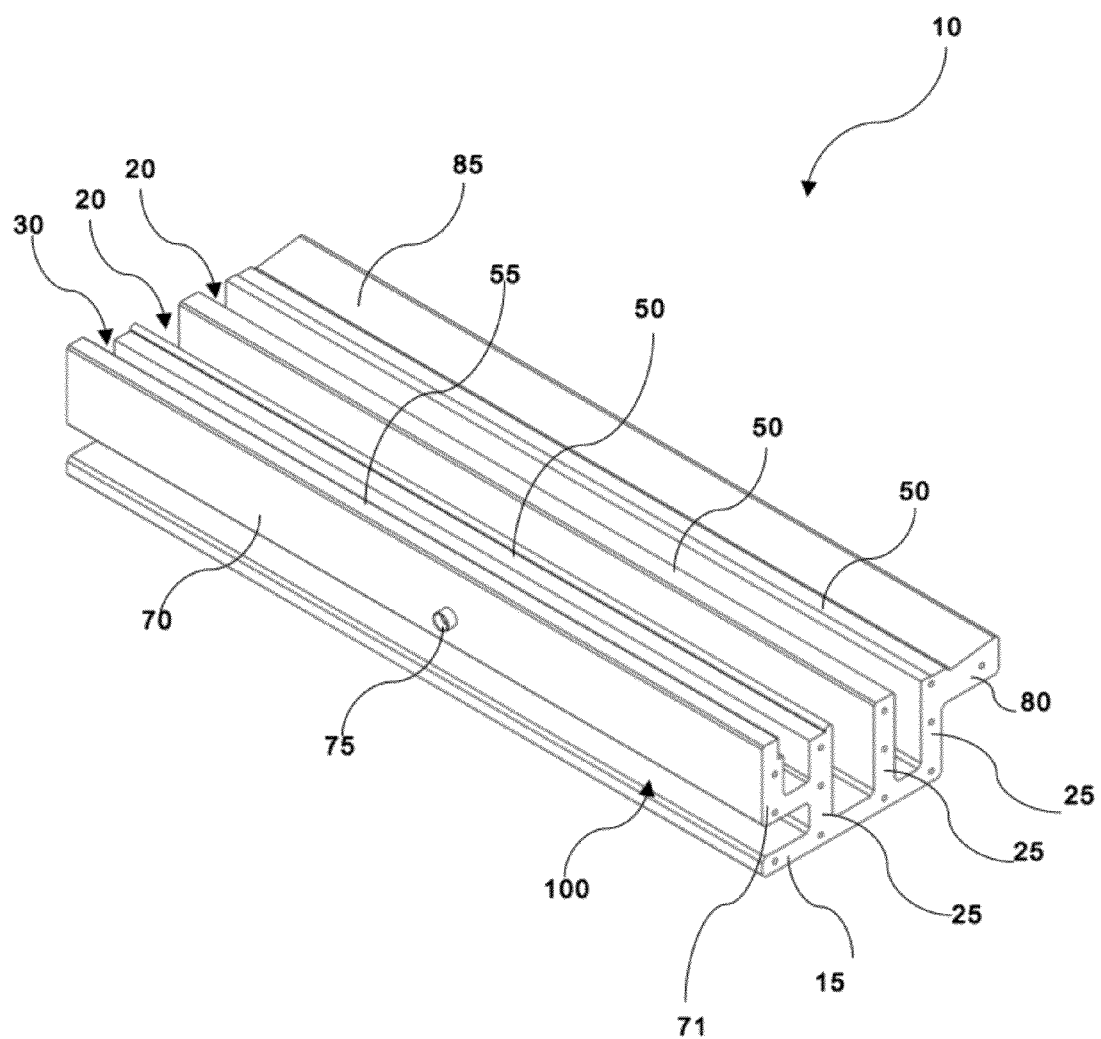
FIG. 1 is a perspective view of a modular ducting section adapted for laying end-to-end comprising one or more open-topped utility channels and an open-topped catchment channel, a road water runoff flange and an open sided supply channel in accordance with a preferred embodiment of the present invention.

It should be noted in the following description that like or the same reference numerals in different embodiments denote the same or similar features.

Referring specifically to FIG. 1, a modular ducting section 10 adapted for laying end-to-end in accordance with a first embodiment of the present invention is provided comprising a base portion 15 and two or more side walls, generally given the reference numeral 25, extending upwardly from the base portion 15. The base portion 15 and the two or more side walls 25 defining one or more open-topped utility channels 20 adapted for carrying one or more utility lines (not shown). The modular ducting section 10 further comprising an open-topped catchment channel 30 adapted for carrying water, wherein the open-topped catchment channel 30 is not in liquid communication with the one or more open-topped utility channels 20. In this embodiment, and as shown in FIG. 1, the two or more side walls 25 are three side walls 25; however, it will be appreciated that in other embodiments, the number of side walls 25 may be of any number depending on the number of open-topped utility channels 20 required. In this embodiment, the open-topped utility channels 20 are adapted to carry any one of a number of utility lines associated with the range of services provided by one or more utility suppliers. For example, utilities such as gas, electricity, water, and data/telecommunications, and pay TV, can be carried in one or more of the one or more open-topped utility channels 20 from the utility supplier to an end user such as a residential or commercial property, or a public service. It will be appreciated that the one or more open-topped utility channels 20 may be of any dimension to suit a particular application. For example, each of the one or more open-topped utility channels 20 may be designed to carry one utility line or several utility lines. In the case where several utility lines are carried in a single utility channel 20, these lines may be laid at the bottom of the open-topped utility channel 20, or mounted to an inner wall of the open-topped utility channel 20 using, for example, cable mounts or brackets (not shown), such that each utility line is more easily identifiable and accessible. This will be advantageous in situations where each of a number of utility lines in a single open-topped utility channel 20 belong to different utility suppliers. The height of the side walls 25 is also largely dependent on the layout of the streetscape and the depth to which the modular ducting sections 10 are to be installed.

Figure 2:
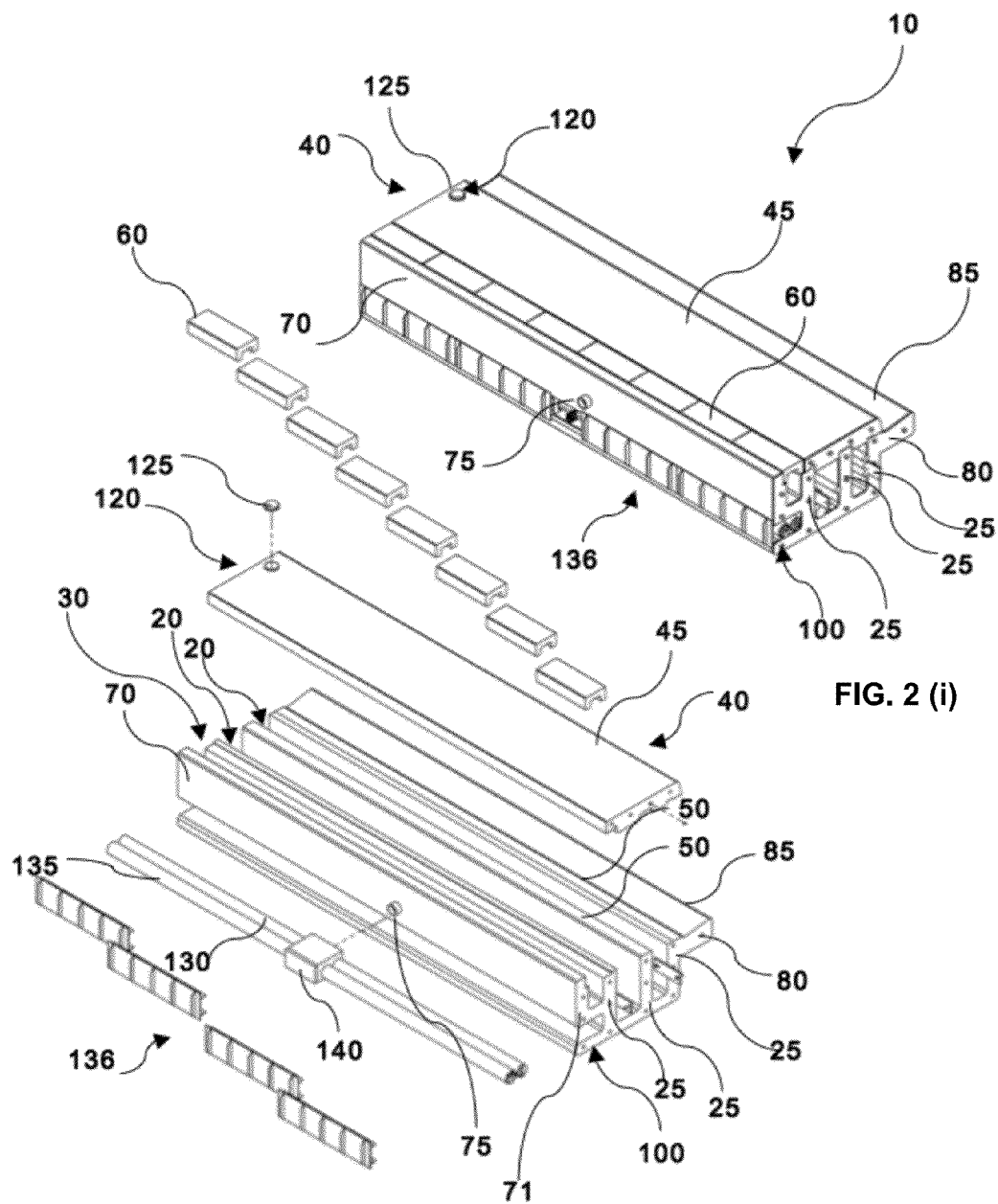
FIG. 2 is a perspective view of the modular ducting section of FIG. 1, further comprising a main channel cover, one or more catchment channel covers, one or more supply channel covers and a supply line, a return line and junction box adapted for location in the open sided supply channel, in (i) assembled form and in (ii) exploded form.
Figure 3I:
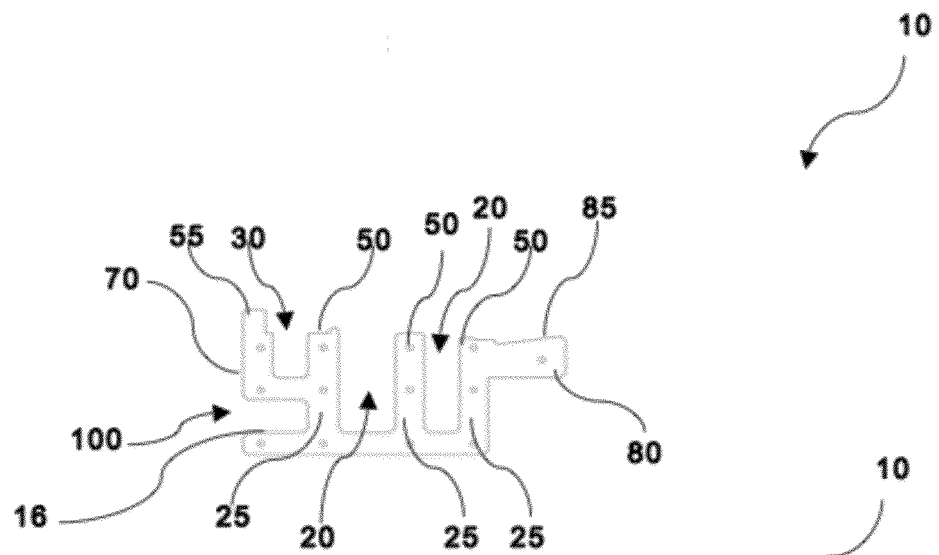
FIG. 3 is (i) an end view of the modular ducting section of FIG. 1, (ii) an end view of the modular ducting section of FIG. 2 (i), and (iii) a perspective view of the one or more open sided supply channel covers of FIG. 2.
Figure 3:
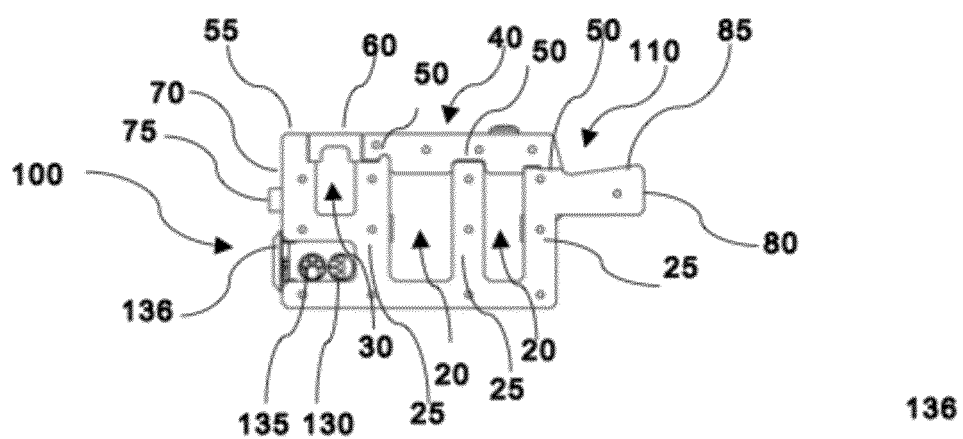

As shown in FIGS. 1, 2 and 3 (i and ii), the open-topped catchment channel 30 is defined by a catchment channel wall 70 extending outwardly and then upwardly from a side wall 25 of one of the one or more open-topped utility channels 20 and an open sided supply channel 100 is defined by the base portion 15, the side wall 25 and an underside 71 of the catchment channel wall 70. The open sided supply channel 100 is disposed below the open-topped catchment channel 30 and is adapted to carry a supply line 130. In this embodiment, the open sided supply channel 100 is accessible from the side of the modular ducting section 10 such that maintenance or repair to the supply line 130 can be carried out without first having to remove the modular ducting section 10 from the ground or make substantial excavation.

In this embodiment, and as shown in FIGS. 2 and 3 (i and ii), the open sided supply channel 100 is adapted to removably receive one or more open sided supply channel covers 136 for precluding the introduction of contaminants into the open sided supply channel 100 in use. As shown in FIG. 3 (iii), each of the one or more open sided supply channel covers 136 comprises a plate 137 being of length of a portion of the length of the open sided supply channel 100 in the longitudinal axis of the modular ducting section 10, such that in use, the one or more supply channel covers 136 lying end-to-end substantially encloses the supply channel 100. The plate 137 is of a height such that a top portion 143 and a bottom portion 144 of the plate 137 extend slightly beyond a top surface 16 of the base portion 15 of the modular ducting section 10 and the underside 71 of the catchment channel wall 70, respectively, such that in use, the plate 137 overlaps the open sided supply channel 100 to prevent any contaminants entering the open sided supply channel 100 in use.

The plate 137 comprises a first face (not shown) being adapted to removable engage the open sided supply channel 100, and a second face 142 facing outwardly from the supply channel 100 in use The first face of the plate 137 comprises a pair of substantially horizontal flanges 138, 138' extending outwardly from the first face of the plate 137 and being substantially spaced apart by the same height as from the top surface 16 of the base portion 15 to the underside 71 of the catchment channel wall 70. Each of the horizontal flanges 138, 138' comprises one or more flange protrusions 139 disposed substantially at a distal end of the horizontal flanges 138, 138'. The horizontal flange 138, which is located at the top portion 143 of the plate 137 has the one or more flange protrusions 139 extending upwardly from the flange 138, and the horizontal flange 138' located at the bottom portion 144 of the plate 137 has the one or more flange protrusions 139 extending downwardly from the flange 138'. The top surface 16 of the base portion 15 and the underside 71 of the catchment channel wall 70, comprise one or more flange recesses (not shown) corresponding to the one or more flange protrusions 139 on the pair of substantially horizontal flanges 138, 138', such that in use, the pair of substantially horizontal flanges 138, 138' are inserted into the supply channel 100 and the one or more flange protrusions 139 are removably received into the one or more flange recesses. The one or more flange protrusions 139, once received into the one or more flange recesses, ensure that the supply channel cover 136 is held in place, until such time as when, for example, a service engineer is required to perform repair or maintenance to the supply line 130, or introduce a new utility service in the supply channel 100. The plate 137 further comprises one or more substantially vertical ribs 141 disposed on the second face 142 of the plate 137 along the length of the plate 137. The one or more substantially vertical ribs 139 provide strength and rigidity to the plate 137.

In this embodiment, the supply channel cover 136 is constructed from a polymer that is corrosion resistant and economic to manufacture, such as polyvinyl chloride (PVC) and high-density polyethylene (HDPE). It will be appreciated that the supply channel cover 136 is not limited to being manufactured from a polymer, but may be constructed from any suitable material that provides the corrosion resistant properties, including, but not limited to, any one or more of the following: copper alloy, brass, stainless steel.

In one embodiment, and as shown in FIG. 4(i), the modular ducting sections 10 lying end-to-end are designed to be installed alongside, and running substantially parallel to, a road as kerb sections. For example, in an urban streetscape comprising residential housing, the modular ducting sections 10 are preferably installed so that they lay end-to-end between, and running substantially parallel to, the road and a pavement. As shown in FIG. 4(ii), the modular ducting sections 10 are installed to a depth such that an upper portion 55 of the catchment channel wall 70 is substantially level with the general level of the pavement. It will be appreciated that in this embodiment, the modular ducting sections 10 are designed to be compliant with a standard road configuration to ensure that no unnecessary additional work is required to install the modular ducting sections 10 into existing streetscape infrastructure.

It will also be appreciated that the modular ducting sections 10 being designed to be installed between a pavement and a road in urban streetscapes at a depth that is level with the general level of the streetscape means that they are clearly identifiable, thereby reducing the risk of breakage from other digging or trenching activities.

The open-topped catchment channel 30 is adapted to carry water that has been collected from various sources from along the road where the modular ducting sections 10 lying end-to-end, include, but are not limited to, any one or more of the following end users: residential and commercial properties (not shown) or gardens and parks. In one example, and referring specifically to FIGS. 1 and 4, rainwater collected in roof guttering of a residential property located in a street having modular ducting sections 10 lying end-to-end along a pavement is directed down a drainpipe and channelled from the drainpipe to the open-topped catchment channel 30 of the modular ducting sections 10 via a water inlet aperture 75 located in, and passing through the catchment channel wall 70 into the open-topped catchment channel 30. The collected rainwater, or catchment water, in the open-topped catchment channel 30 is essentially clean and uncontaminated water that can be re-used for any one of a number of activities including, but not limited to: watering gardens, washing vehicles. In another example, the catchment water could also be channelled to a purification plant for purifying and then channelled back to end users as potable water. In this case, the potable water could be presented at one or more drinking fountains or at a vending machine whereby end users could purchase the water. The vending machine could be adapted to provide a vessel for the end user to purchase to carry the water in, or alternatively, the end user could provide their own vessel. This is beneficial as it would provide a means to reduce the amount of bottled water being sold, and reduce the number of plastic bottles, for example, PET bottles, being sent for recycling or ending up in landfills. By being able to isolate the catchment water in the open-topped catchment channel 30 from, for example, water runoff from a road surface, which is generally heavily contaminated with such contaminating material as fuel, oil, or rubber, making such water totally unusable without first treating it with stringent purification methods. It will also be appreciated that the open-topped catchment channel 30 being able to collect water from, for example, roadside structures and gardens, is beneficial as it reduces the volume of water on the streetscape or road, thereby reducing the risk of flooding and improving road safety.

In this embodiment, the open-topped catchment channel 30 and the one or more open-topped utility channels 20 are isolated from one another such that liquid communication between the open-topped catchment channel 30 and the one or more open-topped utility channels 20, and vice versa, is precluded under normal conditions. This is particularly beneficial from a safety aspect where the one or more utility lines are carrying gas and electricity or water and electricity, such that these utilities need to be isolated from one another.

In one embodiment, and as shown in FIGS. 1 to 4, the modular ducting section 10 further comprises a road water runoff flange 80 extending outwardly from a side wall 25 of one of the one or more open-topped utility channels 20 furthest from the open-topped catchment channel 30. Referring specifically to FIG. 4, when installed as kerb sections, the road water runoff flange 80 of the modular ducting section 10 abuts the surface of the road such that an upper surface 85 of the road water runoff flange 80 is substantially level with the road surface. Preferably, the road water runoff flange 80 is a sloped road water runoff flange 80 and wherein at least a portion of the upper surface 85 of the sloped runoff water flange 80 is substantially sloped downwards in a direction toward the side wall 25 of the open-topped utility channel 20 furthest from the open-topped catchment channel 30. As such, in the case where the road has a camber, water from the road surface will flow from the road to the upper surface 85 of the road water runoff flange 80, whereupon the downward slope of the road water runoff flange 80 toward the side wall 25 ensures that the collected road water remains at the kerb rather than in the road. Depending on the geography of the streetscape, the road water will flow along the upper surface 85 of the road water runoff flange 80 of the modular ducting sections 10 lying end-to-end in a direction substantially parallel to a longitudinal axis of the modular ducting section 10 and in accordance to gravity flow. For example, the sloped road water runoff flange 80 allows road water to be channelled along the upper surface 85 of the sloped road water runoff flange 80 until it reaches a storm water drain where it can be drained. It will be appreciated that in this embodiment, the profile of the road water runoff flange 80 is designed to be compliant with a standard road configuration to ensure that no unnecessary additional work is required to install the modular ducting sections 10 into existing streetscape infrastructure.

In one embodiment, at least one of the one or more open-topped utility channels 20 comprises an electromagnetic shield lining (not shown) to shield the one or more utility lines carried therein in use. For example, in the case of utility lines carrying data/telecommunications, the need to limit or preclude the penetration of electromagnetic fields into the corresponding utility channel 20 within which the data/telecommunication utility lines are being carried is an important consideration and can be achieved by blocking electromagnetic fields with a barrier made of conductive material. Preferably, the electromagnetic shield lining is a conductive material lining, more preferably a conductive material lining such as a sheet metal or mesh. Alternatively, the data/telecommunication utility lines themselves may be shielded lines. For example, the lines may comprise electromagnetic shielding as is commonly used in the form of a coaxial cable.

In another embodiment, at least one of the one or more open-topped utility channels 20 comprises an impermeable lining (not shown), and more preferably, a resilient impermeable lining to prevent, for example, water, from entering the at least one open-topped utility channel 20. The resilient impermeable lining may be manufactured from any suitable resilient impermeable material including, but not limited to, any one of the following: polyvinyl chloride (PVC), polyethylene (PE), silicone rubber.

In another embodiment, the modular ducting sections 10 further comprise an earthing rod (not shown) to earth the modular ducting sections 10 in the event of, for example, a lightning strike. The earthing rod may be embedded within the modular ducting section 10 or may be located on the outside of the modular ducting section 10. In both cases, the earthing rod will extend substantially downwards to a depth in the ground that will enable efficient earthing of the modular ducting section 10 and prevent the one or more utility lines carried within the one or more open-topped utility channels 20, particularly sensitive utility lines such as those carrying data/telecommunications, from being damaged by lightning. It will be appreciated that the earthing rod will preferably be manufactured from a conductive material such as, for example, copper.

In one embodiment, and as shown in FIGS. 2 to 5, the modular ducting section 10 further comprises a main channel cover 40 being adapted to removably engage an upper portion 50 of the side walls 25 of each of the one or more open-topped utility channels 20 to substantially seal the one or more open-topped utility channels 20 in use. As shown in FIG. 3 (ii), the main channel cover 40 is adapted to engage the upper portion 50 of the side walls 25 of the one or more utility channels 20 such that an upper surface 45 of the main channel cover 40 is substantially level with the upper portion 55 of the catchment channel wall 70. In this respect, the main channel cover 40 is also substantially level with the general level of the streetscape when engaged, such that the main channel cover 40 does not create a hazard for pedestrians, and does not impede the opening of vehicular doors when the vehicles are parked alongside the road. When engaged on the upper portion 50 of the side walls 25 of the open-topped utility channels 20, the one or more open-topped utility channels 20 are effectively isolated from one another. This is particularly beneficial from a safety aspect where the one or more utility lines in the open-topped utility channels 20 are carrying, for example, gas and electricity or water and electricity, such that these utilities need to be isolated from one another. Importantly, the one or more open-topped utility channels 20 are isolated from the open-topped catchment channel 30. As such, catchment water in the open-topped catchment channel 30 is precluded from entering the open-topped utility channels 20. This is particularly beneficial from a safety aspect where the one or more utility lines in the open-topped utility channels 20 are carrying electricity.

The main channel cover 40 being removably engageable with the upper portion 50 of the side walls 25 of the open-topped utility channels 20 enables, for example, a service engineer to be able to access the one or utility lines in the open-topped utility channels 20 in the case where maintenance or repair is required, or when a new utility line or utility service is to be introduced, without the need for digging or trenching to be performed.

The main channel cover 40 comprises a channel cover side region defining a kerb 110 of a road in use. It will be appreciated that the height of the channel cover side region, and thus the kerb 110, will be determined by the thickness of the main channel cover 40. In a preferred embodiment, the kerb 110 will be of a sufficient height to prevent or at least limit the amount of road water on the upper surface 85 of the road water runoff flange 80 from overflowing the kerb 110.

In one embodiment, and as shown in FIGS. 5 (*i* and *ii*), underside of the main channel cover 40 comprises one or more main channel cover recesses 190 adapted to engage with the upper portion 50 of the side walls 25 of each of the one or more open-topped utility channels 20 in use. The one or more main channel cover recesses 190 serve the purpose of enabling the main channel cover 40 to be returned to its correct location if it has been removed for a particular reason, for example, maintenance or repair, or when a new utility line or utility service is to be introduced. It will be appreciated that the one or more main channel cover recesses 190 will be of a sufficient depth to provide a firm and secure fitting on the upper portion 50 of the side walls 25 of the one or more open-topped utility channels 20. For example, in the event a vehicle on the road gently nudges the kerb 110, during say, parking, then the depth of the one or more main channel cover recesses 190 will go some way to ensure that the main channel cover 40 remains in place on the modular ducting section 10.

In one embodiment, the modular ducting section 10 further comprises one or more channel seal members (not shown) adapted for location between the upper portion 50 of the side walls 25 of each of the one or more open-topped utility channels 20 and the corresponding one or more main channel cover recesses 190 on the underside of the main channel cover 40 in use. The one or more channel seal members ensure that a watertight seal is formed between the main channel cover 40 and the upper portion 50 of the side walls 25 of the one or more utility channels 20. This is beneficial for preventing water or debris from entering the open-topped utility channels 20. The one or more channel seal members also ensure that there is a resilient barrier between the main channel cover 40 and the upper portion 50 of the side walls 25 of the one or more utility channels 20 to prevent degradation of the main channel cover 40 or the side walls 25 through constant wear as the one or more main channel cover recesses 190 and the upper portion 50 of the side walls 25 rub together. This is particularly beneficial in the event a vehicle mounts the kerb 110 or there is repeated pedestrian use. The one or more channel seal members 190 will also serve as shock absorbers in areas exposed to such heavy traffic as buses or construction vehicles, which are known to cause vibrations. The one or more channel seal members will also serve as shock absorbers in case of impact with the kerb 110.

The one or more channel seal members may be manufactured from any suitable material for providing a watertight seal and absorbing vibrations. In the preferred embodiment, the one or more channel seal members are manufactured from an elastomer, and more preferably a flexible and resilient rubber including, but not limited to any one of the following: natural rubber, urethane, neoprene, nitrile rubber, silicone rubber.

Referring specifically to FIGS. 2, 3 (ii) and 4, the modular ducting section 10 further comprises one or more catchment channel covers 60 being adapted to removably engage the upper portion 55 of the catchment channel wall 70 and the upper portion 50 of the side wall 25 of the open-topped utility channel 20 from which the catchment channel wall 70 extends, wherein each of the upper portion 55 of the catchment channel wall 70 and the upper portion 50 of the side wall 25 of the open-topped utility channel 20 from which the catchment channel wall 70 extends, are adapted to receive respective bottom edges of the one or more catchment channel covers 60 to substantially seal the open-topped catchment channel 30 in use. As shown in FIG. 3 (ii), when the one or more catchment channel covers 60 are engaged on the upper portion 55 of the catchment channel wall 70 and the upper portion 50 of the side wall 25 of the open-topped utility channel 20 from which the catchment channel wall 70 extends, upper surfaces of the one or more catchment channel covers 60 are substantially level with a top surface of the upper portion 55 of the catchment channel wall 70. In this embodiment, the upper portion 55 of the catchment channel wall 70 comprises a ledge (not shown) on an inner surface of the upper portion 55 for receiving one of the bottom edges of each catchment channel cover 60. In this respect, the one or more catchment channel covers 60 are substantially level with the general level of the streetscape when engaged, such that the one or more catchment channel covers 60 do not create a hazard for pedestrians. When the one or more catchment channel covers 60 are engaged, the open-topped catchment channel 30 is effectively isolated from the pavement and from the street in general, as well as being isolated from the one or more open-topped utility channels 20. This is beneficial from a safety aspect, as the catchment water contained within the open-topped catchment channel 30 is precluded from becoming contaminated by, for example, debris from the street above or contaminated road water that may have overflowed the kerb 110.

The one or more catchment channel covers 60 being removably engageable with the upper portion 55 of the catchment channel wall 70 and the upper portion 50 of the side wall 25 of the open-topped utility channel 20 from which the catchment channel wall 70 extends, enables, for example, a service engineer to be able to access the catchment water in the catchment channel 30 in the case where, for example, water quality measurements are required to be performed or debris removed, or simply for maintenance or repair to be performed, or when a new utility line or utility service is to be introduced, without the need for digging or trenching.

In this embodiment, the modular ducting section 10 further comprises one or more catchment channel seal members (not shown) adapted for location between the upper portion 55 of the catchment channel wall 70 and the upper portion 50 of the side wall 25 of the open-topped utility channel 20 from which the catchment channel wall 70 extends, and the respective bottom edges of the one or more catchment channel covers 60 in use. The one or more catchment channel seal members ensure that a watertight seal is formed between the one or more catchment channel covers 60 and respectively the upper portion 55 of the catchment channel wall 70 and the upper portion 50 of the side wall 25 of the open-topped utility channel 20 from which the catchment channel wall 70 extends. The one or more catchment channel seal members are useful for preventing water or debris from entering the open-topped catchment channel 30. The one or more catchment channel seal members also ensure that there is a resilient barrier between the one or more catchment channel covers 60 and respectively the upper portion 55 of the catchment channel wall 70 and the upper portion 50 of the side wall 25 of the open-topped utility channel 20 from which the catchment channel wall 70 extends, to prevent degradation of the catchment channel cover 60, or the corresponding catchment channel wall 70 or side wall 25 through constant wear as the respective bottom edges of the one or more catchment channel covers 60 and the upper portion 55 of the catchment channel wall 70 and the upper portion 50 of the side wall 25 of the open-topped utility channel 20 from which the catchment channel wall 70 extends, rub together. This is particularly beneficial in the event a vehicle mounts the kerb 110 or there is repeated pedestrian use. The one or more catchment channel seal members will also serve as shock absorbers in areas exposed to such heavy traffic as buses or construction vehicles, which are known to cause vibrations. The one or more channel seal members will also serve as shock absorbers in case of impact with the kerb 110.

In another embodiment, the modular ducting section 10 may further comprise one or more intermediate catchment channel seal members (not shown) adapted for location between facing ends of the main channel cover 40 and the one or more catchment channel covers 60, such that in the event a vehicle on the road gently nudges the kerb 110, during say, parking, and thus pushes the main channel cover 40 in a direction toward the one or more catchment channel covers 60, the one or more intermediate catchment channel seal members interposed between the main channel cover 40 and the one or more catchment channel covers 60 will go some way to absorb the vehicle impact and prevent or at least limit the chance of damage to the main channel cover 40 and the one or more catchment channel covers 60 or their displacement from the modular ducting section 10. Similarly, it will also be appreciated that one or more intermediate catchment channel seal members may also be located between the one or more catchment channel covers 60 and the upper portion 55 of the catchment channel wall 70.

The one or more catchment channel seal members may be manufactured from any suitable material for providing a watertight seal and for absorbing vibrations. In the preferred embodiment, the one or more catchment channel seal members are manufactured from a rubber, and more preferably a flexible and resilient rubber including, but not limited to any one of the following: natural rubber, urethane, neoprene, nitrile rubber, silicone rubber.

Referring specifically to FIGS. 2 and 5, in one embodiment, the main channel cover 40 comprises a power supply port 120 in power communication with a power utility line (not shown) carried in one of the one or more open-topped utility channels 20 and adapted to receive a power plug (not shown) in use. In a preferred embodiment, the power supply port 120 is adapted to provide a means for electric vehicle owners to recharge their vehicles when not in use. An electric vehicle (not shown) can be recharged at the side of the road without needing to connect the electric vehicle to a power supply from a roadside structure such as a residential or commercial property. In this embodiment, the power supply port 120 is close to the kerb 110 and therefore, close to the electric vehicle such that there is no need to have power cables running between the roadside structure and the electric vehicle across, for example a pedestrian thoroughfare, thus ensuring the safety of pedestrians. The power supply port 120 may be connected to a power utility line carrying a carrying a normal voltage power supply (e.g. 100-240 V) or a high voltage power supply (e.g. 400-480 V) depending on the application required. For the purposes of charging an electric vehicle, it will be appreciated that a high voltage power supply would be suitable.

To prevent the power supply port 120 from becoming damaged or contaminated with, for example, water or debris, the power supply port 120 is adapted to receive a power supply port cap 125. The power supply port 120 is adapted to receive the power supply port cap 125 by any suitable means of connection. In one example, the power supply port cap 125 and power supply port 120 are threaded with a male and female thread, respectively, where the female threaded power supply port 120 is adapted to engage the male threaded power supply port cap 125. In another example, the power supply port 120 may be fitted with a cover (not shown) hingedly mounted to the power supply port 120 to cover the power supply port 120 when not in use. It will be appreciated that the means of connecting the power supply port cap 125 to the power supply port 120 or the means for covering the power supply port 120 when not in use are not limited to those described above, but that any suitable means of connecting the power supply port cap 125 to the power supply port 120 or covering the power supply port 120 when not in use may be used.

In one embodiment, the upper surface 45 of the main channel cover 40 comprises one or more guide protrusions (not shown) for guiding a sight challenged person in use. The guide protrusions are a useful means to warn sight challenged persons of, for example, areas of pending danger. For example, the guide protrusions could be arranged in a continuous line along the upper surface 45 of the main channel cover 40 in a direction parallel with the road so that a sight-challenged person would understand that if they recognise the presence of guide protrusions beneath their feet they are close to the kerb 110. In another embodiment, the one or more guide protrusions can be arranged in any one of a number of patterns on the upper surface 45 of the main channel cover 40 to indicate to sight-challenged persons that certain facilities such as, for example, a post office, a bank, a telephone box, a police station, a library, are nearby. The pattern of the guide protrusions could also indicate the direction of the facilities and possibly an indication of the distance required to walk before they get there.

It will be appreciated that the modification of the upper surface 45 of the main channel cover 40 is not limited to that described but that any type of suitable modification can be envisaged within the scope of the present invention. For example, the upper surface 45 could be modified to include a fluorescent strip running substantially parallel to the longitudinal axis of the modular ducting section 10 to provide an indication of the proximity a pedestrian is to the road.

Figure 6:
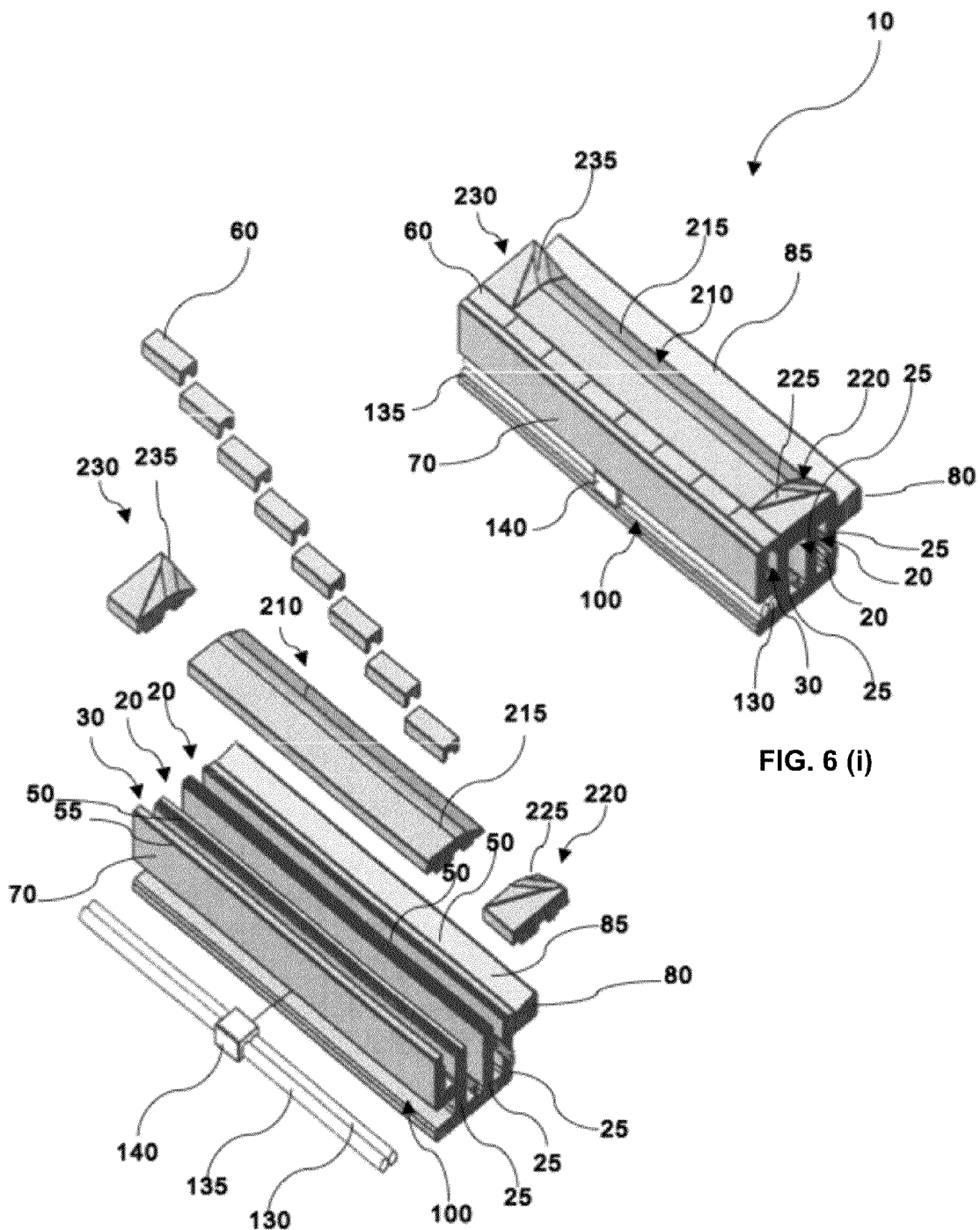
FIG. 6 is a perspective view of the modular ducting section of FIG. 1 further comprising one or more catchment channel covers, a sloped channel cover, a supply line, a return line, junction box and a first and second sloped corner covers adapted to abut and substantially align with, respective ends of the sloped channel cover in (i) assembled form and in (ii) exploded form.
Figure 7:
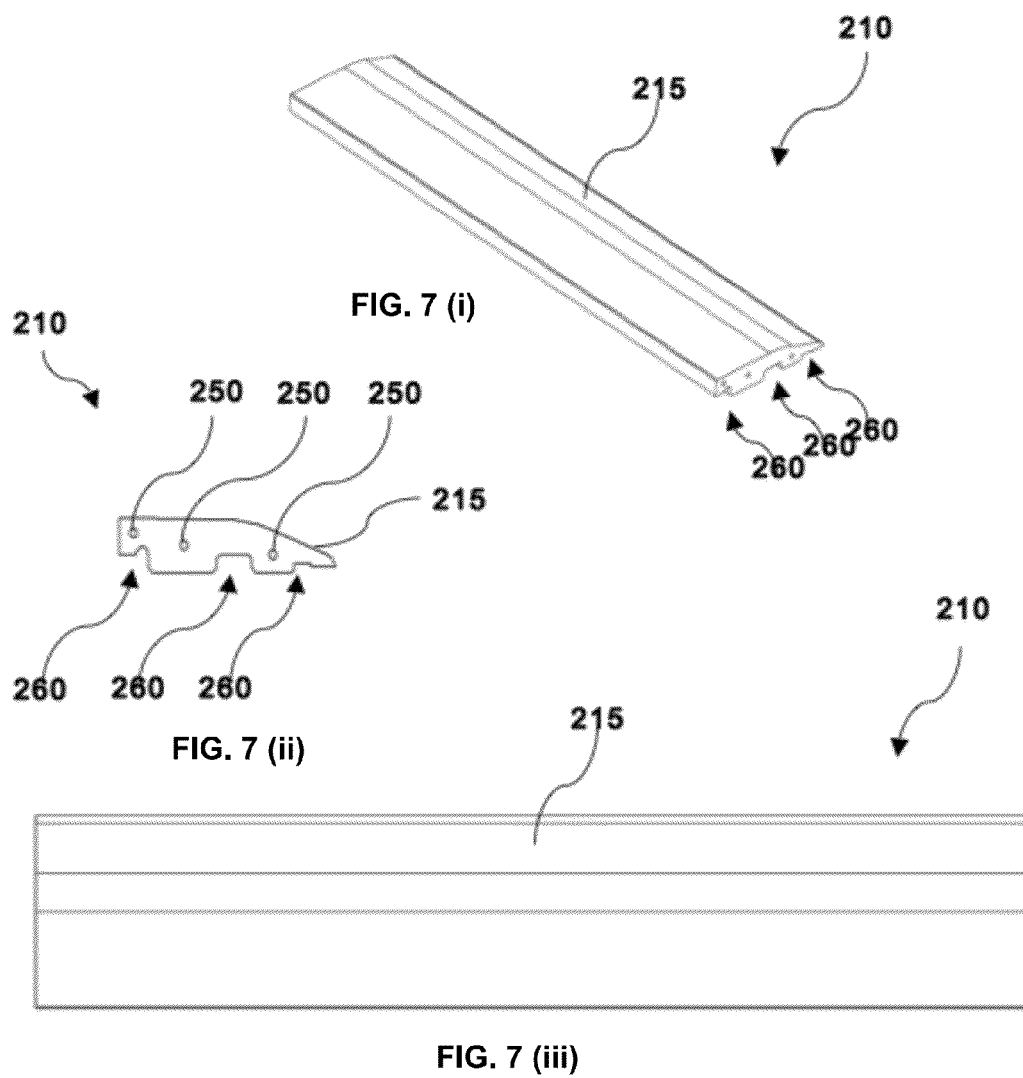
FIG. 7 is (i) a perspective view, (ii) an end view, and (iii) a top view of the sloped channel cover shown as part of FIG. 6.

Referring specifically to FIGS. 6 and 7, in one embodiment, the main channel cover 40 is a sloped channel cover 210 and wherein at least a portion of an upper surface 215 of the sloped channel cover 210 is substantially sloped downwards in a direction away from the open-topped catchment channel 30. In this embodiment, the sloped channel cover 210 has the same features as the main channel cover 40 of FIGS. 2 and 5, albeit with a sloped upper surface 215. For example, an underside of the sloped channel cover 210 comprises one or more sloped channel cover recesses 260 adapted to engage with the upper portion 50 of the side walls 25 of each of the one or more open-topped utility channels 20 in use. As shown in FIG. 6 (i), the sloped upper surface 215 of the sloped channel cover 210 is substantially sloped downwards away from the open-topped catchment channel 30 and toward the kerb 110 and thus, the road provides, for example, a driveway access for vehicles, or a ramp to allow wheelchair bound users or pedestrians pushing prams, pushchairs or other wheeled devices a smoother transition from the pavement to the road and vice versa, when crossing the road. It will be appreciated that the angle of incline of the upper surface 215 may be of any suitable angle provided at least a wheelchair bound user or pedestrian can easily traverse the slope. This is particularly relevant when traversing the road onto the pavement.

In another embodiment, the main channel cover 40 and sloped channel cover 210 may incorporate a locking device (not shown) to lock the cover to the corresponding modular ducting section 10 to limit access to the one or more utility lines within the one or more open-topped utility channels 20 to authorised personnel only. It will be appreciated that the locking device may comprise any suitable type of locking mechanism to limit access including, but not limited to, any one or more of the following types of locking mechanism: a bolt, a clasp, a lever mechanism. It will also be appreciated that by locking the cover to the modular ducting section 10 will provide a means by which a greater compressive load can be applied to the one or more channel seal members located between the upper portion 50 of the side walls 25 of each of the one or more open-topped utility channels 20 and the corresponding one or more main channel cover recesses 190 or sloped channel cover recesses 260 on the underside of the main channel cover 40 or sloped channel cover 210 in use. This is beneficial as the compressive load will provide additional watertight conditioning of the modular ducting section 10.

In yet another embodiment, the locking device may take the form of a tongue-and-groove arrangement (not shown) whereby the main channel cover 40, the sloped channel cover 210, and the modular ducting section 10 are each adapted by introducing one or more grooves (not shown) to receive respective ends of one or more tongues (not shown), such as a yellow plastic or polyvinyl chloride (PVC) tongue. In this embodiment, it will be appreciated that the one or more grooves in the modular ducting section 10 adapted to receive one of the respective ends of the one or more tongues may be at either end of the modular ducting section 10, for example, formed in one or more of the side walls 25, and the corresponding one or more grooves in the main channel cover 40 or sloped channel cover 210 may be formed at their respective ends. Such a tongue-and-groove arrangement is commonly used in building and construction in, for example, the laying of floorboards, to reduce movement of the floorboards. It will be appreciated that in this embodiment, the tongue-and-groove arrangement will help to reduce undesirable movement of the covers caused by, for example, vibrations from traffic.

Referring specifically to FIGS. 6 and 8, in one embodiment, the modular ducting section 10 further comprises one or more sloped corner covers adapted to removably engage the upper portion 50 of the side walls 25 of each of the one or more open-topped utility channels 20, wherein the one or more sloped corner covers are a first sloped corner cover 220 (FIG. 8 (i)) and a second sloped corner cover 230 (FIG. 8 (ii)), and wherein the first 220 and second 230 sloped corner covers are adapted to abut and substantially align with, respective ends of the sloped channel cover 210 to substantially seal the one or more open-topped utility channels 20 in use. In this embodiment, at least a portion of the upper surface 225, 235 of the first 220 and second 230 sloped corner covers is substantially downwardly sloped in a direction away from the open-topped catchment channel 30 and toward the kerb 110. The upper surfaces 225, 235 of the first 220 and second 230 sloped corner covers are also substantially angled inwards toward the sloped channel cover 210 disposed therebetween such that when the first sloped corner cover 220, the sloped channel cover 210 and the second sloped corner cover 230 are substantially aligned and removably engaged on the upper portion 50 of the side walls 25 of each of the one or more open-topped utility channels 20 in use, the overall downward slope afforded by the three sloped covers in combination toward the kerb 110 defines not only a driveway access or wheelchair ramp that has a smooth transition from the pavement to the road, but also affords a substantially seamless surface extending from the modular ducting section 10 comprising the three sloped covers to adjacent modular ducting sections 10 that comprise main channel covers 40.

It will be appreciated that in order to removably engage all three covers on the upper portion 50 of the side walls 25 of each of the one or more open-topped utility channels 20 of one modular ducting section 10, the sloped channel cover 210 will be slightly shorter in length than the main channel cover 40.

Like the main channel cover 40 and the sloped channel cover 210, an underside of the first 220 and second 230 sloped corner covers comprise one or more sloped corner cover recesses 280 adapted to engage with the upper portion 50 of the side walls 25 of each of the one or more open-topped utility channels 20 in use.

In one embodiment, each of the sloped corner covers 220, 230 comprises an opposing end 285, 285', respectively, adapted to substantially align with and lie adjacent to a facing end of the main channel cover 40 in use. The opposing ends 285, 285' of the sloped corner covers 220, 230 having the same shape as the end profile of the main channel cover 40, to provide a smooth transition between the sloped corner covers 220, 230 and the adjacent main channel cover 40 in use.

Many urban streetscapes, and in particular, those urban streetscapes that have been around since the turn of the 20$^{th}$ century, have street plans that are irregular in their layout rather than the regular, grid-like arrangements of streets that have been adopted in many new towns and cities. As such, the substantially elongate modular ducting section 10 as shown for example in FIGS. 1 and 2, will in some cases not cater well to conform to existing streetscapes in many towns and cities. Indeed, while it will be appreciated that the substantially elongate modular ducting section 10 as shown in FIGS. 1 and 2 can be manufactured to different lengths as determined by the location in which they need to be installed, such modular ducting sections 10 lying end-to-end will not conform with streets having curved sections.

Figure 9:
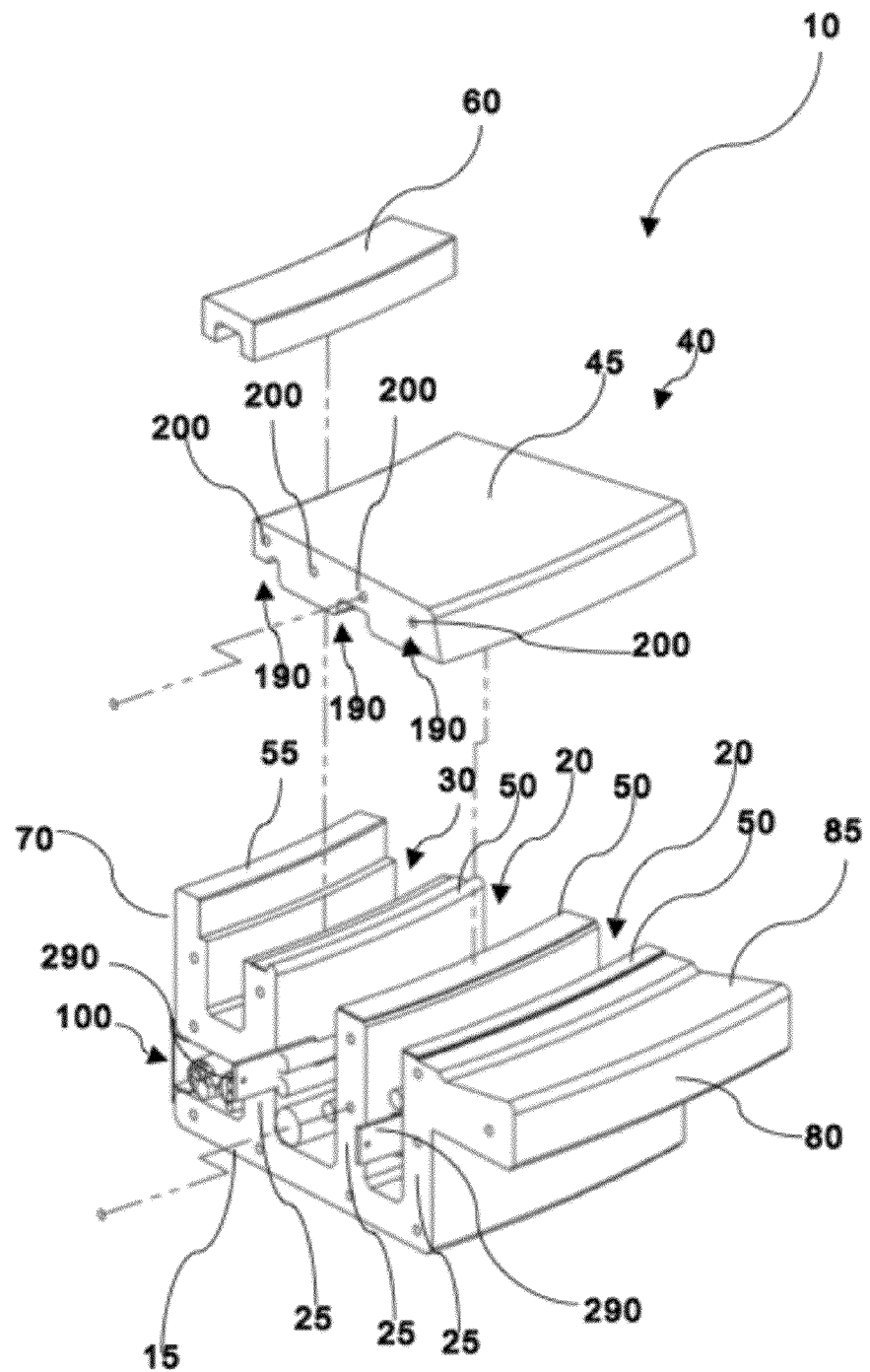
FIG. 9 is a perspective view of the modular ducting section of FIG. 1 wherein at least a portion of the modular ducting section is substantially curved in profile when viewed from above.

In one embodiment, therefore, it will be appreciated that modular ducting sections 10 can be manufactured having the same end profile as shown in FIG. 3 (*i* and *ii*), but with at least a portion of the modular ducting section 10 being substantially curved in profile when viewed from above, as shown in FIG. 9. It will be appreciated that in order to seal the one or more open-topped utility channels 20 and the open-topped catchment channel 30 of a modular ducting section 10 having at least a portion being substantially curved in profile when viewed from above, it will be necessary to manufacture a corresponding main channel cover 40 and one or more corresponding catchment channel covers 60, wherein at least a portion of the main channel cover 40 is substantially curved in profile when viewed from above, and wherein at least a portion of the one or more catchment channel covers 60 is substantially curved in profile when viewed from above, to conform to the profile of the modular ducting section 10. While not shown, it will be appreciated that the corresponding channel seal members and one or more catchment channel seal members will also be manufactured to have the same profile when viewed from above. It will also be appreciated that in cases where a modular ducting section 10 has at least a portion being substantially curved in profile when viewed from above and where, the main channel cover 40 is a sloped channel cover 210, wherein at least a portion of an upper surface 215 of the sloped channel cover 210 is substantially sloped downwards in a direction away from the open-topped catchment channel 30, the sloped channel cover 210 will also be manufactured to have the same profile when viewed from above. It will also be appreciated that at least a portion of the modular ducting section 10, the main channel cover 40, and the one or more catchment channel covers 60 can be substantially curved in profile when viewed from the side. In this case, the side profiles of the portions of the modular ducting section 10, main channel cover 40, and one or more catchment channel covers 60 can be substantially curved upward or downward to conform to the change in elevation of the streetscape. This will be beneficial in instances where, for example, the change in gradient of the streetscape is significant.

In another embodiment, and as shown in FIG. 10, the modular ducting sections 10 can be manufactured so that they are substantially parallelogram in shape when viewed from above. The end profiles of the substantially parallelogram-shaped modular ducting sections 10, while substantially slanted, will adopt the same end profile as the modular ducting sections 10 described above as shown in FIGS. 3 (*i* and *ii*). This is beneficial in the event when the modular ducting sections 10 are installed in a streetscape and there is a need to avoid certain immovable obstacles, such as, for example trees, poles, or other such obstacles. By installing one or more substantially parallelogram shaped modular ducting sections 10 end-to-end with the already installed modular ducting sections 10, the direction of the modular ducting sections 10 can be re-routed around the obstacles. It will be appreciated that the main channel cover 40 will also need to be substantially parallelogram in shape when viewed from above to conform to the shape of the substantially parallelogram shaped modular ducting section 10. The end profiles of the substantially parallelogram-shaped main channel cover 40, while substantially slanted, will adopt the same end profile as the main channel cover 40 described above and as shown in FIG. 5 (ii). It will also be appreciated that one or both ends of the one or more catchment channel covers 60 will need to be manufactured such that their end profile is substantially parallel with the end profiles of the substantially parallelogram-shaped modular ducting section 10 and main channel cover 40.

Urban streetscapes in some instances have street plans that require excavation to a lower ground elevation than its surroundings. In some cases, the change in ground elevation exceeds the angle of repose of the surrounding soil causing a build up of lateral pressure of the soil. To combat this problem, urban streetscapes require the construction of wall structures that are able to retain the lateral pressure of the soil. However when the change in ground elevation is in close proximity to the kerb 110, there is often not enough space to facilitate the construction of the wall structure. Furthermore, when the wall structures needs to be removed to allow further development of the surrounding area it is often demolished and requires time consuming cleanup activities.

In one embodiment, referring specifically to FIG. 11, it will be appreciated therefore that the modular ducting section 10 further comprises a removably mounted retainer wall 286 being adapted to withstand lateral forces caused by the soil. The retainer wall 286 being of length substantially equal to the length of the modular ducting section 10 in the longitudinal axis, and being removably mounted to the upper portion 55 of the catchment channel wall 70 such that in use the retainer wall 286 extends substantially upwards. In this embodiment, the retainer wall 286 is removably mounted to the upper portion 55 of the catchment channel wall 70 by the use of a plurality of bolts (not shown), that removably secure the retainer wall 286 in place.

In this embodiment, the retainer wall 286 is constructed from precast concrete, however it will be appreciated that the retainer wall 286 may be constructed from any material that is rigid and strong, including, but not limited to, such materials as a steel alloy, a composite, and a polymer.

The retainer wall 286 comprises a recessed bottom portion 287 adapted to receive the upper portion 55 of the catchment channel wall 70 being located on the bottom of a first face (not shown) of the retainer wall 286. The upper portion 55 of the catchment channel wall 70, once received into the recessed bottom portion 287, ensures that the retainer wall 286 is positioned correctly for removably mounting to the catchment channel wall 70 and reinforces the join between them.

It will be appreciated that the retainer wall 286 can be constructed with a curvature to conform with the curvature of the modular ducting section 10 to which it is attached, such that the upper portion 55 of the catchment channel wall 70 is received into the recessed bottom portion 287 throughout the length of the retainer wall 286. It will be also appreciated that the retainer wall 286 may be any height appropriate to retain the lateral pressure. In other embodiments, the retainer wall 286 may be one or more retainer walls 286, each being of length of a portion of the length of the modular ducting section 10 in the longitudinal axis, such that lying end-to-end will still retain the lateral pressure and have a configurable length. Referring specifically to FIG. 12, in one embodiment, the modular ducting section 10 further comprises a pavement cover 288 being adapted to removably engage the upper portion 50 of the side walls 25 of each of the one or more open-topped utility channels 20 and one or more portions 281, 281' of the upper portion 55 catchment channel wall 70 in use.

The pavement cover 288 comprises a pavement cover side region defining a kerb 110 of a road in use. It will be appreciated that the height of the pavement cover side region, and thus the kerb 110, will be determined by the thickness of the pavement cover 288. In a preferred embodiment, the kerb 110 will be of a sufficient height to prevent or at least limit the amount of road water on the upper surface 85 of the road water runoff flange 80 from overflowing the kerb 110.

In this embodiment, an underside of the pavement cover 288 further comprises one or more pavement cover recesses 289 adapted to engage with the upper portion 50 of the side walls 25 of each of the one or more open-topped utility channels 20 in use. As shown in FIG. 12 (iii), the pavement cover recesses 289 are adapted to engage the upper portion 50 of the side walls 25 of the one or more open-topped utility channels 20 such that an upper surface of the pavement cover 288 is substantially and horizontally level. In this respect, the pavement cover 288 is also substantially level with the general level of the streetscape in use, such that the pavement cover 288 does not create a hazard for users of the pavement, such as, for example, pedestrians and cyclists. The pavement cover 288 is of a width that substantially extends in a direction away from the side wall 25 from which the road water runoff flange 80 extends outwardly from and beyond the catchment channel wall 70 such that it provides a substantially wide area for a pavement that may be used by pedestrians and cyclists. To accommodate the extended width of the pavement cover 288 beyond the catchment channel wall 70 and maintain the substantially horizontal level of the pavement cover 288, the one or more portions 281, 281 of upper portion 55 of the catchment channel wall 70 are of a height that is substantially level with the upper portion 50 of the side walls 25. This also allows the pavement cover 288 to substantially seal the open-topped catchment channel 30 as well as the one or more open-topped utility channels 20 in use.

The pavement cover 288 further comprises an anchor 291 that is located on the underside of the pavement cover 288 and preferably along an edge of the pavement cover 288 furthest from the side wall 25 from which the road water runoff flange 80 extends outwardly from. The anchor 291 extends downwardly from the underside of the pavement cover 288 and when installed in a streetscape, the anchor 291 provides support for the pavement cover 288.

As shown in FIG. 12 (ii), the pavement cover 288 is substantially U-shaped when viewed from above, such that when the pavement cover 288 is installed on the modular ducting section 10, the U-shaped portion, given reference numeral 292, is so shaped to provide space to receive the main channel cover 40 and the one or more catchment channel covers 60 in use, to substantially seal a portion of the one or more open-topped utility channels 20 and a portion of the open-topped catchment channel 30, respectively, in use. This is beneficial as the one or more open-topped utility channels 20 and the open-topped catchment channel 30 are accessible by removing the main channel cover 40 and the one or more catchment channel covers 60, respectively, rather than needing to remove the much larger pavement cover 288. The main channel cover 40 that is received into the U-shaped portion 292 of the pavement cover 288 is substantially equal in length to the U-shaped portion 292 of the pavement cover 288 in the longitudinal axis, such that only the portion of the one or more open-topped utility channels 20 is substantially sealed by the main channel cover 40. Similarly, the one or more catchment channel covers 60 that are received into the U-shaped portion 292 of the pavement cover 288 when lying end-to-end in series are substantially equal in length to the U-shaped portion 292 of the pavement cover 288 in the longitudinal axis, such that only the portion of the open-topped catchment channel 30 is substantially sealed in use.

Referring specifically to FIG. 13, in one embodiment, the one or more open-topped utility channels 20 of the modular ducting section 10 is a single open-topped utility channel 20 defined by two side walls 25 extending upwardly from the base portion 15. In this embodiment, the modular ducting section 10 is substantially narrower in width compared to the modular ducting section 10 shown in, for example, FIG. 1. This allows the narrow modular ducting section 10 to be installed in urban streetscapes that are relatively narrow in area. The single open-topped utility channel 20 comprises one or more removable partitions 293 that are adapted to horizontally divide the single open-topped utility channel 20 into two or more separated utility channel portions 294, 294'. The two or more utility channel portions 294, 294' allow the single open-topped utility channel 20 to carry one or more utility lines that need to be isolated from each other, such as, for example, gas and electricity utility lines or water and electricity utility lines. To accommodate the width of the narrow modular ducting section 10, it will be appreciated that the main channel cover 40 will also be narrower in width and will comprise on an underside of the main channel cover 40 one or more main channel cover recesses 190 adapted to engage with the upper portion 50 of the two side walls 25 of the single open-topped utility channel 20 in use in the same manner as described above.

The one or more removable partitions 293 are preferably constructed from precast concrete, however, it will be appreciated that the one or more removable partitions 293 may be constructed from any material that is rigid and strong, including, but not limited to, such materials as: a steel alloy, a composite and a polymer.

Referring specifically to FIGS. 14, 15 and 16, in one embodiment, the modular ducting section 10 further comprises a service distribution box 300 adjacent to the open-topped catchment channel 30, wherein the base portion 15 comprises one or more service channels 301 extending from the one or more open-topped utility channels 20 to the service distribution box 300. An extension of each of the one or more utility lines passing from the one or more open-topped utility channels 20 into the service distribution box 300 via the one or more service channels 301 in use. The service distribution box 300 is a substantially hollow box as defined by the catchment channel wall 70, the base portion 15, which extends substantially beyond the side wall 25 from which the catchment channel wall 70 extends outwardly from, and box side walls 302, 302', 302" extending substantially upwardly from the base portion 15 and terminating at upper portions 330, 330', 330" that are substantially level with the upper portion 55 of the catchment channel wall 70. The service distribution box 300 provides an access point to, for example, distribute, monitor or isolate, the various utility services being carried by the one or more utility lines in the modular ducting sections 10 lying end to end. The service distribution box 300 allows accessibility to the supply channel 100 and hence accessibility to the supply lines 130. It will be appreciated that where the one or more utility lines in the one or more open-topped utility channels 20 are required to be isolated from one another, such isolated lines being directed from the corresponding one or more open-topped utility channels 20 to the service distribution box 300 as extensions of each of the one or more utility lines, can be passed through different service channels 301 to maintain their isolation from one another. In this embodiment, the one or more open-topped utility channels 20 and corresponding one or more service channels 301 may comprise a resilient impermeable lining to prevent, for example, water, from entering the one or more open-topped utility channels 20 and service channels 301 in use, and to isolate and protect certain utility lines such as utility lines carrying electricity (namely power lines) from utility lines carrying water.

The service distribution box 300 comprises one or more service ports 310, 320, which are defined by one or more dividing walls 303 extending substantially upwardly from the base portion 15 and terminating at upper portions 304 that are substantially level with the upper portion 55 of the catchment channel wall 70. The one or more dividing walls 303 substantially divide the service distribution box 300 into one or more isolated service ports 310, 320. In this embodiment, and as shown in FIG. 14 (i), the one or more dividing walls 303 is one dividing wall 303, creating two service ports 310, 320. In this embodiment, the one or more service channels 301 enable the extensions of each of the one or more utility lines to pass from the corresponding open-topped utility channel 20 to at least one of the corresponding service ports 310, 320 in the service distribution box 300. It will be appreciated that each of the two service ports 310, 320 still retains access to the supply channel 100 and hence the supply lines 130.

The modular ducting section 10, as shown in FIG. 14 (ii), further comprises one or more service port covers 315, 325 being adapted to removably engage the upper portions 330, 330', 330" of the service distribution box 300, the upper portion 304 of the dividing wall 303, and the upper portion 55 of the catchment channel wall 70 in use. It will be appreciated that the one or more service port covers 315, 325 are removably mounted to the corresponding service ports 310, 320 such that a service engineer, for example, can easily gain access to the extensions of each of the one or more utility lines contained therein. It will be appreciated that the dimensions of the service distribution box 300 and of the service ports 310, 320 are not limited to those as shown in FIGS. 10 and 11, such that the service distribution box 300 may be larger depending on the requirements of the surrounding area and the number of end users that are served by the service distribution box 300. Each of the service ports 310, 320 of the service distribution box 300 is adapted to receive a cabinet 341. In this case, it will be appreciated that the one or more service port covers 315, 325 will be removed prior to installing the cabinet 341 on the corresponding service port 310, 320 of the service distribution box 300.

As shown in FIG. 16(ii), the service distribution box 300 comprises one or more isolation switches or valves connected to the corresponding extensions of the one or more utility lines to enable a service engineer of a utility supplier or any other authorized person, for instance, a safety official, or a fire department official, access to isolate one or more of the utility supplies provided by the corresponding utility supplier. For instance, in the event of a gas or water leak, the gas or water supply to the end users, for example, residential or commercial properties, within an area served by the service distribution box 300 can be isolated at the service distribution box 300 using a gas 335 or water isolation valve 340, respectively. Similarly, in the event of a power cut, the service distribution box 300 may comprise one or more isolation switches (not shown) for one or more electricity supplies to enable a service engineer of the corresponding electricity supplier access to monitor the status of the electricity supply, and identify if the power cut is the result of a local problem, such as a short circuit or a blown fuse. The service distribution box 300 may also comprise one or more utility meters (not shown) connected to the corresponding extensions of the one or more utility lines to enable the service engineer of a utility supplier, to monitor the status of the one or more utility supplies provided by the utility supplier to the end users. For instance, the utility meter could be a gas meter to enable the service engineer to monitor the gas pressure within the area served by the service distribution box 300.

As shown in FIGS. 15 and 16, the cabinet 341 of the service distribution box 300 is adapted to house one or more utility service distribution boards, generally given the reference numeral 345. The one or more utility service distribution boards 345 are connected to the extensions of the one or more utility lines for such services as electricity and data/telecommunications. The utility service distribution board 345 enables the distribution and monitoring of the one or more utilities to individual end users such as residential or commercial properties, or public services. For example, utility service distribution boards 345 for one or more control systems will allow services to be monitored, including, but not limited to, any one or more of the following: charging of electric vehicles, powering of local services, such as street lighting, traffic lights, security cameras.

Referring to FIGS. 15 and 16, in one embodiment, the one or more utility service distribution boards 345 are located in the cabinet 341 located above the service port 320 of the service distribution box 300. Each of the one or more utility service distribution boards 345 are connected to one of the one or more utility lines by the corresponding extensions of the one or more utility lines. The one or more utility service distribution boards 345 distribute the corresponding utility service into one or more distribution lines (not shown), which are bundled together and fed to the supply line 130 via the service ports 310, 320, for distribution to one or more end users. Each of the one or more distribution lines corresponds to one of the one or more utility services for one of the one or more end users.

For data/telecommunications, the one or more distribution lines are one or more data/telecommunication distribution lines, which may include, but are not limited to, any one or more of the following types of line: copper, coaxial or fibre-optic cables for multiple carriers (not shown); cable/pay TV; copper, coaxial or fibre-optic cables for a customer access network (CAN) for networked services (internet, voice, Pay TV, VPN, home control systems (video, security, monitoring and activation)) (not shown).

In this embodiment, it will be appreciated that at the service distribution box 300, end users will be able to switch service providers for a particular utility service, such as, for example, data/telecommunications, simply by making a request to the appropriate authorised person, such as a service engineer, to switch the corresponding distribution line from the current utility service distribution board, for example, 345a, to another utility service distribution board such as, for example, 345b.

As shown in FIG. 2, the supply line 130 is adapted to pass through a junction box 140 wherefrom the bundled distribution lines, as one or more end user utility lines, are then distributed to an individual end user. In this embodiment, the end user is a residential or commercial property, or a public service. It will be appreciated that for larger end users, the one or more end user utility lines may be fed to the larger end user from more than one junction box 140, such as from a junction box 140 of an adjacent modular ducting section 10.

In one example, the public service is street lighting, whereby power and data communication to each street light (not shown) in the street is provided via the supply line 130 of a nearby modular ducting section 10. In another example, the public service is traffic lights, where again, the power and data communication to control the traffic lights is provided via the supply line 130 of a nearby modular ducting section 10. It will be appreciated that traffic control will be further advantaged by having traffic cameras mounted in the vicinity of the traffic lights to visually see the traffic situation remotely. In this example, the cameras would also be powered and controlled remotely from a traffic control centre using power and data communication fed from the supply line 130 of a nearby modular ducting section 10.

In another example, the public service is a bus shelter (not shown), whereby power and data communications is provided from the supply line 130 of a nearby modular ducting section 10 to power and control lighting in the bus shelter, and to power and control, for example, one or more information displays (not shown) in the bus shelter to indicate to waiting passengers, the bus timetable, the current bus location, ticket prices, as well as general advertising for the bus company or advertising for other companies. It will be appreciated that other information display panels may located elsewhere on the street to display information of a more general nature, such as street maps, local interest, newsfeeds, weather, traffic conditions, advertising.

In this embodiment, a return line 135 is also provided for enabling the end user to feed, for example, end-user generated electricity back into the power grid via one of the one or more utility lines. The return line 135 is adapted to carry bundled distribution lines, as end user utility return lines, from the end user to the one or more utility lines via the junction box 140. In a preferred embodiment, the end user utility return lines and return line 135 are protected lines in the sense that access to the end user utility return lines and return line 135 are restricted to unauthorised persons. The use of a return line 135 is beneficial as the end user having a means for generating renewable energy using such renewable energy sources such as, for example, solar panels, a wind turbine, a water turbine, a facility to reduce the cost of their energy bill for the utility, for instance, electricity that they receive from a utility supplier by not only limiting the amount of electricity they draw from the supplier, but also by being able to effectively "sell back" to the supplier the excess energy they have generated themselves via the renewable energy sources.

In other embodiments, the return line 135 may provide a pathway for enabling an end user of a residential or commercial property to transfer one or more liquids to, for example, a waste recycling centre for recycling. In one example, one of the one or more liquids may be cooking oil, which can be transferred to the waste recycling centre to be recycled via one of the end user return lines and reused as a biofuel, or indeed, returned to the end user via the supply line 130 to be reused as cooking oil. In another example, the one or more liquids may include liquids that are commonly used by the end user for renovation of the end user property including such liquids as paints, varnishes, solvents, acids, bases and adhesives. It will be appreciated that such different types of liquids will preferably be transferred to the waste recycling centre via dedicated lines in the return line 135 to avoid mixing of such types of liquid, thereby preventing undesirable chemical reactions in the return line 135.

In another embodiment the return line 135 may provide a pathway for enabling the end user to transfer heavily polluted water to the waste recycling centre. For example, water that has been used for cleaning such as dishwashing, laundry, and other cleaning purposes will comprise detergents that are often not fully removed during normal water treatment, thereby polluting streams, rivers, lakes and oceans with undesirable nitrates and phosphates.

With respect to traffic control, signals received from the traffic cameras described above would be fed back to the traffic control centre via the return line 135. Similarly, the information display panels described above may also be adapted to receive information from a user, such as a pedestrian. Such information would be fed back to an operator controlling the information display panels via the return line 135.

Similarly, for buses, it will be appreciated that one or more sensors (not shown) may be located along the bus routes to sense the current location of the bus and to transmit this location data via the return line 135 to both a bus control centre (not shown) and the remaining bus stops along the route to give up to the minute information as to the expected arrival of the bus.

In another embodiment, one or more sensors (not shown) may be located along the length of the one or more utility lines in the modular ducting sections 10 lying end-to-end to sense the condition of the one or more utility lines in the one or more open-topped utility channels 20 and to ascertain, and indeed, locate the occurrence of any fault along the lines. Such information would then be transmitted back to the corresponding service provider, and possibly to the emergency services, via the return line 135 to notify them of the fault and of any pending danger.

The supply line 130, return line 135 and junction box 140 may be manufactured from any suitable material for carrying utility lines. In the preferred embodiment, the supply line 130, return line 135 and junction box 140 are manufactured from a plastic material including, but not limited to, any one of the following plastic materials: polyvinyl chloride (PVC), high density polyethylene (HDPE).

It will also be appreciated that in instances where there is no space to introduce a modular ducting section 10 comprising a service distribution box 300, as described above, the narrow modular ducting section. 10 may further comprise a service distribution box (not shown) adjacent to the open-topped catchment channel 30, wherein the service distribution box is a substantially hollow box as defined by the catchment channel wall 70, the base portion 15, which extends substantially beyond the side wall 25 from which the catchment channel wall 70 extends outwardly from, and box side walls (not shown) extending substantially upwardly from the base portion 15 and terminating at upper portions (not shown) that are substantially level with the upper portion 55 of the catchment channel wall 70. In this embodiment, the side wall 25 from which the catchment channel wall 70 extends comprises one or more service apertures (not shown) adapted to receive and allow to pass therethrough, extensions of the one or more utility lines therethrough, such that in use, the extension of each of the one or more utility lines pass from the two or more separated utility channel portions 294, 294' into the service distribution box via the one or more service apertures.

Referring specifically to FIGS. 17 and 18, the sloped road water runoff flange 80 is adapted to receive a storm water grate 350 of a storm water drain 360, and wherein at least a portion 90, 90' of the upper surface 85 of the sloped road water runoff water flange 80 is substantially sloped downwards in a direction toward the storm water grate 350. In this embodiment, the modular ducting section 10 is adapted to be installed above the storm water drain 360 so that an existing storm water drainage infrastructure can be utilised without there being a need to install an entirely new storm water drainage system. As shown in FIG. 18 (iii), the storm water drain 360 may need to be adapted to accommodate the modular ducting section 10.

As shown in FIGS. 17 and 18, a portion of the road water runoff flange 80 of the modular ducting section 10 has been removed for the road water runoff flange 80 to receive the storm water grate 350 in use. Depending on where the storm water grate 350 is located in relation to the upper surface 85 of the sloped road water runoff water flange 80 will determine how the portion 90 of the upper surface 85 will be sloped in order to allow road water to flow from the upper surface 85 into the storm water grate 350. In this embodiment, and as shown in FIGS. 17 and 18, the storm water grate 350 is located substantially central with respect to the upper surface 85 of the road water runoff flange 80, and as such, the upper surface 85 has been adapted so that portions 90, 90' of the upper surface 85 either side of the storm water grate 350 are respectively sloped in a substantially downward direction toward the storm water grate 350 such that in use, road water flowing along the upper surface 85 of the road water flanges 80 of the modular ducting sections 10 lying end-to-end will be directed by gravity flow to the storm water grate 350 and into the storm water drain 360.

In another embodiment, the storm water grate 350 may be located closer to one end of the upper surface 85 such that the upper surface 85 may only require one sloped portion 90, sloped substantially downward in the direction toward the storm water grate 350. It will be appreciated that the geography of the terrain upon which the modular ducting sections 10 lying end-to-end are installed will be a major factor in determining how the upper surface 85 of the road water runoff flange 80 will need to be adapted to ensure that road water will flow along the road water runoff flanges 80 in the direction of the storm water grates 350 under gravity flow.

In one embodiment, the modular ducting section 10 further comprises a catchment channel overflow aperture (not shown) located in the catchment channel wall 70 and a catchment channel overflow pipe 370 having one end engaged with the catchment channel overflow aperture for draining water from the open-topped catchment channel 30 in use. As shown in FIGS. 17 and 18, the one end of the catchment channel overflow pipe 370 engages the catchment channel overflow aperture and another end of the catchment channel overflow pipe 370 engages the storm water drain 360 such that in use the open-topped catchment channel 30 is in liquid communication with the storm water drain 360. This provides overflow relief in the event the level of water in the open-topped catchment channel 30 exceeds a certain threshold. The catchment channel overflow aperture can be set at a height in the catchment channel wall 70 such that water will only flow from the open-topped catchment channel 30 to the storm water drain 360 via the catchment channel overflow pipe 370 when the level of water in the open-topped catchment channel 30 rises to a particular height and thus exceeds the threshold. The catchment channel overflow aperture can therefore be set at any height in the catchment channel wall 70 in accordance with the needs of the area. For example, in areas prone to heavy rainfall, where a large volume of water may be captured from one or more nearby roadside structures, including, but not limited to any one or more of the following: residential or commercial properties, gardens, parks, and channelled into the open-topped catchment channel 30, the height of the catchment channel overflow aperture can be located at a slightly lower position in the catchment channel wall 70 such that the level of water in the open-topped catchment channel 30 can be eased quickly by transferring the excess water from the open-topped catchment channel 30 to the storm water drain 360 via the catchment channel overflow pipe 370, thereby lessening the chance of water in the open-topped catchment channel 30 overflowing into the street. Alternatively, in relatively drier areas, where the need for water is greater, the catchment channel overflow aperture can be set at a slightly higher position in the catchment channel wall 70 such that a greater volume of water remains in the open-topped catchment channel 30.

In another embodiment, the catchment channel overflow pipe 370 further comprises a one way valve (not shown) adapted to allow water in the open-topped catchment channel 30 to be liquidly communicated from the open-topped catchment channel 30 to the storm water drain 360 via the catchment channel overflow pipe 370 in use. When in place, the one-way valve will allow water to flow in only the one direction, therefore preventing contaminated water from the storm water drain 360 from flowing backing into the open-topped catchment channel 30 and thus contaminating the water contained therein. It will be appreciated that the one way valve may be any type of one-way valve suitable to prevent backflow including, but not limited to, any one of the following: a swing check valve, a gate valve, a double check valve, a tilting disc check valve.

In one embodiment, and as shown in FIGS. 18 (ii) and the modular ducting section 10 further comprises a utility channel drainage aperture (not shown) located in a bottom portion of at least one of the one or more open-topped utility channels 20 and a utility channel drainage pipe 380 having one end engaged with the utility channel drainage aperture for draining water from the at least one of the one or more open-topped utility channels 20 in use. This provides a means to limit the undesirable presence of water in the open-topped utility channels 20. For example, in the event of a heavy rainfall, where road water or water from the pavement may leak into the one or more open-topped utility channels 20, the level of water can be eased by transferring the water from the one or more open-topped utility channels 20 to the storm water drain 360 via the utility channel drainage pipe 380. As shown in FIG. 18 (iii), the one end of the utility channel drainage pipe 380 engages the utility channel drainage aperture and another end of the utility channel drainage pipe 380 engages the storm water drain 360 such that in use the at least one of the one or more open-topped utility channels 20 is in liquid communication with the storm water drain 360. In a preferred embodiment, each of the one or more open-topped utility channels 20 comprises a utility channel drainage aperture in a bottom portion of the channels 20 and has a utility channel drainage pipe 380 having one end engaged with the utility channel drainage aperture. In the preferred embodiment, it will be appreciated that the other end of the utility channel drainage pipe 380 associated with each corresponding utility channel 20 may engage with the storm water drain 360 directly, or may be channelled into a single drainage pipe (not shown) that is in liquid communication with the storm water drain 360.

In another embodiment, the utility channel drainage pipe 380 further comprises a one way valve (not shown) adapted to allow water in the at least one of the one or more open-topped utility channels 20 to be liquidly communicated from the at least one open-topped utility channel 20 to the storm water drain 360 via the utility channel drainage pipe 380 in use. When in place, the one-way valve will allow water to flow in only the one direction, therefore preventing contaminated water from the storm water drain 360 from flowing backing into the at least one open-topped utility channel 20. It will be appreciated that the one way valve may be any type of one-way valve suitable to prevent backflow including, but not limited to, any one of the following: a swing check valve, a gate valve, a double check valve, a tilting disc check valve.

In one embodiment, the modular ducting section 10 further comprises a catchment channel drainage aperture 400 located in a bottom portion of the open-topped catchment channel 30 and a catchment channel drainage pipe (not shown) having one end engaged with the catchment channel drainage aperture 400 for draining water from the open-topped catchment channel 30 in use. As shown in FIG. 19, the catchment channel drainage aperture 400 is located at one end of the open-topped catchment channel 30. However, it will be appreciated that the catchment channel drainage aperture 400 may be located anywhere along the bottom portion of the open-topped catchment channel 30 provided that water can be drained from the open-topped catchment channel 30 under gravity flow. This will be beneficial in the event of, for example, a heavy rainfall, where a large volume of water is captured from one or more nearby roadside structures, including, but not limited to any one or more of the following: residential or commercial properties, gardens, parks, and channelled into the open-topped catchment channel 30, whereby the level of water can be eased by transferring the excess water from the open-topped catchment channel 30 to, for example, a water storage tank (not shown) or reservoir (not shown) via the catchment channel drainage pipe.

In a preferred embodiment, the catchment channel drainage pipe has one end engaged with the catchment channel drainage aperture 400 and another end engaged with a water storage tank (not shown) or reservoir such that in use, water is liquidly communicated from the open-topped catchment channel 30 to the water storage tank or reservoir via the catchment channel drainage pipe. It will be appreciated that in the preferred embodiment, the water storage tank or reservoir is located substantially downstream of the modular ducting sections 10 lying end-to-end such that in use, water is liquidly communicated from the open-topped catchment channel 30 to the water storage tank or reservoir via the catchment channel drainage pipe under gravity flow. As shown in FIGS. 19 and 20, the catchment channel drainage aperture 400 is adapted to receive a drainage grille 410 for filtering and preventing, for example, debris or contaminants that have inadvertently entered the open-topped catchment channel 30 from being liquidly communicated from the open-topped catchment channel 30 into the water storage tank or reservoir via the catchment channel drainage pipe. As shown in FIG. 19, the drainage grille 410 comprises a bottom portion 420, a pair of opposing side walls 430, 430', a rear wall (not shown) and a front wall 440, each wall extending upwardly from the bottom portion 420, and a grille portion 450 disposed above and sealingly engaged with upper portions of the pair of opposing side walls 430, 430', rear wall and front wall 440 to define a hollow box, wherein the front wall 440 further comprises a drainage grille aperture 460. As shown in FIG. 20, the drainage grille 410 is located in the catchment channel drainage aperture 400 in the bottom portion of the open-topped catchment channel 30 so that the grille portion 450 is substantially level with the general level of a floor of the open-topped catchment channel 30, and the drainage grille aperture 460 in the front wall 440 of the drainage grille 410 is oriented to face in a direction substantially away from the road water runoff flange 80, such that in use, water passes from the open-topped catchment channel 30 through the grille portion 450 into the hollow part of the drainage grille 410 and out from the drainage grille aperture 460 and into the catchment channel drainage pipe. It will be appreciated that the drainage grille 410 is not limited to having this configuration and that other configurations may be used. For example, in another embodiment, the drainage grille 410 is a grille (not shown) adapted to locate in the bottom portion of the open-topped catchment channel 30. It will be appreciated that the drainage grille 410 may be manufactured from any suitable material for long-term operation. In the preferred embodiment, the drainage grille 410 is manufactured from a water resistant material, and more preferably a resilient water resistant material which includes, but is not limited to, any one of the following: stainless steel, brass, copper, polycarbonate (PC), polyethylene (PE).

In another embodiment, the open-topped catchment channel 30 may be in liquid communication with a sedimentation tank or device (not shown) en route to the water storage tank or reservoir so as to permit additional filtering and cleaning of the water in the open-topped catchment channel 30 prior to being deposited into the water storage tank or reservoir. It will be appreciated that the sedimentation tank may be any suitable type of sedimentation tank used in the treatment of water for purification purposes.

In one embodiment, and as shown in FIG. 21, the modular ducting section 10 further comprises a link region (not shown), wherein the base portion 15 comprises one or more link channels 468, 469 extending from the one or more open-topped utility channels 20 in the link region and terminating in one or more apertures 470, 480 in the side wall 25 of the open-topped utility channel 20 from which the road water runoff flange 80 extends outwardly from. An extension of each of the one or more utility lines passing from the one or more open-topped utility channels 20 to the one or more apertures 470, 480 via the one or more link channels 468, 469 in use. As shown in FIG. 21, a cross-section of the modular ducting section 10 comprising the link region taken along section line A-A (FIG. 21(iii)) shows one of the one or more link channels 468, 469 between the one or more open-topped utility channels 20 and one 470 of the one or more apertures 470, 480. It will be appreciated that in other embodiments, only one of the one or more open-topped utility channels 20 has a link channel 468 to one 470 of the one or more apertures. It will be appreciated that where the one or more utility lines in the one or more open-topped utility channels 20 are required to be isolated from one another, such isolated lines can be passed, as extensions of the one or more utility lines, through a different link channel of the one or more link channels 468, 469 in the link region to maintain their isolation from one another. As shown in FIG. 21, the modular ducting section 10 comprising the link region has a deeper end profile than that of the modular ducting section 10 described above and as shown, for example, in FIG. 1. The additional depth is beneficial in situations where the one or more utility lines, as extensions of the one or more utility lines, are required to pass, for example, under a road, from a first modular ducting section 10 having a link region to another modular ducting section 10 having a link region. In this embodiment, the one or more open-topped utility channels 20 and corresponding one or more link channels 468, 469 may comprise a resilient impermeable lining to prevent, for example, water, from entering the one or more open-topped utility channels 20 and one or more link channels 468, 469 in use, and to isolate and protect certain utility lines such as utility lines carrying electricity (namely power lines) from utility lines carrying water.

In one embodiment, the one or more open-topped utility channels 20 are two or more open-topped utility channels 20. In this embodiment, one of the two or more open-topped utility channels 20 is located between the open-topped catchment channel 30 and the other open-topped utility channel 20. This is beneficial as the open-topped utility channel 20 in the centre has channels either side to receive any undesirable contaminant, for example road water or water from the pavement, that may seep into the modular ducting section 10 during, for example, a heavy rainfall. As such, the central open-topped utility channel 20 has a greater chance of remaining dry such that those utility lines that are best kept away from water, for example, electricity and data/telecommunication lines, would benefit from being carried in the central open-topped utility channel 20.

In one embodiment, the modular ducting section 10 further comprises an end user supply channel 490, the end user supply channel 490 comprising one or more open-topped supply ducting sections 500 adapted for laying end-to-end and for carrying the one or more end user utility lines, wherein a first end of the end user supply channel 490 is adapted for connecting to the supply line 130 of the modular ducting section 10 via the junction box 140, and a second end of the end user supply channel 490 is adapted for connecting to an end user supply box 510, such that in use, the one or more end user utility lines are carried from the supply line 130 to the end user supply box 510 via the end user supply channel 490. In this embodiment, the end user supply channel 490 is designed to be installed between the modular ducting section 10 from which it receives the one or more end user utility lines via the supply line 130, and an end user such as, for example, a residential or commercial property. As shown in FIG. 22, the end user supply channel 490 is designed to be installed to a depth in the ground such that an upper portion of at least one of the one or more open-topped supply ducting sections 500 is substantially level with the general level of, for example, the pavement and/or garden/driveway/footpath, between the corresponding modular ducting section 10 and the end user. This is beneficial as the one or more end user utility lines carried in the end user supply channel 490 are readily accessible such that maintenance or repair to the one or more end user utility lines, or installation of a new end user utility line or utility service can be performed without first having to remove the end user supply channel 490 from the ground or make substantial excavation around the end user supply channel 490.

Referring specifically to FIGS. 22, 24 to 27, the end user supply channel 490 is connected to the supply line 130 via an end user channel connector 170. As shown in FIGS. 22 and 23, in this embodiment, the end user channel connector 170 is connected to the junction box 140 of the supply line 130 and acts as a conduit for feeding the bundled distribution lines, as the one or more end user utility lines, from the supply line 130 to the end user supply box 510 via the end user supply channel 490. The end user channel connector 170 also acts as a conduit for feeding the bundled distribution lines, as the one or more end user utility return lines from the end user supply box 510 to the return line 135 via the end user supply channel 490. The relationship between the end user channel connector 170, the junction box 140, the supply line 130 and return line 135 is more clearly shown in FIG. 23.

In this embodiment, the end user channel connector 170 is disposed at a substantially vertical angle with respect to the longitudinal axis of the modular ducting section 10 such that the end user utility supply lines and end user utility return lines can be fed from the corresponding supply line 130 and return line 135 in the supply channel 100, which is located below the general level of the pavement between the modular ducting section 10 and the end user, to the end user supply channel 490. The end user channel connector 170 is preferably manufactured from a resilient plastic material, including, but not limited to any one of the following: polycarbonate (PC), polyethylene (PE).

Referring specifically to FIGS. 25 to 27, in this embodiment, the one or more open-topped supply ducting sections 500 being adapted for laying end-to-end comprise a first modular section 520 (FIG. 25), one or more central modular sections 530 (FIG. 26) and an end modular section 540 (FIG. 27) lying end-to-end in series.

The first modular section 520, the one or more central modular sections 530, and the end modular section 540 each have a base portion 550, a pair of opposing side walls 570, 570' extending upwardly from the base portion 550, and a pair of ends wherein at least one of the pair of ends is adapted to interconnect with a complementary end of the pair of ends of the first modular section 520, the one or more central modular sections 530, or the end modular section 540 in the series. The first modular section 520, one or more central modular sections 530, and the end modular section 540 each further comprise an internal section 590 having a base portion 560 and a pair of opposing side walls 580, 580' extending upwardly from the base portion 560, the internal section 590 being adapted to locate in the first modular section 520, the one or more central modular sections 530 and the end modular section 540 to define a double lining arrangement, such that when in place, upper portions of the side walls 580, 580' of the internal section 590 are slightly raised above the corresponding upper portions of the side walls 570, 570' of the first modular section 520, the one or more central modular sections 530 and the end modular section 540. The internal sections 590 in the first modular section 520, in each of the one or more central modular sections 530, and in the end modular section 540 are adapted to carry the end user utility supply lines from the supply line 130 to the end user supply box 510, and conversely, carry the end user utility return lines from the end user supply box 510 to the return line 135.

The first modular section 520 is adapted at a first end to receive and interconnect with the end user channel connector 170. As shown in FIG. 25, a part of the base portion 550 of the first end of the first modular section 520 and a corresponding part of the base portion 560 of a first end of the internal section 590 located within the first modular section 520 have been removed to create a void to receive the end user channel connector 170 therein. In use, the respective first ends of the first modular section 520 and the internal section 590 are adapted to substantially abut an external surface of the catchment channel wall 70 of the modular ducting section 10 from which the end user supply channel 490 extends.

A second end of the internal section 590 overlaps a corresponding second end of the first modular section 520 to define a male end.

As shown in FIG. 26, each of the one or more internal sections 590 in the one or more central modular sections 530 are displaced with respect to a longitudinal axis of the one or more central modular sections 530 such that a first end of each of the one or more internal sections 590 located within the corresponding one or more central modular sections 530 and a corresponding first end of the one or more central modular sections 530 together define a female end, and a second end of each of the one or more internal sections 590 overhangs a corresponding second end of the one or more central modular section 530 to define a male end, such that in use, the female end of the one or more central modular sections 530 is adapted to receive the complementary male end of the first modular section 520. When the end user supply channel 490 is required to be long, for example, when the distance between the modular ducting section 10 from which the end user supply channel 490 extends and the end user is far, then it will be appreciated that more than one central modular section 530 will be needed. In this case, the male end of a first of the one or more central modular sections 530 is adapted to locate in the complementary female end of a second of the one or more central modular sections 530 to form a series of interconnected central modular sections 530.

As shown in FIG. 27, the internal section 590 located within the end modular section 540 is substantially shorter in length at a first end such that the first end of the internal section 590 and a corresponding first end of the end modular section 540 define a female end, such that in use, the female end of the end modular section 540 is adapted to receive the complementary male end of a last central modular section 530 of the series of central modular sections 530. A second end of the end modular section 540 comprises an end user platform 600 having an end user aperture 610 located therethrough, the end user platform 600 being adapted to receive the end user supply box 510 thereon, such that in use, the end user utility supply lines carried from the supply line 130 to the end user supply box 510 are adapted to pass through the end user aperture 610 in the end user platform 600 into the end user supply box 510. Conversely, the end user utility return lines are adapted to pass from the end user supply box 510 through the end user aperture 610 in the end user platform 600 into the end user supply channel 490 and fed back to the return line 135 via the end user channel connector 170.

It will be appreciated that the one or more open-topped supply ducting sections 500 are not limited to having male and female fittings at either end of the sections as means for connecting the sections together, but that any suitable connecting means may be used. For example, the internal sections 590 may be such that they do not overlap the respective ends of the one or more open-topped supply ducting sections 500 such that respective ends of each of the one or more open-topped supply ducting sections 500 are substantially flat in profile. In this example, facing ends of adjacent pairs of one or more open-topped supply ducting sections 500 are adapted to substantially abut one another and be connected together by, for example, one or more joining members (not shown), the one or more joining members being bolted at a first end to the facing end of a first of the adjacent pair of open-topped supply ducting sections 500 and bolted at a second end to the facing end of a second of the adjacent pair of open-topped supply ducting sections 500.

In this embodiment, and as shown in FIGS. 22 and 24, each of the one or more open-topped supply ducting sections 500 further comprises a supply ducting cover 620 being adapted to removably engage an upper portion of the side walls 570 of the each of the first modular section 520, the one or more central modular sections 530, and the end modular section 540 to substantially seal the first modular section 520, the one or more central modular sections 530, and the end modular section 540 of the one or more open-topped supply ducting sections 500 in use. As shown in FIG. 28, the supply ducting cover 620 comprises a top portion 630, a front end portion 640, and a pair of opposing side portions 650, 650', the front end portion 640 and the pair of opposing side portions 650, 650' extending downwardly from the top portion 630.

In this embodiment, and as shown in FIG. 24, the pair of opposing side portions 650, 650' of the supply ducting cover 620 removably engage the upper portions of the side walls 570 of each of the each of the first modular section 520, the one or more central modular sections 530, and the end modular section 540 such that the pair of opposing side portions 650, 650' of each of the supply ducting covers 620 overlap the pair of opposing side walls 580, 580 of each of the internal sections 590 located in each of the first modular section 520, the one or more central modular sections 530, and the end modular section 540. This overlapping arrangement is beneficial as it serves the purpose of preventing contaminants such as water, from seeping into the one or more open-topped supply ducting sections 500 in use. This arrangement also serves the purpose of enabling the supply ducting covers 620 to be returned to their correct location on each of the first modular section 520, the one or more central modular sections 530, and the end modular section 540 if they have been removed for a particular reason, for example, maintenance or repair, or when a new end user utility line or utility service is to be introduced.

In this embodiment, and as shown in FIG. 28, at least a part of the front end portion 640 of the supply ducting cover 620 is substantially convex in profile, affording the front end portion 640 of the supply ducting cover 620 with a substantially convex profile when viewed from the side. Similarly, at least a rear part of each of the pair of opposing side portions 650 of some of the supply ducting covers 620 is substantially concave in profile, affording a rear end portion 660 of the supply ducting cover 620 with a substantially concave profile when viewed from the side. The respective curvatures of the front end portion 640 and rear end portion 660 of the supply ducting cover 620 are complementary, such that in use, a rear end portion 660 of a first supply ducting cover 620 is adapted to receive a corresponding front end portion 640 of a second supply ducting cover 620 substantially therein when laid end-to-end. As shown in FIG. 27(i), an end portion 640 of the end user platform 600 of the end modular section 540, facing toward the first end of the end modular section 540 and being substantially aligned with the upper portions of the side walls 570 of the end modular section 540, has a complementary concave profile when viewed from the side, such that in use, the end portion 640 of the end user platform 600 is adapted to receive the substantially convex front end portion 640 of one of the supply ducting covers 620 when located on the end modular section 540. This is beneficial as the complementary curved profiles of the front end portion 640 and rear end portion 660 of the supply ducting covers 620 enable the supply ducting covers 620 to interlock with each other in an end-to-end arrangement when in place. It will be appreciated however, that the profile of the supply ducting cover 620 is not limited to that described above, but that any profile may be employed to ensure that the supply ducting covers 620 remain securely in place.

In this embodiment, for the supply ducting cover 620 adapted to removably engage the first modular section 520, the pair of opposing side portions 650, 650' of the supply ducting cover 620 are substantially flat, affording a rear end portion 660 of the supply ducting cover 620 with a substantially flat profile when viewed from the side. In this case, the rear end portion 660 of the supply ducting cover 620 is adapted to substantially abut the external surface of the catchment channel wall 70 of the modular ducting section 10 from which the end user supply channel 490 extends.

Preferably, the supply ducting covers 620 are not permanently fixed in place on the end user supply channel 490. This is beneficial as the one or more end user utility lines carried in the end user supply channel 490 are readily accessible such that maintenance or repair to the one or more end user utility lines can be performed, or a new utility line or utility service introduced.

In this embodiment, when the supply ducting covers 620 are in place, an upper surface of the supply ducting cover 620 is at a level that is substantially level with the general level of the pavement and/or garden/driveway/footpath where the end user supply channel 490 is installed. This is beneficial as it reduces the chance that an end user or pedestrian, for example, will catch their footing on an edge of the supply ducting covers 620.

In one embodiment, the modular ducting section 10 is pre-cast and made from concrete. The use of concrete, in particular, concrete that has low porosity will invariably reduce the chance of concrete cancer and surface degradation (spalling) occurring which will go some way to prolong the lifetime of the modular ducting sections 10. It will be appreciated that the choice of material, for example, the concrete mix, will depend largely on the environment within which the modular ducting sections 10 are to be installed. The modular ducting sections 10 can be manufactured easily and reproducibly using, for example, a mould (not shown) to receive the concrete mix for curing within the mould under controlled conditions. Pre-cast concrete cured in controlled conditions ensures increased quality of the material and reduce the formation of defects being formed in the modular ducting section 10. Using moulds to manufacture the modular ducting sections 10 has additional advantages in the sense that these sections can be mass produced, and mass produced offsite. Another advantage of using moulds is that the modular ducting sections 10 can be purposely designed to match the geography or streetscape layout. This is beneficial in situations where the general layout of a streetscape is non grid-like such that one or more modular ducting sections 10 would need to be manufactured to a particular design to account for, for example, curved or inclined sections of the streetscape.

In this embodiment, the concrete is preferably polymer concrete for its high resistance to chemical and biological attack, lightweight compared to cement concrete, excellent noise and vibration absorption, excellent dielectric properties, good weathering and UV resistance, low water absorption, flexural strength, thermal properties and stability, as well as its ultra smooth finish which encourages efficient hydraulic flow.

In one embodiment, the concrete is reinforced by one or more of the following reinforcing means, reinforcing bars (not shown), reinforcing grids (not shown), or reinforcing fibres (not shown). reinforcing the concrete with bars, grids or fibres will increase the rigidity of the concrete and prevent the modular ducting sections 10 from becoming damaged as a result of, for example, vibrations caused by constant heavy traffic, or simply from degradation caused by early aging, thereby increasing the overall lifetime of the concrete and the modular ducting sections 10. It will also be appreciated that the main channel cover 40, the one or more catchment channel covers 60, the sloped channel cover 210, the first and second sloped corner covers 220, 230, as well as the other various ducting sections and covers described herein will also be manufactured from concrete or reinforced concrete to enhance their strength and prolong their overall lifetime.

In this and in other embodiments, the modular ducting sections 10 may further comprise an earth rod (not shown), preferably a copper rod, to earth the one or more utility lines carried in the one or more utility channels 20. It will be appreciated that the introduction of the copper rod will be in accordance with the appropriate safety regulations of the jurisdiction within which the modular ducting sections 10 are installed.

It will be appreciated that the modular ducting section 10, the main channel cover 40, the one or more catchment channel covers 60, the sloped channel cover 210, the first and second sloped corner covers 220, 230, as well as the other various ducting sections and covers described herein are not limited to being manufactured from reinforced concrete, but that other resilient materials may be used. For example, in another embodiment, one or more of the modular ducting section 10, the main channel cover 40, the one or more catchment channel covers 60, the sloped channel cover 210, the first and second sloped corner covers 220, 230 or the other various ducting sections and covers described herein may be manufactured from a polymeric material, including, but not limited to, any one or more of the following polymeric materials: polyvinyl chloride (PVC), polyethylene (PE). Alternatively, the components may be manufactured from a resinous or fibre-reinforced resinous material to accommodate applications where cost reduction is preferable to long life.

In yet another embodiment, the one or more of the modular ducting section 10, the main channel cover 40, the one or more catchment channel covers 60, the sloped channel cover 210, the first and second sloped corner covers 220, 230 or the other various ducting sections and covers described herein may be manufactured from recycled polymeric materials such as for example recycled rubber tyres sometimes referred to as re-crumb rubber. The polymer may be virgin or recycled polyethylene (PE), which may be recycled high-density polyethylene or recycled low-density polyethylene or a mixture of these recycled polymers. In this case, the modular ducting section 10 is preferably manufactured by compression moulding.

The use of recycled polymeric materials in the manufacture of these components presents a number of advantages from an environmental point of view. For example, rubber tyres are among the largest and most problematic sources of waste, due to the large volume produced and their durability. They are not desired at landfills, due to their large volumes and 75% void space, which quickly consume valuable space. Manufacturing using these components from recycled materials is also likely to be cheaper than using concrete. An additional benefit of using recycled polymeric materials is the relative ease of transportation of modular ducting sections 10 made from these materials as compared to modular ducting sections 10 and other components (for example, the main channel cover 40, the one or more catchment channel covers 60, the sloped channel cover 210, the first and second sloped corner covers 220, 230) manufactured from concrete. For example, such components will be lighter in weight, easier to transport, and simpler to install at sites that in the event of, for example, an emergency (i.e. a refugee shelter, a natural disaster), utility lines can be installed almost immediately. To reduce weight further, the overall design of the modular ducting section 10 could be altered yet still retain the desired rigidity and longevity. For example, the side walls 26 of the modular ducting section 10 could be manufactured with an I-beam profile. In the case when the modular ducting sections 10 are to be manufactured from re-crumb rubber or another hardwearing polymeric material, such a profile could be easily produced through compression moulding.

Figure 29:
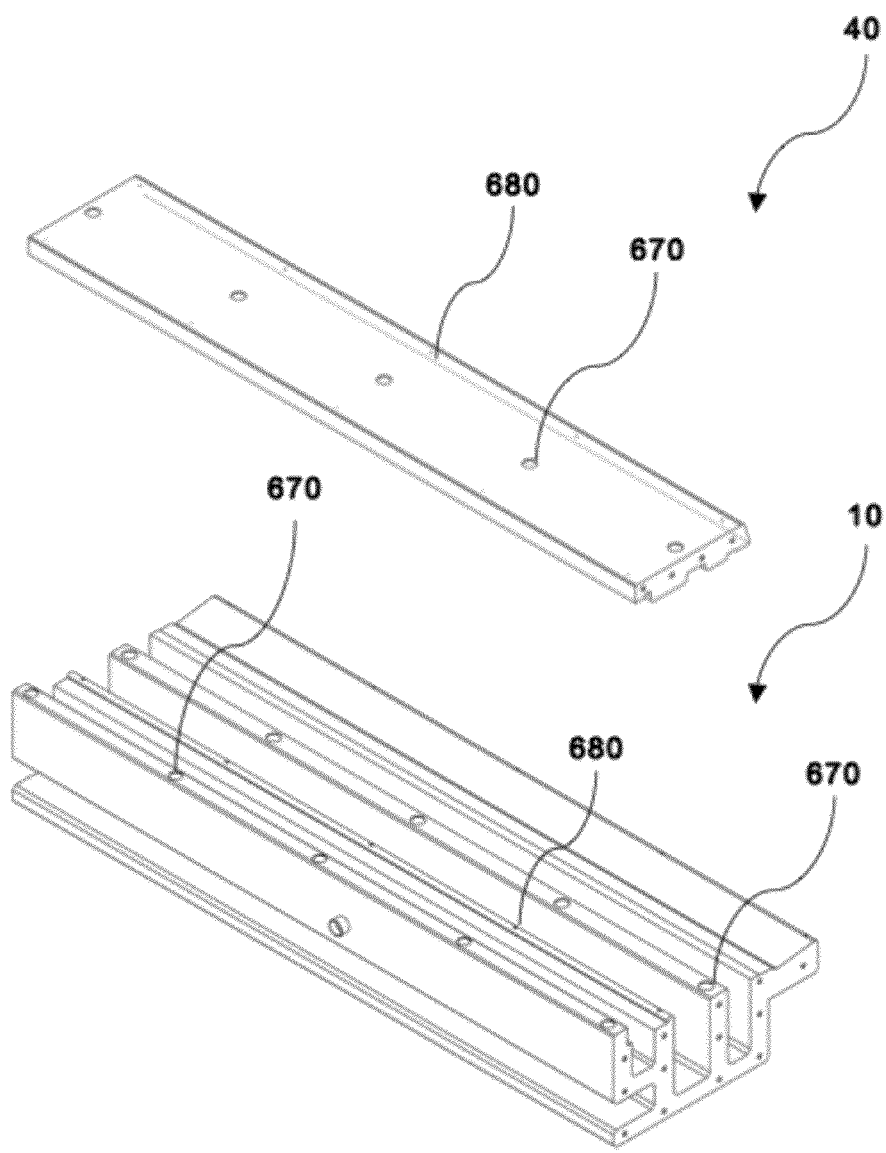
FIG. 29 is a perspective view of the modular ducting section of FIG. 2 further comprising a main channel cover, wherein the modular ducting section and the main channel cover are both manufactured with a substantially hollow interior and each further comprising a plurality of fill holes and a plurality of air escape holes.

In another embodiment, and as shown in FIG. 29, the modular ducting section 10 may be manufactured such that it has a substantially hollow interior. Preferably, the substantially hollow modular ducting section 10 is also manufactured with a plurality of fill holes 670 and a plurality of air escape holes 680 to enable the substantially hollow modular ducting section 10 to be filled with one or more materials. In this embodiment, the substantially hollow modular ducting section 10 is manufactured from one or more polymeric materials. Alternatively, the substantially hollow modular ducting section 10 may be manufactured from a resinous or fibre-reinforced resinous material, such as, for example, fibre glass. In this embodiment, the substantially hollow modular ducting section 10 is filled with material via the fill holes 670. It will be appreciated that the material used to fill the hollow interior may be any material that is granular, powdered or a liquid, including, but not limited to, any one or more of the following: concrete, cement, soil, sand, water, small rocks or stones such as gravel. The air escape holes 680 are adapted to allow air inside the modular ducting section 10 to escape freely during the filling process without becoming trapped and producing pressured areas. The hollow nature of the modular ducting section 10 allows the modular ducting section 10 to be light and easily transportable. Also the modular ducting section 10 allows relatively economic and abundant materials to be used to fill the substantially hollow interior. For example, in the instance where non binding material, such as water, sand, ground stone or soil is used to fill the substantially hollow interior of the modular ducting section 10, the modular ducting section 10 may be emptied when not in use and refilled at a later date to be reused somewhere else. It will be appreciated that other components, such as the main channel cover 40 and as shown in FIG. 29, may also be manufactured having a substantially hollow interior and comprising the plurality of fill holes 670 and the plurality of air escape holes 680.

The modular ducting section provides a number of advantages, including:

1. The modular ducting sections are designed to be installed between a pavement and a road in urban streetscapes at a depth that is level with the general level of the streetscape. This is beneficial as utility lines carrying such utility services as electricity or data/telecommunications can be located below street level thereby removing the need to install, for example, telegraph poles or electricity pylons at street level to carry such utility lines. This has the added benefit of removing such unnecessary obstacles from pavements thereby improving conditions for pedestrians. This has the further added benefit of reducing the possibility of accidents occurring as a result of vehicles colliding with telegraph poles.
2. The modular ducting sections being designed to be installed between a pavement and a road in urban streetscapes at a depth that is level with the general level of the streetscape means that they are clearly identifiable, thereby reducing the risk of breakage from other digging or trenching activities.
3. Removing telegraph poles or electricity pylons from urban streetscapes increases the aesthetics of the streetscape and maintains the property value of surrounding residential or commercial properties.
4. As the one or more utility channels are open-topped utility channels, access to the one or more utility lines contained therein for, for example, maintenance or repair, or for introducing a new utility line or utility service is possible.
5. The open-topped catchment channel enables water collected as water from, for example, roadside structures and gardens, to be isolated from more contaminated water, such as road water. This is beneficial as the water can be channelled to, for example, a water storage tank or reservoir to be stored for future use.
6. The open-topped catchment channel is isolated from the one or more open-topped utility channels to prevent the water in the open-topped catchment channel from entering the one or more open-topped utility channels. This is particularly beneficial from a safety aspect where the one or more utility lines are carrying gas, electricity and data/telecommunications, such that these utilities need to be isolated from the water in the open-topped catchment channel.
7. The open-topped catchment channel is also isolated from other sources of contamination such as water from the road surface. This is beneficial as it reduces the cost of cleaning the water in the catchment channel to make it suitable for other uses.
8. The open-topped catchment channel being able to collect water from, for example, roadside structures and gardens, is beneficial as it reduces the volume of water on the streetscape or road, thereby reducing the risk of flooding and improving road safety.
9. The modular ducting section is designed to be compliant with standard road configurations to ensure that no unnecessary additional work is required to install the modular ducting sections into existing streetscape infrastructure.
10. The utility services associated with the one or more utility lines, such as gas, electricity, water, data/telecommunications, can be distributed to, for example, one or more end users via the supply channel to supply the end users with the corresponding utility services.
11. When installed in urban streetscapes, the modular ducting sections lying end-to-end are located at a depth such that an upper portion of the catchment channel wall is substantially level with the general level of the streetscape.
12. The one or more open-topped utility channels can be isolated from one another and from the open-topped catchment channel. This is particularly beneficial from a safety aspect where the one or more utility lines are carrying gas and electricity or water and electricity, such that these utilities need to be isolated from one another.
13. The main channel cover can be removed from the one or more open-topped utility channels to enable easy access to the one or more utility lines carried therein in case of repair or maintenance, or when a new utility line or utility service is to be introduced.
14. The open-topped catchment channel can be substantially sealed thereby preventing the water contained within the catchment channel from becoming contaminated with debris or road water.
15. The upper portion of the open-topped catchment channel and the upper portion of the side wall of the open-topped utility channel from which the catchment channel wall extends together form a seating recess to receive the one or more catchment channel covers. This is beneficial as when the one or more catchment channel covers are in place, they are substantially level with an upper portion of the catchment channel wall, and therefore, substantially level with the general level of the streetscape.
16. The catchment channel covers can be mounted on or removed from the open-topped catchment channel quickly and easily. This is beneficial in the case where, for example, the open-topped catchment channel needs to be repaired or undesirable debris or contaminants need to be removed from the water contained within the open-topped catchment channel.
17. The sloped road water runoff flange allows road water to be channelled along the upper surface of the sloped road water runoff flange until it reaches a storm water drain where it can be drained.
18. The profile of the road water runoff flange is designed to be compliant with a standard road configuration to ensure that no unnecessary additional work is required to install the modular ducting sections into existing streetscape infrastructure.
19. The channel cover side region of the main channel cover defines a kerb of a sufficient height to prevent, for example, road water being channelled along the road water runoff flange from overlapping the main channel cover and flooding the open-topped utility channels or contaminating the water in the open-topped catchment channel.
20. The utility services associated with the one or more utility lines, such as electricity, gas, water, data/telecommunications, can be distributed to, for example, one or more end users via the supply line to supply the end users with the corresponding utility services.
21. In the case where an end user has a means for generating renewable energy such as, for example, solar panels, a wind turbine, a water turbine, any excess energy generated by these renewable energy sources that is not being used by the end user, can be fed back to the corresponding utility line in the open-topped utility channel via the supply line and thus back into the power grid. This is beneficial as the end user can reduce the cost of their energy bill for the electricity they receive from a utility supplier by not only limiting the amount of electricity they draw from the supplier, but also by being able to effectively "sell back" to the supplier the excess energy they have generated themselves from the renewable energy sources. This is also beneficial as such renewable energy can be locally networked to provide power to the local community.
22. The modular ducting sections can be manufactured easily and reproducibly using, for example, a mould to receive the concrete mix for curing within the mould under controlled conditions.
23. Pre-cast concrete cured in controlled conditions ensures increased quality of the material.
24. The modular ducting sections can be mass produced offsite.
25. The use of concrete, in particular, concrete that has low porosity to prevent concrete cancer or surface degradation (spalling) will ensure the lifetime of the modular ducting sections.
26. The use of other materials such as recycled polymeric materials, resinous materials, or fibre-reinforced resinous materials provides not only a cost-effective alternative to concrete, but also enables recycled materials to be used.
27. The modular ducting sections can be purposely designed to match the geography or streetscape layout. This is beneficial in situations where the general layout of a streetscape is non grid-like such that one or more modular ducting sections would need to be manufactured to account for, for example, curved or inclined sections of the streetscape.
28. Reinforcing the concrete with bars, grids or fibres will increase the rigidity of the concrete and prevent the modular ducting section from becoming damaged as a result of, for example, vibrations caused by constant heavy traffic or impacts.
29. Reinforcing the concrete will increase the overall lifetime of the concrete for permanent and long duration applications.
30. The main channel cover is adapted to fit flush with the upper portion of the side walls of each of the one or more open-topped utility channels.
31. The main channel covers can be mounted on or removed from the open-topped utility channels quickly and easily. This is beneficial as it permits the easy and low cost installation of a new driveway or wheelchair ramp simply by replacing the main channel cover with a sloped channel cover and a pair of sloped corner channel covers located either side of the sloped channel cover.
32. The modular ducting sections can also be made from a moulded or extruded plastic such as PVC or other suitable plastics, where the moulded plastic can be manufactured as a solid or hollow modular ducting section. This is beneficial; as when the modular ducting section has a hollow core, it can be filled with material, such as, for example, water, concrete or a resinous material, to provide structural stiffness.
33. Moulded or extruded modular ducting sections can be applied to environments which may not be permanent or where cost constraints do not permit the use of concrete.
34. The use of main channel cover recesses to engage with the upper portion of the side walls of each of the open-topped utility channels ensures a good and secure seal is formed between the main channel cover and the open-topped utility channels and prevents undesirable lateral movement of the main channel cover caused by, for example, vibrations from heavy traffic or impacts.
35. The use of channel seal members ensures a good and substantially secure seal is formed between the main channel cover and the open-topped utility channels. This is beneficial for preventing water or debris from entering the open-topped utility channels.
36. The channel seal members can also be used to absorb vibration caused by, for example, heavy traffic along the road, impacts, or in the event a vehicle mounts the kerb.
37. Electric vehicles, for example, can be recharged at the side of the road without needing to connect the electric vehicle to a power supply port from a roadside structure such as a residential or commercial property. This is beneficial as the power supply port is close to the electric vehicle such that there is no need to have power cables running between the roadside structure and the electric vehicle across, for example a pedestrian thoroughfare, thus ensuring the safety of pedestrians.

38. The upper surface of the main channel cover can be modified with guide protrusions to warn sight challenged persons of, for example, areas of pending danger. For example, the guide protrusions could be arranged in a continuous line running along the kerb parallel with the road so that a sight-challenged person would understand that they are close to the side of the road.

39. The one or more guide protrusions can be arranged in any one of a number of patterns on the main channel cover to indicate to sight-challenged persons that certain facilities such as, for example, a post office, a bank, a telephone box, a police station, a library, are nearby.

40. The downwardly sloped upper surface of the main channel cover away from the open-topped catchment channel and toward the road provides, for example, a driveway access for vehicles, or a ramp to allow wheelchair bound users or pedestrians pushing prams, pushchairs or other wheeled devices a smoother transition from the pavement to the road and vice versa, when crossing the road.

41. Electromagnetic shielding limits the penetration of electromagnetic fields from utility lines carrying electricity into the environment. This is beneficial in the case where utility lines carrying data/telecommunications are in close proximity to the utility lines carrying electricity.

42. The modular ducting sections can be purposely designed and moulded to match the geography of the terrain or streetscape layout. This is beneficial where the streetscape is curved such as at a street corner, 43. The main channel covers can be purposely designed and moulded to match the geography of the terrain or streetscape layout. This is beneficial where the streetscape is curved such as at a street corner.

44. The catchment channel covers can be purposely designed and moulded to match the geography of the terrain or streetscape layout. This is beneficial where the streetscape is curved such as at a street corner.

45. The modular ducting sections can be purposely designed and moulded to match the geography of the terrain or streetscape layout. This is beneficial where the streetscape has a change in gradient.

46. The main channel covers can be purposely designed and moulded to match the geography of the terrain or streetscape layout. This is beneficial where the streetscape has a change in gradient.

47. The catchment channel covers can be purposely designed and moulded to match the geography of the terrain or streetscape layout. This is beneficial where the streetscape has a change in gradient.

48. The extension of each of the one or more utility lines connects the one or more utility lines from the corresponding one or more open-topped utility channels to the service distribution box via the one or more service channels.

49. The one or more service channels are isolated from one another, such that in use, the extensions of the one or more utility lines extending from the one or more open-topped utility channels to the service distribution box remain isolated from one another.

50. In the case where the one or more utility lines are gas and electricity lines or water and electricity lines, and these utilities need to be isolated from one another for safety reasons, the extensions of the one or more utility lines can be directed into separate service ports to retain their isolation from one another. In this case, the one or more utility lines that need to be isolated are best directed from the corresponding open-topped utility channels through the one or more dedicated service channels to the corresponding one or more service ports in the service distribution box.

51. The service distribution box can comprise one or more isolation switches to enable a service engineer or any other authorized person to isolate one or more of the utilities. For example, in the event of a gas leak, the gas supply can be isolated at the service distribution box.

52. The service distribution box can comprise one or more utility meters to enable, for example, a service engineer, to monitor the status of the utility. For example, the utility meter could be a gas meter to enable the service engineer to monitor the gas pressure.

53. The sloped road water runoff flange is adapted such that the modular ducting section can be installed at locations with pre-existing storm water drains, such that the existing infrastructure can be used without incurring additional and unnecessary cost to install a new drainage system.

54. The surface of the sloped road water runoff flange is sloped downwards in the direction of the storm water grate of the storm water drain such that road water runoff is channelled along the upper surfaces of the road water runoff flanges of the modular ducting sections lying end-to-end and directed into the pre-existing storm water grate.

55. in the event of, for example, a heavy rainfall, where a large volume of water is captured from one or more nearby roadside structures and channelled into the open-topped catchment channel, the level of water can be eased by transferring the excess water from the open-topped catchment channel to, for example, a storm water drain, via the catchment channel overflow pipe.

56. The catchment channel overflow aperture can be set at any height in the catchment channel wall. This will be beneficial in areas where there is a higher than average annual rainfall.

57. In the event of, for example, a heavy rainfall, where road water runoff enters into the one or more open-topped utility channels, the level of water can be eased by transferring the excess water from the one or more open-topped utility channels to a storm water drain via the utility channel drainage pipe.

58. In the event of, for example, a heavy rainfall, where a large volume of water is captured from one or more nearby roadside structures and channelled into the open-topped catchment channel, the level of water can be eased by transferring the excess water from the open-topped catchment channel to, for example, a water storage tank or reservoir for future use.

59. For end users that require air conditioning, the water in the water storage tank or reservoir can be channelled to those that need it to be used to circulate around the end users' properties to provide more cost effective air conditioning. It will be appreciated that one or more common heat exchangers may be employed to remove the heat from the water. The energy generated from the heat may then be employed elsewhere.

60. The extension of each of the one or more utility lines can be carried from the one or more open-topped utility channels to the one or more apertures and allowed to pass therethrough.

61. The one or more link channels are isolated from one another, such that in use, the extensions of the one or more utility lines passing from the one or more open-topped utility channels to the one or more apertures via the one or more link channels remain isolated from one another.

62. A least one of the two or more utility channels is located between two utility channels or between a utility channel and the catchment channel. This is beneficial where the at least one utility channel has channels located either side of the at least one utility channel to collect any water or debris that might emanate from road water runoff or from flooding to prevent or at least reduce the possibility of the at least one utility channel from becoming flooded. As such, the at least one utility channel can be designated to carry one or more utility lines that need to be isolated from water.

Figure 30:
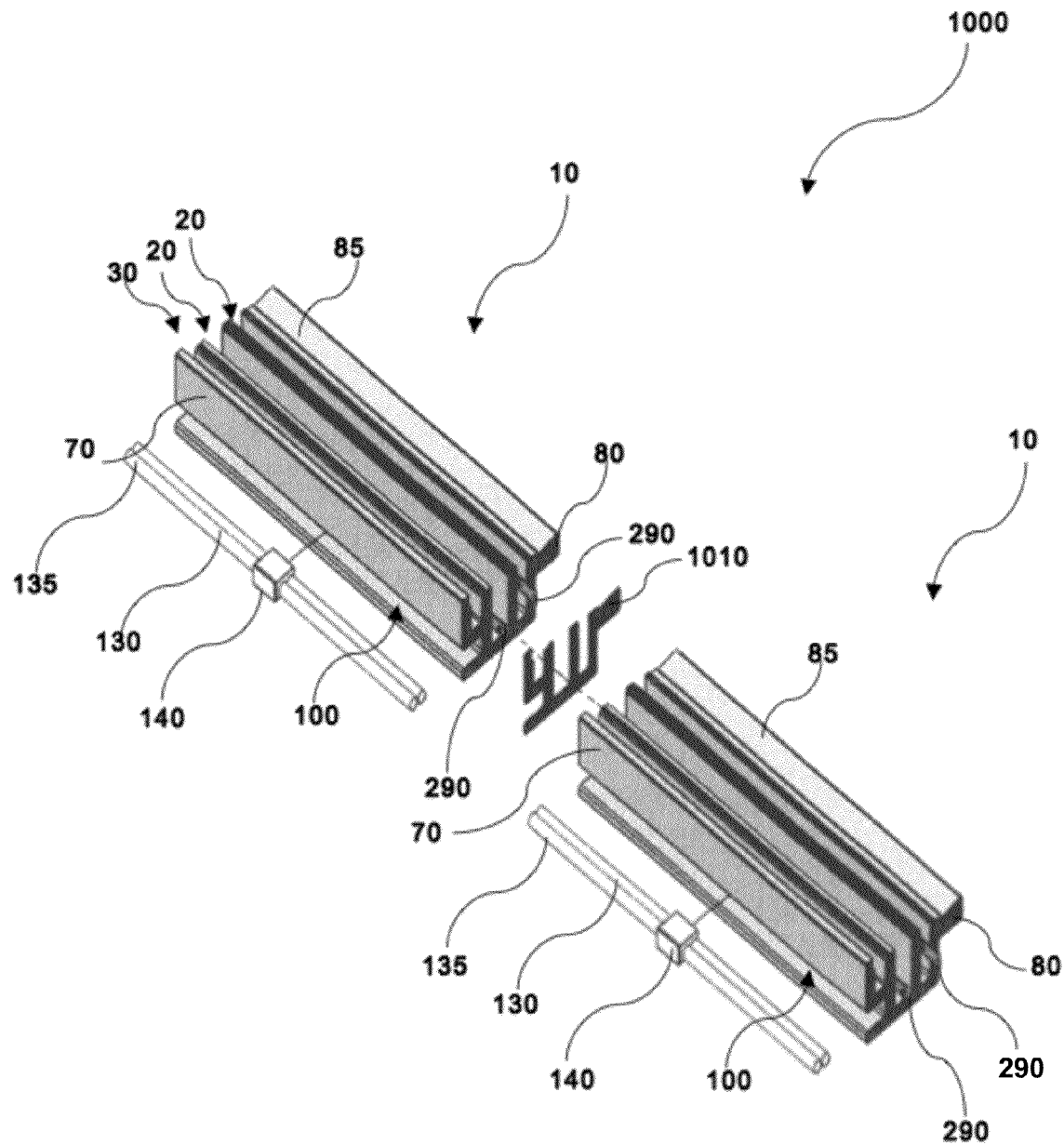
FIG. 30 is a ducting system comprising two or more modular ducting sections of FIG. 1 adapted for laying end-to-end in accordance with another preferred embodiment of the present invention.
Figure 36:
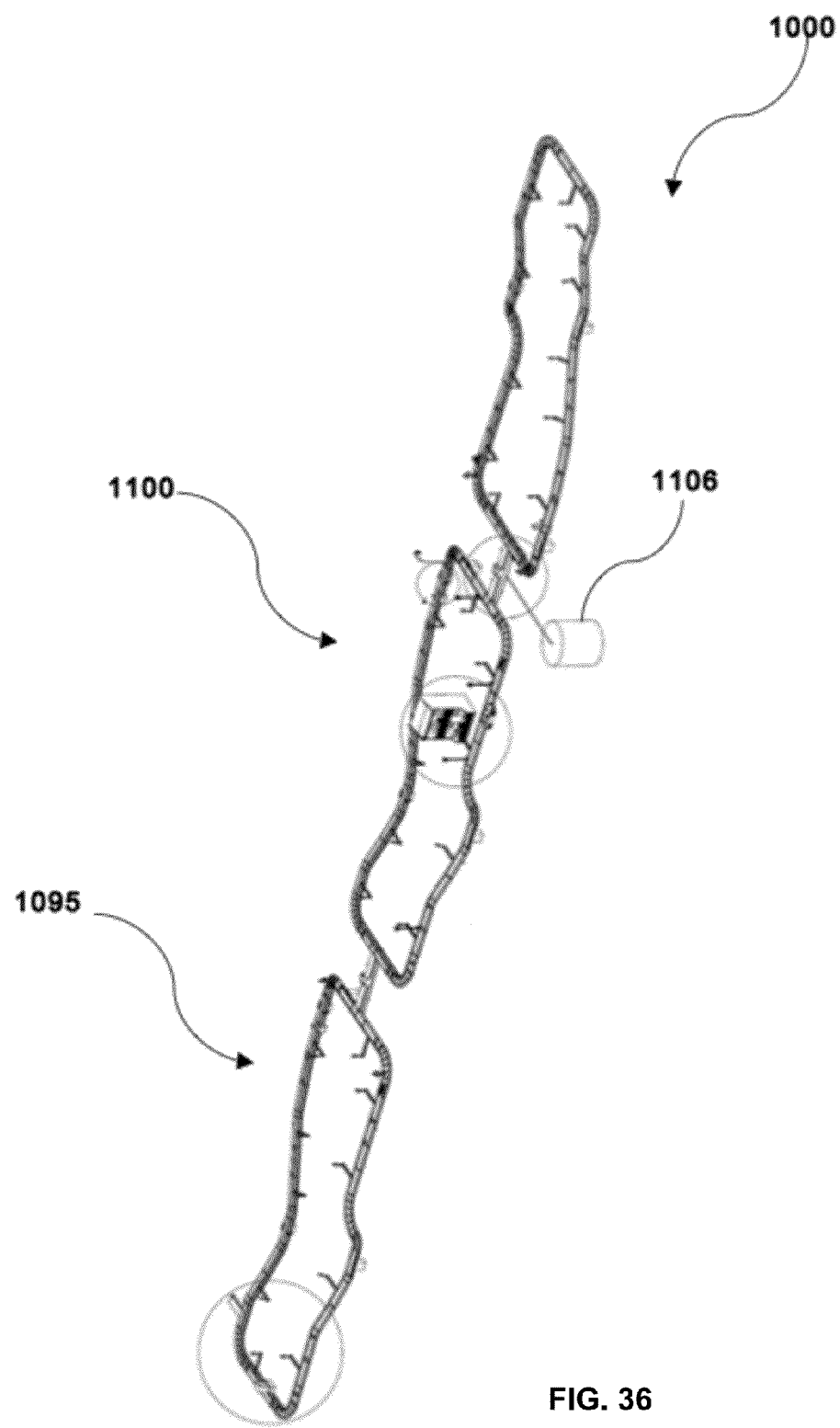
FIG. 36 is a perspective view of a first, second and third closed ducting loops, being linked together in series to form a network of closed ducting loops.

Referring specifically to FIGS. 30, 36 and 38, a ducting system 1000 in accordance with a second embodiment of the present invention is provided comprising two or more modular ducting sections 10 of the first embodiment of the present invention lying end-to-end, wherein the corresponding one or more open-topped utility channels 20, the open-topped catchment channel 30, the supply channel 100, and the road water runoff flange 80 of the two or more modular ducting sections 10 are substantially aligned. This allows the ducting system 1000 to provide the one or more open-topped utility channels 20, the open-topped catchment channel 30, the supply channel 100, and the road water runoff flange 80, continuously throughout its entire length. The ducting system 1000 can have modular ducting sections 10 of varying length allowing the ducting system 1000 to adapt and fit to the required length of the urban streetscape. As shown for example in FIGS. 36 and 38 (i), it will be appreciated that the ducting system 1000 can comprise two or more modular ducting sections 10 that allow the ducting system 1000 to substantially match the curvature of the urban streetscape. The modular ducting sections 10 such as those having at least a portion that is substantially curved in profile when viewed from above, as shown in FIG. 9, and as described in the first embodiment of the present invention, and herein referred to as a curved modular ducting section 10, are utilised in the ducting system 1000 to create this curvature or bend. The degree of curvature needed is created by a single curved modular ducting section 10 or a series of curved modular ducting sections 10 lying end to end. It will be appreciated that in this embodiment, the two or more modular ducting sections 10 of the ducting system 1000 will comprise the corresponding main channel cover 40 and one or more catchment channel covers 60, as described in the first embodiment of the present invention. As shown in FIG. 38 (i), it will be appreciated the ducting system 1000 can also utilise one or more modular ducting sections 10 having at least a portion that is substantially curved in profile when viewed from the side to create inclinations or declinations to conform with the gradient of the streetscape, as described in the first embodiment of the present invention.

Figure 31:
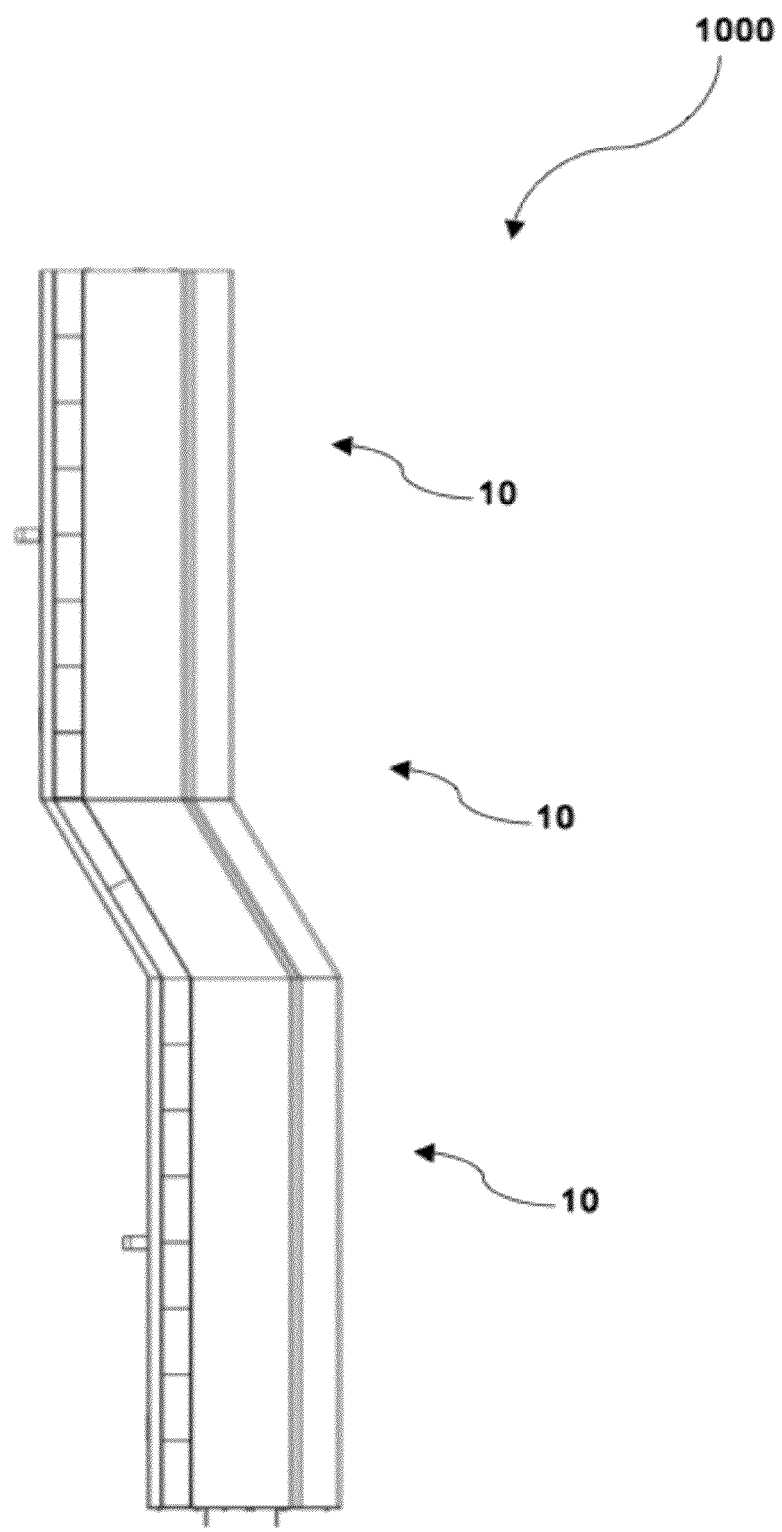
FIG. 31 is a top view of a ducting system of FIG. 30, further comprising a modular section being substantially parallelogram in shape when viewed from above.

As shown in FIG. 31, the ducting system 1000 can comprise two or more modular ducting sections 10 being substantially parallelogram in shape when viewed from above, as described in the first embodiment of the present invention. The use of the substantially parallelogram shaped modular ducting sections 10 allows misaligned modular ducting sections 10 in the ducting system 1000 to be connected by the use of the modular ducting sections 10 being substantially parallelogram in shape. Also, the substantially parallelogram shaped modular ducting sections 10 allows immovable obstacles such as trees, poles and other structures on the ground, to be avoided with relative ease. By installing one or more substantially parallelogram shaped modular ducting sections 10 end-to-end with the already installed two or more modular ducting sections 10 of the ducting system 1000, the direction of the two or more modular ducting sections 10 can be re-routed around the immovable obstacles.

As shown in FIG. 13, the ducting system 1000 can also comprise two or more modular ducting sections 10 having a single open-topped utility channel 20 and two side walls 25 that substantially reduces the width of the modular ducting section 10, and herein referred to as a narrow modular ducting section 10, as described in the first embodiment of the present invention. This allows the ducting system 1000 to be installed where a portion of the urban streetscape is relatively narrow. In the instance when the narrow modular section 10 comprising the single open-topped utility channel 20 having the two or more separated utility channel portions 294, 294' needs to be laid end-to-end with the two or more modular ducting sections 10 comprising two or more open-topped utility channels 20, a transition modular ducting section (not shown) will be used to transition and align the one or more utility lines carried in the two or more open-topped utility channels 20 of the two or more modular ducting sections 10 to the two or more separated utility channel portions 294, 294' of the narrow modular ducting section 10 to maintain the desired isolation of the one or more utility lines.

As shown in FIG. 38, the ducting system 1000 can comprise two or more modular ducting sections 10 having a sloped channel cover 210 and wherein at least a portion of an upper surface 215 of the sloped channel cover 210 is substantially sloped downwards in a direction away from the open-topped catchment channel 30, as shown in FIGS. 6 and 7, and as described in the first embodiment of the present invention. The modular ducting sections 10 having a sloped channel cover 210 provides the ducting system 1000 with driveway access 1001 for vehicles, or ramps 1002 to allow wheelchair bound users or pedestrians pushing prams, pushchairs or other wheeled devices a smoother transition from the pavement to the road and vice versa, when crossing the road. It will be appreciated that the number of modular ducting sections 10 having a sloped channel cover 210 comprised in the ducting system 1000 is dependent on the streetscape and its requirement for smooth transition points from a pavement to the road and vice versa.

Referring specifically to FIG. 37 (ii), the ducting system 1000 can also accommodate one or more storm water grates 350 of storm water drains 360 pre-existing in the streetscape by using modular ducting sections 10 comprising a road water runoff flange 80 that is adapted to receive the storm water grate 350 of the storm water drain 360, and wherein at least a portion 90, 90' of the upper surface 85 of the sloped road water runoff flange 80 is substantially sloped downwards in a direction toward the storm water grate 350, as shown in FIGS. 17 and 18, and as described in the first embodiment of the present invention. This allows the ducting system 1000 to drain the road water collected on the upper surfaces 85 of the substantially aligned road water runoff flanges 80 of the two or more modular ducting sections 10 lying end-to-end to the sloped portion 90, 90' of the upper surface 85 of the road water runoff flange 80 and into the corresponding storm water drains 360. It will be appreciated that the number of modular ducting sections 10 having a sloped road water runoff flange 80 comprised in the ducting system 1000 is dependent on the number of storm water drains 360 in the streetscape.

Referring specifically to FIG. 37(ii) and FIG. 38, it will be appreciated that the one or more utility lines may be accessed by at least one of the two or more modular ducting sections 10 of the ducting system 1000 further comprising the service distribution box 300, as shown in FIGS. 14, 15 and 16, and as described in the first embodiment of the present invention. The service distribution box 300 allows the one or more utilities associated with the corresponding one or more utility lines to be distributed, monitored, and isolated to end users, the end users being residential and commercial properties, as well as one or more public services, throughout the ducting system 1000. The ducting system 1000 provides a platform to introduce new infrastructure rather than trying to upgrade existing and often poor performing systems. This is beneficial in situations where for example, intelligent lighting smart metering, water recycling systems and other advanced systems can be introduced. For example, public services such as street lighting, traffic lighting, road signs, pedestrian crossings, information displays, bus shelter lighting and information displays, among other public services, can all be introduced into the streetscape, and each drawing power and data control from the supply lines 130. It will also be appreciated that the number of modular ducting sections 10 having the service distribution box 300 in the ducting system 1000 is dependent on the number of end users that require the utilities associated with the one or more utility lines.

As shown in FIG. 43(ii), the ducting system 1000 can also comprise one or more modular ducting sections 10 having the link region as described in the first embodiment of the present invention, wherein the base portion 15 comprises one or more link channels 468, 469 extending from the one or more open-topped utility channels 20 in the link region and terminating in one or more apertures 470, 480 in the side wall 25 of the open-topped utility channel 20 from which the road water runoff flange 80 extends outwardly from. An extension of each of, the one or more utility lines passing from the one or more open-topped utility channels 20 to the one or more apertures 470, 480 via the one or more link channels 468, 469 in use. Each link region of the one or more modular ducting sections 10 enables the one or more utility lines carried in the corresponding one or more open-topped utility channels 10 in the modular ducting sections 10 of the ducting system 1000 to be presented for connecting to a link region of another ducting system 1000, located, for example, across the road. It will be appreciated that the number of modular ducting sections 10 having the link region being employed in the ducting system 1000 is dependent on the requirements to connect to other isolated ducting systems 1000. It will also be appreciated that the ducting system 1000 can comprise of at least one modular ducting section 10 with the link region for carrying the one or more utility lines directly from the supplier as a trunk feed. Alternatively, the ducting system 1000 receives the one or more utility lines from another isolated ducting system 1000.

As shown in FIG. 37(iii), the one of the two or more modular ducting sections 10 can also have the power supply port 120 of the main channel cover 40 in power communication with a power utility line (not shown) carried in one of the one or more open-topped utility channels 20, the power supply port 120 adapted to provide a means to recharge an electric vehicle (not shown).

In one embodiment, the two or more modular ducting sections 10 are removably coupled to each other via one or more joining members 290. In this embodiment, there are two joining members 290 for the coupling of adjacent pairs of modular ducting sections 10 of the two or more modular ducting sections 10. It will be appreciated, that there may be one or more joining members 290 for the coupling of the adjacent pairs of modular ducting sections 10. In this embodiment, each of the joining members 290 is rectangular in shape and comprises two apertures (not shown), one of the two apertures being located at either end of the joining member 290 and adapted to receive a bolt (not shown) extended therethrough. In use, the joining members 290 couple the adjacent pair of modular ducting sections 10 together by having the joining members 290 bolted to one end of each of the pair of adjacent modular ducting sections 10. Each of the joining members 290 being bolted to the side wall 25 of one of the one or more open-topped utility channels 20 of each of the adjacent pairs of modular ducting sections 10. In this embodiment, the bolts may be permanently set in the side walls 25 of the modular ducting section 10 at, for example, the moulding stage, or holes adapted to receive the bolts may be drilled in the side walls 25 once the modular ducting section 10 has been manufactured. It will be appreciated that one of the two apertures in the joining member 290 may be an elongated aperture to allow longitudinal movement of the bolt therein to make adjustments in position before securing the adjacent pair of modular ducting sections 10 together. It will be appreciated that the one or more joining members 290 are not limited to the configuration described above, and that any suitable configuration may be employed to connect the two or more modular ducting sections 10 together to form a ducting system 1000 that is held together under compression. The coupling of the two or more modular ducting sections 10 via one or more joining members 290 prevents them from moving apart and to thus keep the one or more open-topped utility channels 20, open-topped catchment channel 30, and supply channel 100 of the two or more modular ducting sections 10 substantially aligned. This will be beneficial to prevent the one or more utility lines in the open-topped utility channels 20 from becoming trapped between, for example, facing ends of adjacent pairs of modular ducting sections 10 or severed as a result of undesirable movement of the two or more modular ducting sections 10. This will also be beneficial to prevent the substantially aligned open-topped catchment channels 30 of the two or more modular ducting sections 10 from becoming displaced from one another causing water to leak out of the open-topped catchment channel 30.

Referring specifically to FIGS. 30 and 32, in one embodiment, the ducting system 1000 further comprises ducting section gaskets 1010 being adapted for location between facing ends of adjacent pairs of modular ducting sections 10. The ducting section gaskets 1010 being substantially thin and each having the same shape as the end profile of the modular ducting sections 10, such that when the ducting section gaskets 1010 are between facing ends of the adjacent pairs of modular ducting sections 10, the ducting section gaskets 1010 do not interfere with the functionality of the one or more open-topped utility channels 20, the open-topped catchment channel 30, the supply channel 100, and the road water runoff flange 80. It will be appreciated the ducting section gasket 1010 may be of any thickness required between the adjacent pairs of modular ducting sections 10. Preferably the ducting section gaskets 1010 are manufactured from recycled polymeric materials such as for example recycled rubber tyres sometimes referred to as re-crumb rubber. The polymer may be virgin or recycled polyethylene (PE), which may be recycled high-density polyethylene or recycled low-density polyethylene or a mixture of these recycled polymers. In this case, the ducting section gaskets 1010 will be compression moulded. Furthermore, it is preferable that the ducting section gasket 1010 is constructed from a piece of unitary material. It will be appreciated; however, the ducting section gasket 1010 may be constructed from different pieces of material. The ducting section gaskets 1010 ensure a good seal is formed between the adjacent pairs of modular ducting sections 10 to prevent the substantially aligned open-topped catchment channels 30 of the two or more modular ducting sections 10 from becoming displaced from one another causing water to leak out of the open-topped catchment channel 30. Any movement of the two or more modular ducting sections 10 caused by, for example, heavy machinery, or traffic, can be absorbed by the ducting section gaskets 1010 to prevent the adjacent pairs of modular ducting sections 10 from becoming displaced or misaligned. Furthermore, the ducting section gaskets 1010 prevent the facing ends of the adjacent pairs of modular ducting sections 10 from becoming damaged due to wear caused by the two facing ends rubbing against one another. It will be appreciated that the ducting section gaskets 1010 also prevent undesirable cracking of any of the two or more modular ducting sections 10 by allowing for thermal expansion of the modular ducting sections 10. This is particularly beneficial in environments prone to high temperatures.

In one embodiment, the ducting section gaskets 1010 comprise one or more ducting section locating lugs 1020 on each side and the facing ends of the adjacent pairs of modular ducting sections 10 comprise one or more ducting section recesses 1015 to receive the one or more ducting section locating lugs 1020 of the corresponding side of one of the ducting section gaskets 1010 therein for positively locating the ducting section gasket 1010 between the facing ends of the adjacent pairs of modular ducting sections 10. The one or more ducting section locating lugs 1020 extend perpendicularly, outwardly from each side of the ducting section gasket 1010, having the same arrangement as the one or more ducting section recesses 1015 on the corresponding facing ends of the adjacent pairs of modular ducting section 10. Preferably, the one or more ducting section locating lugs 1020 are constructed from the same unitary piece of material as the ducting section gasket 1010. It will be appreciated that the one or more ducting section locating lugs 1020 may be constructed from different pieces of material and attached to the ducting section gasket 1010. The one or more ducting section locating lugs 1020, once received into the one or more ducting section recesses 1015, ensure that the ducting section gasket 1010 is held in place between the facing ends of adjacent pairs of modular ducting sections 10.

Figure 35:
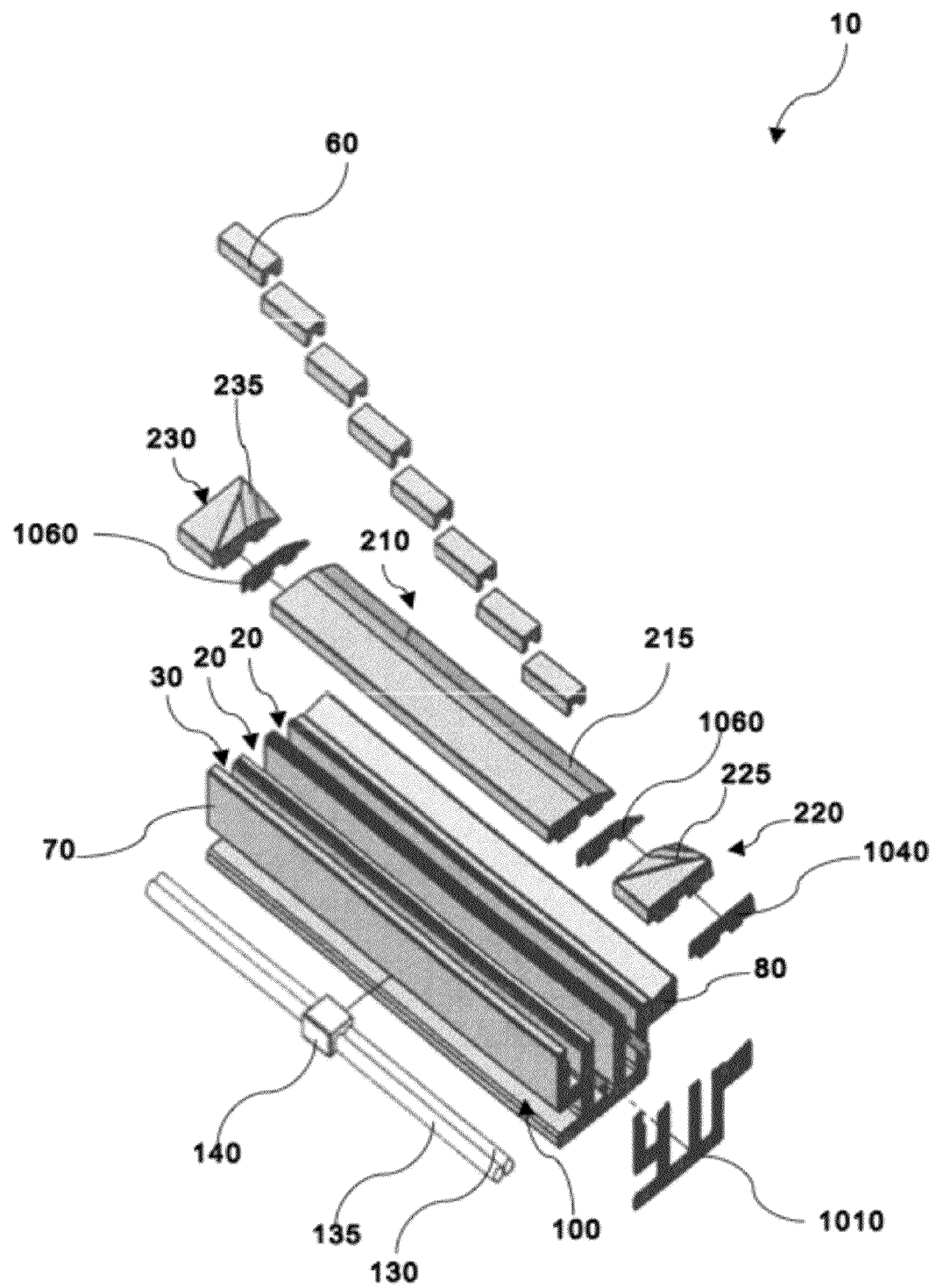
FIG. 35 is a perspective view (in exploded form) of one of the two or more modular ducting sections of FIG. 30, further comprising one or more catchment channel covers, a sloped channel cover, a first and second sloped corner covers, a first sloped corner cover gasket being adapted to locate between the first sloped corner cover and a first end of the sloped channel cover, and a second sloped corner cover gasket being adapted to locate between the second sloped corner cover and a second end of the sloped channel cover.

Referring specifically to FIG. 35, in one embodiment, the ducting system 1000 further comprises main channel cover gaskets 1040 adapted for location between facing ends of adjacent pairs of main channel covers 40. The main channel cover gaskets 1040 being substantially thin and each having the same shape as the facing ends of the adjacent pairs of main channel covers 40, such that when the main channel cover gaskets 1040 are between facing ends of the adjacent pairs of the main channel covers 40, the main channel cover gaskets 1040 do not interfere with the functionality of the one or more open-topped utility channels 20, the ducting section gaskets 1010 and the road water runoff flange 80. It will be appreciated that the main channel cover gasket 1040 may be of any thickness required for location between the adjacent pairs of main channel covers 40. Preferably the main channel cover gaskets 1040 are manufactured from recycled polymeric materials such as for example recycled rubber tyres, sometimes referred to as re-crumb rubber. The polymer may be virgin or recycled polyethylene (PE), which may be recycled high-density polyethylene or recycled low-density polyethylene or a mixture of these recycled polymers. In this case, the main channel cover gaskets 1040 will be compression moulded. Furthermore, it is preferable that the main channel cover gaskets 1040 are constructed from a piece of unitary material. It will be appreciated; however, that the main channel cover gaskets 1040 may be constructed from different pieces of material. The main channel cover gaskets 1040 between adjacent pairs of main channel covers 40 ensure a good seal is formed between the main channel covers 40 to prevent water and other debris from contaminating the one or more open-topped utility channels 20 of the two or more modular ducting sections 10.

In one embodiment, each of the main channel cover gaskets 1040 comprises one or more main channel cover locating lugs (not shown) on each side and the facing ends of the adjacent main channel covers 40 each comprise one or more main channel cover lug recesses 1045 to receive the one or more main channel cover locating lugs of the corresponding side of one of the main channel cover gaskets 1040 therein for positively locating the main channel cover gasket 1040 between the facing ends of the adjacent main channel covers 40. The one or more main channel cover locating lugs extend perpendicularly, outwardly from each side of the main channel cover gasket 1040, having the same arrangement as the one or more main channel cover lug recesses 1045 on the corresponding facing ends of the adjacent pairs of main channel covers 40. Preferably the one or more main channel cover locating lugs are constructed from the same unitary piece of material as the main channel cover gaskets 1040. It will be appreciated that the one or more main channel cover locating lugs may be constructed from different pieces of material and attached to the main channel cover gaskets 1040. The one or more main channel cover locating lugs, once received into the one or more main channel cover lug recesses 1045, ensure that the main channel cover gasket 1040 is held in place between the facing ends of adjacent pairs of main channel covers 40.

Referring specifically to FIG. 32, in one embodiment, each of the ducting section gaskets 1010 is generally wedge-shaped in cross-section, such that in use, the adjacent pairs of modular ducting sections 10 lying end-to-end define a bend to match the terrain the two or more modular ducting sections 10 are laid upon. It will be appreciated that the generally wedge-shaped cross-section may be in the vertical plane or horizontal plane depending on the terrain. The ducting section gasket 1010 with the generally wedge shaped cross-section in the horizontal plane, during use, produces an angle between the adjacent pairs of modular ducting sections 10 in the horizontal plane. The size of the angle depending on the gradient of the wedge shaped cross-section of the ducting section gaskets 1010 and the direction depending on which side the thickest portion of the wedge cross-section is located. This allows the adjacent pairs of modular ducting sections 10 lying end-to-end to substantially curve in accordance with the terrain in the horizontal plane. The ducting section gasket 1010 with the generally wedge shaped cross-section in the vertical plane, during use, produces an angle between the adjacent pairs of modular ducting sections 10 in the vertical plane. The size of the angle depending on the gradient of the wedge shaped cross-section of the ducting section gaskets 1010 and the direction depending on which side the thickest portion of the wedge cross-section is located. This allows the adjacent pairs of modular ducting sections 10 lying end-to-end to substantially conform to terrain that is undulated. It will be appreciated that the ducting section gaskets 1010 may have the wedge-shaped cross-section in both the vertical plane and the horizontal plane to accommodate terrain that is both undulated and curved. The use of wedge-shaped ducting section gaskets 1010 not only allows for changes in terrain in both the horizontal and vertical plane with respect to the streetscape, but also allows for heaving of the adjacent pairs of modular ducting sections 10 when lying end-to-end. Such heaving may be caused by any one of a number of reasons, for example, vibrations caused by traffic, or minor earth tremors.

In one embodiment, each of the main channel cover gaskets 1040 is generally wedge-shaped in cross-section, such that in use, the adjacent pairs of main channel covers 40 lying end-to-end define a bend. It will be appreciated that the generally wedge-shaped cross-section may be in the vertical plane or horizontal plane depending on the terrain. The main channel cover gaskets 1040 with the generally wedge shaped cross-section in the horizontal plane, during use, produces an angle between the adjacent pairs of main channel covers 10 in the horizontal plane. The size of the angle depending on the gradient of the wedge-shaped cross-section of the main channel cover gaskets 1040 and the direction depending on which side the thickest portion of the wedge cross-section is located. This allows the adjacent pairs of main channel covers 40 lying end-to-end to substantially curve in accordance with the terrain in the horizontal plane. The main channel cover gasket 1040 with the generally wedge-shaped cross-section in the vertical plane, during use, produces an angle between the adjacent pairs of main channel covers 40 in the vertical plane. The size of the angle depending on the gradient of the wedge-shaped cross-section of the main channel cover gaskets 1040 and the direction depending on which side the thickest portion of the wedge cross-section is located. This allows the adjacent pairs of main channel covers 40 lying end-to-end to substantially conform to terrain that is undulated. It will be appreciated that the main channel cover gaskets 1040 may have the wedge-shaped cross-section in both the vertical plane and the horizontal plane to accommodate terrain that is both undulated and curved.

Referring specifically to FIGS. 34 and 35, in one embodiment, the ducting system 1000 further comprises sloped corner cover gaskets 1060, a first sloped corner cover gasket being adapted for location between the first sloped corner cover 220 and a first end of the sloped channel cover 210, and a second sloped corner cover gasket being adapted for location between the second sloped corner cover 230 and a second end of the sloped channel cover 210, to substantially seal the one or more open-topped utility channels 20 in use. The sloped corner cover gaskets 1060 are substantially thin and each having the same shape as the end profile of the sloped channel covers 210, such that when the sloped corner cover gaskets 1060 are between the sloped corner covers 220, 230 and the sloped channel cover 210, the sloped corner cover gaskets 1060 do not interfere with the functionality of the one or more open-topped utility channels 20, the road water runoff flange 80 and the sloped channel cover 210. It will be appreciated that the sloped corner cover gaskets 1060 may be manufactured to any thickness as required. Preferably the sloped corner cover gaskets 1060 are manufactured from recycled polymeric materials such as for example recycled rubber tyres, sometimes referred to as re-crumb rubber. The polymer may be virgin or recycled polyethylene (PE), which may be recycled high-density polyethylene or recycled low-density polyethylene or a mixture of these recycled polymers. In this case, the sloped corner cover gaskets 1060 will be compression moulded. Furthermore, it is preferable that the sloped corner cover gasket 1060 is constructed from a piece of unitary material. It will be appreciated; however, the sloped corner cover gasket 1060 may be constructed from different pieces of material. The sloped corner cover gasket 1060 between the sloped corner covers 220, 230 and the sloped channel cover 210 ensure a good seal to prevent water and other debris from contaminating the one or more open-topped utility channels 20 of the modular ducting section 10. Furthermore, the sloped corner cover gaskets 1060 can absorb vibration or impact forces that may be felt by the sloped channel cover 210 and the sloped corner covers 220, 230, for example when the sloped channel cover 210 is used as a driveway access and a vehicle drives over it.

In one embodiment, and as shown in FIG. 34, the sloped corner cover gaskets 1060 comprise one or more sloped corner cover locating lugs 1070 on each side and the facing ends of the adjacent first sloped corner cover 220 and the sloped channel cover 210, and the facing ends of the adjacent second sloped corner cover 230 and the sloped channel cover 210, comprise one or more sloped corner cover locating lug recesses (not shown) to receive the one or more sloped corner cover locating lugs 1070 of the corresponding side of the sloped corner cover gaskets 1060 therein for positively locating the sloped corner cover gasket 1060 between the facing ends of the sloped corner covers 220, 230 and the corresponding end of the sloped channel cover 210. The one or more sloped corner cover locating lugs 1070 extend perpendicularly and outwardly from each side of the sloped corner cover gaskets 1060, and are arranged in the same arrangement as the one or more sloped corner cover locating lug recesses on the corresponding facing ends of the sloped corner covers 220, 230 and the corresponding end of the sloped channel cover 210. Preferably the one or more sloped corner cover locating lugs 1070 are constructed from the same unitary piece of material as the sloped corner cover gaskets 1060. Alternatively, the one or more sloped corner cover locating lugs 1070 may be constructed from a different material to the gasket 1060 itself and attached to the sloped corner cover gasket 1060. The one or more sloped corner cover locating lugs 1070, once received into the one or more sloped corner cover locating lug recesses ensure that the sloped corner cover gasket 1060 is held in place between the facing ends of the sloped corner covers 220, 230 and the corresponding end of the sloped channel cover 210.

In this embodiment, the opposing ends 285, 285' of each of the sloped corner covers 220, 230 are adapted to substantially align with and lie adjacent to the facing end of the main channel cover 40 of an adjacent modular ducting section 10 in the ducting system 1000 in use. The opposing ends 285, 285' having the same shape as the end profile of the main channel cover 40, to provide a smooth transition between the sloped corner covers 220, 230 and the main channel cover 40 in use. It will be appreciated that the opposing ends 285, 285' of the sloped corner covers 220, 230 comprise one or more sloped corner cover locating lug recesses (not shown) and the corresponding facing end of the adjacent main channel cover 40 comprises one or more main channel cover lug recesses 1045, such that in use, the one or more sloped corner cover locating lug recesses and the one or more main channel cover lug recesses 1045 are adapted to receive the one or more main channel cover locating lugs of the corresponding sides of the main channel cover gasket 1040 therein for positively locating the main channel cover gasket 1040 between the opposing end (285, 285') of each sloped corner cover 220, 230 and the facing end of the adjacent main channel cover 40.

Referring specifically to FIG. 36, in one embodiment, the two or more modular ducting sections 10 form a first closed ducting loop 1095. Each of the two or more modular ducting sections 10 of the ducting system 1000, are coupled at either end to one or more modular ducting sections 10, allowing the one or more open-topped utility channels 20, the open-topped catchment channel 30, the supply channel 100, and the road water runoff flange 80, to continuously loop around. It will be appreciated that the ducting system 1000 may comprise one or more closed ducting loops.

In one embodiment, at least one of the two or more modular ducting sections 10 in the first closed ducting loop 1095 is a modular ducting section 10 comprising a link region of the first embodiment of the present invention. This allows the first closed ducting loop 1095 to receive and transmit the one or more utility lines of the open-topped utility channels 20. Furthermore, it allows the first closed ducting loop 1095 to connect to other one or more closed ducting loops, to create a network of closed ducting loops. In the event that the one or more utility lines fail, the network of closed ducting loops can isolate the closed ducting loop with the utility line failure, and yet still continue to service the other closed ducting loops without causing any disruption to the utility services.

In one embodiment, the ducting system 1000 further comprises one or more subsurface modular ducting sections 1110 each comprising one or more open-topped utility link channels 1120, the one or more subsurface modular ducting sections 1110 adapted for laying end-to-end to form a series of subsurface modular ducting sections 1110, wherein a first end of the series of subsurface modular ducting sections 1110 is adapted to connect to and substantially align with the one or more apertures 470, 480 in the link region of the first closed ducting loop 1095, and a second end of the series of subsurface modular ducting sections 1110 is adapted to connect to and substantially align with the one or more apertures 470, 480 in a link region of a second closed ducting loop 1100 to form an interconnected network of closed ducting loops.

In another embodiment, the first closed ducting loop 1095 may not be a complete loop of two or more modular ducting sections 10 lying end-to-end, but may terminate at, for example, a cliff edge. In this embodiment, it will be appreciated that although the first closed ducting loop 1095 is not a complete loop with respect to the two or more modular ducting sections 10, it can still be a loop in the sense that the one or more utility lines can be carried along the series of subsurface modular ducting sections 1110 from the modular ducting section 10 having a link region at a first terminating end (not shown) of the first closed ducting loop 1095 to a modular ducting section 10 having a link region at a second terminating end (not shown), such that the one or more utility lines remain in a loop. Referring specifically to FIGS. 39 to 40, in this embodiment, the one or more open-topped utility link channels 1120 are defined by side walls, generally given the reference numeral 1130, which extend in a substantially upward direction from a base portion 1140. As shown in FIG. 32, the number of side walls 1130 in this embodiment is three; however, it will be appreciated that in other embodiments, the number of side walls 1130 may be of any number desirable for particular applications. In this embodiment, one or more open-topped utility link channels 1120 may carry any one of a number of utility lines associated with the range of services provided by one or more suppliers. For example, utilities such as gas, electricity, water, and data/telecommunications, and pay TV, can be carried in any one or more of the open-topped utility link channels 1120 from the supplier to an end user, such as a residential or commercial property. It will be appreciated that the one or more open-topped utility link channels 1120 may be of any dimension to suit a particular application. For example, each of the one or more open-topped utility link channels 1120 may be designed to carry an extension of one utility line or several extensions of the one or more utility lines. In the case where several extensions of the one or more utility lines are carried in a single open-topped utility link channel 1120, these lines may be laid at the bottom of the open-topped utility link channel 1120 or mounted to an inner wall of the open-topped utility link channel 1120 using, for example, cable mounts or brackets (not shown) such that each extension of the one or more utility lines is more easily identifiable and accessible. This will be advantageous in situations where each of a number of extensions of one or more utility lines in a single open-topped utility link channel 1120 belong to different suppliers. The height of the side walls 1130 of the subsurface modular ducting sections 1110 is also largely dependent on what depth the subsurface modular ducting sections 1110 are to be installed, to, for example, account for the camber of the road under which the one or more subsurface modular ducting sections 1110 are installed.

In this embodiment, the first end of the series of subsurface modular ducting sections 1110 is adapted to connect to the link region of the first closed ducting loop 1095, and the second end of the series of subsurface modular ducting sections 1110 is adapted to connect to the link region of the second closed ducting loop 1100.

As shown in FIGS. 43 (*i* and *ii*), in this embodiment, the one or more subsurface modular ducting sections 1110 laid end-to-end in the series of subsurface modular ducting sections 1110 are at a depth that is substantially level with the link region of the modular ducting section 10 of the first closed ducting loop 1095, such that in use, the one or more apertures 470, 480 of the link region and the one or more open-topped utility link channels 1120 of the series of subsurface modular ducting sections 1110 are substantially aligned to enable the one or more utility lines in the first closed ducting loop 1095 to be passed through the one or more apertures 470, 480 in the link region as extensions of the one or more utility lines and carried in the one or more open-topped utility link channels 1120 of the series of subsurface modular ducting sections 1110 to the link region of the second closed ducting loop 1100, where the extensions of the one or more utility lines can be passed from the one or more open-topped utility link channels 1120 through the one or more apertures 470, 480 in the link region of the second closed ducting loop 1100 as one or more utility lines and carried in the one or more open-topped utility channels 20 of the two or more modular ducting sections 10 of the second closed ducting loop 1100.

In the case where the one or more subsurface modular ducting sections 1110 are required to be installed at a depth that would mean that the one or more open-topped utility link channels 1120 and the corresponding one or more apertures 470, 480 in the link region of a modular ducting section 10 as described above would not be substantially aligned, it would be appreciated that the link region or the one or more subsurface modular ducting sections 1110 may be adapted to account for the change in depth.

Alternatively, the one or more utility lines are carried from one closed ducting loop 1095 to the second closed ducting loop 1100 via the corresponding link regions.

In this embodiment, and as shown in FIG. 38, the one or more subsurface modular ducting sections 1110 lying end-to-end are also adapted to be used as subsurface trunk feed channels 1101 for providing the one or more utility lines from the one or more suppliers to the first closed ducting loop 1095 via the link region.

In this embodiment, it will be appreciated that the one or more subsurface modular ducting sections 1110 are removably coupled to each other via one or more subsurface joining members (not shown) to prevent the one or more subsurface modular ducting sections 1110 from moving apart and to thus keep the one or more open-topped utility link channels 1120 substantially aligned. This will be beneficial to prevent the one or more utility lines as extensions of the one or more utility lines in the open-topped utility link channels 1120 from becoming trapped between, for example, facing ends of adjacent pairs of subsurface modular ducting sections 1110. It will also be appreciated that the first end of the series of subsurface modular ducting sections 1110 is connected to the link region of the first closed ducting loop 1095 via one or more subsurface joining members, and the second end of the series of subsurface modular ducting sections 1110 is connected to the link region of the second closed ducting loop 1100 via one or more subsurface joining members. This will be beneficial to prevent the one or more utility lines as extensions of the one or more utility lines from becoming trapped between the first end of the series of subsurface modular ducting sections 1110 and the link region of the first closed ducting loop 1095, or between the second end of the series of subsurface modular ducting sections 1110 and the link region of the second closed ducting loop 1100. It will be appreciated that the one or more subsurface joining members may take the form of any suitable joining member to enable a robust connection between each of the one or more subsurface modular ducting sections 1110, or between the first end of the series of subsurface modular ducting sections 1110 and the link region of the first closed ducting loop 1095, and between the second end of the series of subsurface modular ducting sections 1110 and the link region of the second closed ducting loop 1100.

In this embodiment, it will be appreciated that subsurface ducting section gaskets (not shown) can be located between facing ends of adjacent pairs of subsurface modular ducting sections 1110 to ensure that a good seal is formed between the adjacent pairs of subsurface modular ducting sections 1110 to prevent them from becoming displaced or misaligned causing, for example, the substantially aligned open-topped utility link channels 1120 of the adjacent pairs of subsurface modular ducting sections 1110 to be displaced. Additionally, the use of subsurface ducting section gaskets can prevent the facing ends of the adjacent pairs of subsurface modular ducting sections 1110 from becoming damaged due to wear caused by the two facing ends rubbing against one another. It will also be appreciated that the subsurface ducting section gaskets may comprise one or more subsurface ducting section locating lugs (not shown) on each side and the facing ends of the adjacent pairs of subsurface modular ducting sections 1110 may comprise one or more subsurface ducting section recesses 115 to receive the one or more subsurface ducting section locating lugs of the corresponding side of one of the subsurface ducting section gaskets therein for positively locating the subsurface ducting section gasket between the facing ends of the adjacent pairs of subsurface modular ducting sections 1110. In accordance with the one or more ducting section locating lugs 1020 described above, it will be appreciated that the one or more subsurface ducting section locating lugs will extend perpendicularly, and outwardly from each side of the subsurface ducting section gasket, having the same arrangement as the one or more subsurface ducting section recesses 115 on the corresponding facing ends of the adjacent pairs of subsurface modular ducting sections 1110. The one or more subsurface ducting section locating lugs, once received into the one or more subsurface ducting section recesses 115, ensure that the subsurface ducting section gasket is held in place between the facing ends of the adjacent pairs of subsurface modular ducting sections 1110 in use.

It will also be appreciated that in this embodiment, subsurface ducting section gaskets can be located between the first end of the series of subsurface modular ducting sections 1110 and the link region of the first closed ducting loop 1095, and between the second end of the series of subsurface modular ducting sections 1110 and the link region of the second closed ducting loop 1100 to prevent them from becoming displaced or misaligned.

In one embodiment, and as shown in FIGS. 41 and 42, the ducting system 1000 further comprises a subsurface channel cover 1150 being adapted to removably engage an upper portion of the side wall 1130 of each of the one or more open-topped utility link channels 1120 of the subsurface modular ducting section 1110 to substantially seal the one or more open-topped utility link channels 1120 in use. As shown in FIGS. 41 and 42, when engaged on the upper portion of the side walls 1130 of the open-topped utility link channels 1120, the one or more open-topped utility link channels 1120 are effectively isolated from one another. This is particularly beneficial from a safety aspect where the extensions of the one or more utility lines in the open-topped utility link channels 1120 are carrying, for example, gas and electricity or water and electricity, such that these utilities need to be isolated from one another. The subsurface channel cover 1150 being removably engageable with the upper portion of the side walls 1130 of the open-topped utility link channels 1120 enables, for example, a service engineer to be able to access the extensions of the one or more utility lines in the open-topped utility link channels 1120 in the case where maintenance or repair is required, or when a new extension utility link line or utility service is to be introduced. As shown in FIGS. 43 (*i* and *ii*), it will be appreciated that as the subsurface modular ducting sections 1110 are designed to be installed below the surface of the road, access to the one or more open-topped utility channels 20 is only possible where the road surface above the subsurface modular ducting sections 1110 lying end-to-end across the road is removed.

Referring specifically to FIG. 41(ii), an underside of the subsurface channel cover 1150 comprises one or more subsurface channel cover recesses 1160 adapted to engage with the upper portion of each of the side walls 1130 of the one or more open-topped utility link channels 1120 of the subsurface modular ducting section 1110 in use. The one or more subsurface channel cover recesses 1160 serve the purpose of enabling the subsurface channel cover 1150 to be returned to its correct location on the corresponding subsurface modular ducting section 1110 if it has been removed for a particular reason, for example, maintenance or repair, or to introduce a new extension of the utility line or utility service. As shown in FIG. 41, it will be appreciated that the one or more subsurface channel cover recesses 1160 will be of a sufficient depth to provide a firm and secure fitting on the upper portion of the side walls 1130 of the one or more open-topped utility link channels 1120.

In another embodiment, the one or more subsurface modular ducting sections 1110 further comprise one or more subsurface channel seal members (not shown) adapted for location between the upper portion of the side walls 1130 of each of the one or more open-topped utility link channels 1120 and the corresponding one or more main subsurface channel cover recesses 1160 on the underside of the subsurface channel cover 1150 in use. The one or more subsurface channel seal members ensure that a watertight seal is formed between the subsurface channel covers 1150 and the upper portion of the side walls 1130 of the one or more open-topped utility link channels 1120. This is beneficial for preventing ground water or debris from entering the open-topped utility link channels 1120. The one or more subsurface channel seal members may be manufactured from any suitable material for providing a watertight seal and absorbing vibrations. Preferably, the one or more subsurface channel seal members are manufactured from an elastomer, and more preferably a flexible and resilient rubber including, but not limited to any one of the following: natural rubber, urethane, neoprene, nitrile rubber, silicone rubber.

In this embodiment, it will be appreciated that subsurface channel cover gaskets (not shown) can be located between facing ends of adjacent pairs of subsurface channel covers 1150 to ensure a good seal is formed between the adjacent pairs of subsurface channel covers 1150 to prevent them from becoming displaced or misaligned. It will also be appreciated that the subsurface channel cover gaskets may comprise one or more subsurface channel cover locating lugs (not shown) on each side and the facing ends of the adjacent pairs of subsurface channel covers 1150 may comprise one or more subsurface channel cover lug recesses 1155 to receive the one or more subsurface channel cover locating lugs of the corresponding side of one of the subsurface channel cover gaskets therein for positively locating the subsurface channel cover gasket between the facing ends of the adjacent pairs of subsurface channel covers 1150. In accordance with the one or more ducting section locating lugs 1020 described above, it will be appreciated that the one or more subsurface channel cover locating lugs will extend perpendicularly, and outwardly from each side of the subsurface channel cover gasket, having the same arrangement as the one or more subsurface channel cover lug recesses 1155 on the corresponding facing ends of the adjacent pairs of subsurface channel covers 1150. The one or more subsurface channel cover locating lugs, once received into the one or more subsurface channel cover lug recesses 1155, ensure that the subsurface channel cover gasket is held in place between the facing ends of the adjacent pairs of subsurface channel covers 1150 in use.

In one embodiment, and as shown in FIG. 42, the ducting system 1000 further comprises a utility access box 1170 having a base portion 1180 and two pairs of opposing end walls 1190 extending upwardly from the base portion 1180, wherein the utility access box 1170 is adapted for location between facing ends of an adjacent pair of subsurface modular ducting sections 1110 in the series of subsurface modular ducting sections 1110, the utility access box 1170 comprising one or more open-topped utility access channels 1200, such that in use, the one or more open-topped utility access channels 1200 of the utility access box 1170 and the one or more open-topped utility link channels 1120 of the adjacent pair of subsurface modular ducting sections 1110 are substantially aligned. The one or more open-topped utility access channels 1200 are defined by one or more side walls 1210 extending upwardly from the base portion 1180 of the utility access box 1170. In this embodiment, the one or more open-topped utility access channels 1200 pass substantially through the utility access box 1170 such that one or more apertures 1220, 1230 are located in the one pair of the two pairs of opposing end walls 1190 of the utility access box 1170. When the utility access box 1170 is located between the facing ends of the adjacent pair of subsurface modular ducting sections 1110 in the series of subsurface modular ducting sections 1110, the extensions of the one or more utility lines pass from the one or more open-topped utility link channels 1120 in the first of the adjacent pair of subsurface modular ducting sections 1110 to the one or more open-topped utility link channels 1120 in the second of the adjacent pair of subsurface modular ducting sections 1110 via the corresponding one or more open-topped utility access channels 1200 in the utility access box 1170.

In one embodiment, and as shown in FIG. 42, the ducting system 1000 further comprises a utility access cover 1240 being adapted to removably engage with an upper portion of the side walls 1210 of each of the one or more open-topped utility access channels 1200. In this embodiment, each of the two pairs of opposing end walls 1190 of the utility access box 1170 comprise a ledge, generally given the reference numeral 1250, located on an inner surface of each end wall 1190, wherein each ledge 1250 is substantially level with an upper portion of the one or more side walls 1210, such that in use, the utility access cover 1240 is adapted to substantially abut each of the ledges 1250 and the upper portion of the side walls 1210 to substantially seal the utility access box 1170.

As shown in FIGS. 43 (i and ii), the utility access box 1170 is designed to be installed in the road such that an upper portion of the two pairs of opposing end walls 1190 is substantially level with the general level of the road surface. This is beneficial as the subsurface modular ducting sections 1110 being designed to be installed below the surface of the road, such that access to the one or more open-topped utility channels 20 is only possible where the road surface above the subsurface modular ducting sections 1110 lying end-to-end across the road is removed, the utility access box 1170 having upper portions of the two pairs of opposing end walls 1190 being substantially level with the general level of the road surface provides an access point to the one or more open-topped utility access channels 1200 without needing to dig up the corresponding portion of road.

In this embodiment, the one or more utility lines carried in the one or more open-topped utility channels 20 of the two or more modular ducting sections 10 in the closed ducting loops of the interconnected network of closed ducting loops are adapted to supply to an end user any one of the following types of utility service: (i) power; (ii) gas; (iii) water; and (iv) data/telecommunications. Referring specifically to FIG. 38(ii), the one or more utility lines, given the general reference numeral 1105, are shown as being fed from the trunk feed 1101 and looped around a small section of the closed ducting loop 1095 shown in FIG. 36. In this embodiment, the supply and control of the one or more utility supplies from the corresponding utility suppliers can be managed at a network management and control centre (not shown) before being fed from the trunk feed 1101 to the interconnected network of closed ducting loops. It will be appreciated that the network management and control centre will be able to monitor how the one or more utility supplies are being implemented across the interconnected network. The network management and control centre will be able to control how much of a utility service is being provided to a particular location of one or more of the closed ducting loops and adjust the amount of the utility service accordingly. For example, in the case of a fire at a particular location within the interconnected network of closed ducting loops, the network management and control centre can ensure that sufficient water is available at that location to douse the fire. This could be achieved by simply increasing the water pressure at the trunk feed 1101, or by reducing the water pressure at specific locations around the interconnected network of closed ducting loops such that more water is directed to the location that needs it. To achieve this, it will be appreciated that the network management and control centre can remotely control the water isolation valves 340 in the various service distribution boxes 300 located around the interconnected network of closed ducting loops. In another example, if one of the one more utility lines at a particular location in the interconnected network of closed ducting loops becomes ruptured, for example a utility line 1105 carrying gas, then the network management and control centre will be able to remotely isolate the leak by closing off the corresponding gas isolation valves 335 at that particular location. In another example, the network management and control centre will be able to remotely control traffic lights in the case of emergency, such that roads from the emergency services to the affected location can be left open to allow the emergency services to reach the affected location more quickly.

As shown in FIGS. 38(ii) and 44, the one or more utility lines 1105 carried in the one or more utility channels 20 of the two or more modular ducting sections 10 in the interconnected network of closed ducting loops are shown without the two or more modular ducting sections 10 of the interconnected network of closed ducting loops in place. The service distribution box 300, as described in the first embodiment of the present invention, provides an access point to, for example, distribute, monitor or isolate, the various utility services being carried by the one or more utility lines 1105 in the modular ducting sections 10 lying end to end, or as described above, can be remotely accessed by the network management and control centre to distribute, monitor or isolate, the various utility services. Referring specifically to FIG. 44 (ii), the extensions, given the general reference numeral 1108, of the one or more utility lines 1105 are connected to the one or more utility distribution boards 345 of the service distribution box 300. The one or more utility service distribution boards 345 distribute the corresponding utility service into one or more distribution lines 1109 which are bundled together and fed to the supply line 130 of the modular ducting section 10 comprising the service distribution box 300 via the service ports 310, 320, for distribution to the one or more end users.

For data/telecommunications, the one or more utility lines 1105 adapted to supply the data/telecommunications utility service include any one of the following types of utility lines 1105: (i) copper cable; (ii) optical fibre cable; (iii) coaxial cable or an unenclosed light beam. For residential or commercial property end users, these types of utility lines 1105 can be used for such utility services as cable/pay TV; networked services (internet, voice, VPN, home control systems (video, security, monitoring and activation)). For public service end users, these types of utility lines 1105 can be used to provide power and data communication to control, for example, traffic lights and traffic cameras mounted in the vicinity of the traffic lights to visually see the traffic situation remotely.

In this embodiment, and as shown in FIGS. 36 and 44 (i), the interconnected network of closed ducting loops comprises a water storage tank 1106 for receiving overflow catchment water from the open-topped catchment channel 30 of one of the two or more modular ducting sections 10 comprising a catchment channel drainage aperture 400 located in the bottom portion of the open-topped catchment channel 30, as described in the first embodiment of the present invention. As shown in FIG. 44(i), and referring specifically to the second closed ducting loop 1100 as an example, there is shown the catchment channel drainage pipe as described in the first embodiment of the present invention, and given the general reference numeral 1107 hereafter, which has one end engaged with the catchment channel drainage aperture 400 of one of the two or more modular ducting sections 10 of the second closed ducting loop 1100, and another end engaged with the water storage tank 1106 such that in use, water is liquidly communicated from the open-topped catchment channel 30 of the one of the two or more modular ducting sections 10 of the second closed ducting loop 1100 to the water storage tank 1106 via the catchment channel drainage pipe 1107 under gravity flow.

The ducting system provides a number of advantages, including:

1. The two or more modular ducting sections are coupled together to prevent them from moving apart and to thus keep the one or more open-topped utility channels, open-topped catchment channel, and supply channel of the two or more modular ducting sections substantially aligned. This will be beneficial to prevent the one or more utility lines in the open-topped utility channels from becoming trapped between, for example, adjacent pairs of modular ducting sections or severed as a result of undesirable movement of the modular ducting sections. This will also be beneficial to prevent the substantially aligned open-topped catchment channels of the two or more modular ducting sections from becoming displaced from one another causing water to leak out of the open-topped catchment channel.
2. The ducting section gaskets ensure a good seal is formed between the adjacent pairs of modular ducting sections to prevent the substantially aligned open-topped catchment channels of the two or more modular ducting sections from becoming displaced from one another causing water to leak out of the open-topped catchment channel.
3. Any movement of the two or more modular ducting sections caused by, for example, heavy machinery, or traffic, can be absorbed by the ducting section gaskets to prevent the adjacent pairs of modular ducting sections from becoming displaced or misaligned.
4. The ducting section gaskets prevent the facing ends of the adjacent pairs of modular ducting sections from becoming damaged due to wear caused by the two facing ends of the adjacent pair of modular ducting sections rubbing against one another.
5. The ducting section gaskets reduce undesirable cracking of any of the two or more modular ducting sections by allowing for thermal expansion of the modular ducting sections. This is particularly beneficial in environments prone to high temperatures.
6. The one or more ducting section locating lugs ensure that the ducting section gasket is held in place between the facing ends of adjacent pairs of modular ducting sections.
7. The main channel cover gaskets between adjacent pairs of main channel covers ensure a good seal is formed between the main channel covers to prevent water and other debris from contaminating the one or more open-topped utility channels of the two or more modular ducting sections.
8. The one or more main channel cover locating lugs ensure that the main channel cover gasket is held in place between the facing ends of adjacent pairs of main channel covers.
9. The ducting section gaskets can be purposely designed and moulded to fit between adjacent pairs of modular ducting sections such that the adjacent pairs of modular ducting sections lying end-to-end conform to the geography of the terrain or streetscape layout.
10. Where the terrain is undulating, the ducting section gaskets being wedge-shaped can be located between adjacent pairs of modular ducting sections in a substantially upward or downward configuration depending on the geography of the terrain that is required to be replicated.
11. Where the streetscape layout comprises a step or stairs arrangement, the adjacent pairs of modular ducting sections lying end-to-end can be located along the side of the stairs and arranged so that they follow the general slope of the stairs. In this case, the ducting section gaskets will again be shaped in the form of a wedge and located between the adjacent pairs of modular ducting sections in a substantially upward or downward configuration depending on the slope of the stairs that is required to be replicated. This will be beneficial to, for example, cyclists, who can use the modular ducting sections lying end-to-end as a ramp for pushing the cycle up or down the stairs.

12. Where the streetscape layout comprises one or more curves, the one or more ducting section gaskets can again be shaped into a wedge, but this time oriented such that the widest portion of the wedge is closest to the catchment channel or the road water runoff flange depending on the direction of the curve that is required to replicate the streetscape layout.
13. The one or more main channel cover gaskets can be purposely designed and moulded to fit within the two or more main channel covers to match the geography of the terrain or streetscape layout,
14. Where the terrain is undulating, the one or more main channel cover gaskets can be shaped in the form of a wedge which can be located between two main channel covers in a substantially upward or downward configuration depending on the geography of the terrain that is required to be replicated.
15. Where the streetscape layout comprises one or more curves, the one or more main channel cover gaskets can again be shaped in a wedge, but this time oriented such that the widest portion of the wedge is closest to the catchment channel or the road water runoff flange depending on the direction of the curve that is required to replicate the streetscape layout.
16. The gaskets will allow for minor movement in the ducting system and root lifting without compromising on the watertight integrity of the open-topped catchment channel.
17. The at least one link region in the first closed ducting loop provides a means to connect the first closed ducting loop to a second closed ducting via the link region in the second closed ducting loop.
18. When the subsurface channel cover is in place, the one or more open-topped utility link channels are effectively isolated from one another.
19. The subsurface channel cover can be removed to enable, for example, a service engineer to access the open-topped utility link channels in the case where maintenance or repair is required, or when a new utility line or utility service is to be introduced.
20. The one or more subsurface channel cover recesses enable the subsurface channel cover to be returned to its correct location on the corresponding subsurface modular ducting section if it has been removed for a particular reason, for example, maintenance or repair, or when a new utility line or utility service is to be introduced.
21. When the utility access box is installed, the upper portions of the two pairs of opposing end walls of the utility access box are substantially level with the general level of the road surface thus providing an access point to the one or more utility access channels without needing to dig up the corresponding portion of road.
22. The ducting system for carrying one or more utility lines can be introduced as kerbside architecture to provide an alternative utility access system to compete with existing infrastructure. This is beneficial as it increases competition among utility service providers and reduces cost to end users.
23. The ducting system can be introduced into established areas, for example, residential or commercial areas, retrospectively. The ducting system enables power transmission lines and or data/telecommunication lines to be carried below street level. This is beneficial as it the poles used to carry these lines above ground, can be removed from street level, improving convenience for pedestrians, enhancing the overall aesthetics of the street, and reducing the number of accidents between vehicles and poles.
24. Power transmission lines carried by poles or pylons have poor transmission due to the large size of the cables used. Smaller cables carried below street level will have better transmission, thereby increasing efficiency and reducing carbon emissions.
25. Placing power transmission lines below street level means that the weight of the cables is not an issue, such that a greater amount of shielding can be used.
26. The ducting system as a new kerbside architecture can be employed as a cycle track, increasing safety for the cyclist, while improving overall traffic flow.
27. The ducting system provides a stable and level footpath.
28. The ducting system provides a convenient access point to introduce a broadband network, giving multiple suppliers the opportunity to enter the market at a lower cost rather than having to rely on leasing existing ducting owned by other suppliers.
29. The ducting system provides a platform to introduce new infrastructure rather than trying to upgrade existing and often poor performing systems. This is beneficial in situations where for example, intelligent lighting smart metering, water recycling systems and other advanced systems can be introduced.
30. The co-location of utility services such as power, data transmission, gas, and water allows for low-cost installation and delivery of the utility services to end users.
31. The co-location of utility services also provides for a more efficient and environmentally sound solution to the provision of public services. For example, the ducting system allows for such services as street lighting, traffic lights, information display panels, and bus shelters, to be powered and controlled intelligently via the networked utility services.
32. The ducting system provides power supply ports for charging electric vehicles. This is beneficial as it enables end users, particularly those without their own garage, a convenient means to charge their vehicle.
33. The power supply ports can be located precisely where they are needed without impeding pedestrian use of any associated footpaths.
34. The power supply ports can be linked to a data control system to monitor and charge the end user for the amount of power used to charge the vehicle.
35. By implementing, power supply ports into the streetscape could be used to drive the standardisation of power supply plugs and sockets in the car industry.
36. The ducting system allows for the separation and storage of catchment water free from contaminants associated with those present in road water runoff. This is beneficial as the catchment water can be used for general purposes such as watering gardens, washing cars.
37. The catchment channel water will require minimal purification such that it can be used as a source of potable water for human consumption.
38. The ducting system can be leased to utility service suppliers which will generate revenue that can be used to develop the system further.
39. The end user supply channel part of the ducting system can be owned by a third party and license out to utility service suppliers.
40. The ducting system capacity provides for new service growth.

41. The installation of the ducting system at the kerb not only leverages the space coincident with the kerb, but by doing so, it effectively bypasses or avoids existing utility access systems, thereby providing a unique opportunity for cost effective installation of utility services in direct competition with the existing utility access systems.
42. The ducting system provides an economy of scale whereby the application of this system to a wide range of existing utility services and future utility services results in cost advantages due to possible expansion.
43. The ducting system is able to provide a conduit for most utilities that are required in a typical residential or commercial setting.
44. The ducting system is able to house any type of data/telecommunication line and also facilitate a relatively simple and economical roll-out.

INTERPRETATION

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the utility distribution and access and water capture industries.

The claims defining the invention are as follows:

1. A modular ducting section adapted for laying end-to-end, comprising:
    a base portion;
    two or more side walls extending upwardly from the base portion, the base portion and the two or more side walls defining one or more open-topped utility channels adapted for carrying one or more utility lines;
    an open-topped catchment channel adapted for carrying water, wherein said open-topped catchment channel is not in liquid communication with the one or more open-topped utility channels, wherein the open-topped catchment channel is defined by a catchment channel wall extending outwardly and then upwardly from a side wall of one of the one or more open-topped utility channels and a supply channel is defined by the base portion, the side wall and an underside of the catchment channel wall.

2. A modular ducting section as claimed in claim 1, further comprising a road water runoff flange extending outwardly from a side wall of one of the one or more open-topped utility channels furthest from the open-topped catchment channel.

3. A modular ducting section as claimed in claim 2, wherein the road water runoff flange is a sloped road water runoff flange and wherein at least a portion of an upper surface of the sloped runoff water flange is substantially sloped downwards in a direction toward the side wall of the open-topped utility channel furthest from the open-topped catchment channel.

4. A modular ducting section as claimed in claim 1, further comprising a main channel cover being adapted to removably engage an upper portion of the side walls of each of the one or more open-topped utility channels to substantially seal the one or more open-topped utility channels in use.

5. A modular ducting section as claimed in claim 1, further comprising one or more catchment channel covers being adapted to removably engage an upper portion of the catchment channel wall and an upper portion of the side wall of the open-topped utility channel from which the catchment channel wall extends, wherein each of the upper portion of the catchment channel wall and the upper portion of the side wall of the open-topped utility channel from which the catchment channel wall extends, are adapted to receive respective bottom edges of the one or more catchment channel covers to substantially seal the open-topped catchment channel in use.

6. A modular ducting section as claimed in claim 4, wherein the main channel cover comprises a channel cover side region defining at least one of the following:
  a kerb and a pathway in use:
  a kerb and a pathway formed as a ramp or driveway for vehicles to transition to or from an access driveway to a road in use; and
  a kerb and a pathway formed as a wheelchair transition point between the kerb and/or the pathway to a road in use.

7. A modular ducting section as claimed in claim 1 being pre-cast and made from concrete, a polymeric material or a resin.

8. A modular ducting section as claimed in claim 7, wherein the concrete, the polymeric material or the resin is reinforced by one or more of the following reinforcing means:
  reinforcing bars;
  reinforcing grids; or
  reinforcing fibres.

9. A modular ducting section as claimed in claim 6, wherein an underside of the main channel cover comprises one or more main channel cover recesses adapted to engage with the upper portion of the side walls of each of the one or more open-topped utility channels in use.

10. A modular ducting section as claimed in claim 9, further comprising one or more channel seal members adapted for location between the upper portion of the side walls of each of the one or more open-topped utility channels and the corresponding one or more main channel cover recesses on the underside of the main channel cover in use.

11. A modular ducting section as claimed in claim 4, wherein the main channel cover comprises a power supply port in power communication with a power utility line carried in one of the one or more open-topped utility channels and adapted to receive a power plug in use.

12. A modular ducting section as claimed in claim 4, wherein an upper surface of the main channel cover comprises one or more guide protrusions for guiding a sight challenged person in use.

13. A modular ducting section as claimed in claim 4, wherein the main channel cover is a sloped channel cover and wherein at least a portion of an upper surface of the sloped channel cover is substantially sloped downwards in a direction away from the open-topped catchment channel.

14. A modular ducting section as claimed in claim 1, wherein at least one of the one or more open-topped utility channels comprises an electromagnetic shield lining to shield the one or more utility lines carried therein in use.

15. A modular ducting section as claimed in claim 14, wherein the electromagnetic shield lining is a conductive material lining.

16. A modular ducting section as claimed in claim 1, wherein at least a portion of the modular ducting section is substantially curved in profile when viewed from above.

17. A modular ducting section as claimed in claim 4, wherein at least a portion of the main channel cover is substantially curved in profile when viewed from above.

18. A modular ducting section as claimed in claim 5, wherein at least a portion of the one or more catchment channel covers is substantially curved in profile when viewed from above.

19. A modular ducting section as claimed in claim 1, wherein at least a portion of the modular ducting section is substantially curved in profile when viewed from the side.

20. A modular ducting section as claimed in claim 4, wherein at least a portion of the main channel cover is substantially curved in profile when viewed from the side.

21. A modular ducting section as claimed in claim 5, wherein at least a portion of the one or more catchment channel covers is substantially curved in profile when viewed from the side.

22. A modular ducting section as claimed in claim 7, further comprising a service distribution box adjacent to the open-topped catchment channel, wherein the base portion comprises one or more service channels extending from the one or more open-topped utility channels to the service distribution box, an extension of each of the one or more utility lines passing from the one or more open-topped utility channels into the service distribution box via the one or more service channels in use.

23. A modular ducting section as claimed in claim 22, wherein the service distribution box comprises one or more service ports.

24. A modular ducting section as claimed in claim 3, wherein the sloped road water runoff flange is adapted to receive a storm water grate of a storm water drain, and wherein at least a portion of the upper surface of the sloped runoff water flange is substantially sloped downwards in a direction toward the storm water grate.

25. A modular ducting section as claimed in claim 24, further comprising a catchment channel overflow aperture located in the catchment channel wall and a catchment channel overflow pipe having one end engaged with the catchment channel overflow aperture for draining water from the open-topped catchment channel to the storm water drain in use.

26. A modular ducting section as claimed in claim 25, further comprising a utility channel drainage aperture located in a bottom portion of at least one of the one or more open-topped utility channels and a utility channel drainage pipe having one end engaged with the utility channel drainage aperture for draining water from the at least one of the one or more open-topped utility channels to the storm water drain in use.

27. A modular ducting section as claimed in claim 1, further comprising a catchment channel drainage aperture located in a bottom portion of the open-topped catchment channel and a catchment channel drainage pipe having one end engaged with the catchment channel drainage aperture for draining water from the open-topped catchment channel in use.

28. A modular ducting section as claimed in claim 1, further comprising a link region, wherein the base portion comprises one or more link channels extending from the one or more open-topped utility channels in the link region and terminating in one or more apertures in the side wall of the open-topped utility channel from which the road water runoff flange extends outwardly from, an extension of each of the one or more utility lines passing from the one or more open-topped utility channels to the one or more apertures via the one or more link channels in use.

29. A modular ducting section as claimed in claim 1, wherein the one or more open-topped utility channels are two or more open-topped utility channels.

30. A ducting system comprising two or more modular ducting sections of claim 1 lying end-to-end, wherein the corresponding one or more open-topped utility channels, the open-topped catchment channel, and the supply channel, of the two or more modular ducting sections are substantially aligned.

31. A ducting system as claimed in claim 30, wherein the two or more modular ducting sections are removably coupled to each other via one or more joining members.

32. A ducting system as claimed in claim 30, further comprising ducting section gaskets being adapted for location between facing ends of adjacent pairs of modular ducting sections.

33. A ducting system as claimed in claim 32, wherein the ducting section gaskets comprise one or more ducting section locating lugs on each side and the facing ends of the adjacent pairs of modular ducting sections each comprise one or more ducting section recesses to receive the one or more ducting section locating lugs of the corresponding side of one of the ducting section gaskets therein for positively locating the ducting section gasket between the facing ends of the adjacent pairs of modular ducting sections.

34. A ducting system as claimed in claim 30, further comprising main channel cover gaskets adapted for location between facing ends of adjacent pairs of main channel covers.

35. A ducting system as claimed in claim 34, wherein each of the main channel cover gaskets comprises one or more main channel cover locating lugs on each side and the facing ends of the adjacent pairs of main channel covers each comprise one or more main channel cover lug recesses to receive the one or more main channel cover locating lugs of the corresponding side of one of the main channel cover gaskets therein for positively locating the main channel cover gasket between the facing ends of the adjacent pairs of main channel covers.

36. A ducting system as claimed in claim 33, wherein each of the ducting section gaskets is generally wedge-shaped in cross-section, such that in use, the adjacent pairs of modular ducting sections lying end-to-end define bends.

37. A ducting system as claimed in claim 35, wherein each of the main channel cover gaskets is generally wedge-shaped in cross-section, such that in use, the adjacent pairs of main channel covers lying end-to-end define bends.

38. A ducting system as claimed in claim 30, wherein the two or more modular ducting sections form a first closed ducting loop.

39. A ducting system as claimed in claim 38, wherein the two or more modular ducting sections in the first closed ducting loop each comprise a road water runoff flange extending outwardly from a side wall of one of the one or more open-topped utility channels furthest from the open-topped catchment channel, and wherein at least one of the two or more modular ducting sections is a modular ducting section comprising a link region, wherein the base portion comprises one or more link channels extending from the one or more open-topped utility channels in the link region and terminating in one or more apertures in the side wall of the open-topped utility channel from which the road water runoff flange extends outwardly from, an extension of each of the one or more utility lines passing from the one or more open-topped utility channels to the one or more apertures via the one or more link channels in use.

40. A ducting system as claimed in claim 39, further comprising one or more subsurface modular ducting sections each comprising one or more open-topped utility link channels, the one or more subsurface modular ducting sections adapted for laying end-to-end to form a series of subsurface modular ducting sections, wherein a first end of the series of subsurface modular ducting sections is adapted to connect to and substantially align with the one or more apertures in the link region of the first closed ducting loop, and a second end of the series of subsurface modular ducting sections is adapted to connect to and substantially align with the one or more apertures in a link region of a second closed ducting loop to form an interconnected network of closed ducting loops.

41. A ducting system as claimed in claim 40, further comprising a subsurface channel cover being adapted to removably engage an upper portion of a side wall of each of the one or more open-topped utility link channels of the subsurface modular ducting section to substantially seal the one or more open-topped utility link channels in use.

42. A ducting system as claimed in claim 41, wherein an underside of the subsurface channel cover comprises one or more subsurface channel cover recesses adapted to engage with an upper portion of each of the side walls of the one or more open-topped utility link channels of the subsurface modular ducting section in use.

43. A ducting system as claimed in claim 42, further comprising a utility access box having a base portion and two pairs of opposing end walls extending upwardly from the base portion, wherein the utility access box is adapted for location between facing ends of an adjacent pair of subsurface modular ducting sections in the series of subsurface modular ducting sections, the utility access box comprising one or more open-topped utility access channels, such that in use, the one or more open-topped utility access channels of the utility access box and the one or more open-topped utility link channels of the adjacent pair of subsurface modular ducting sections are substantially aligned.

44. A ducting system as claimed in claim 43, further comprising a utility access cover being adapted to removably engage with an upper portion of the side walls of each of the one or more open-topped utility access channels.

45. A ducting system as claimed in claim 44, wherein the one or more utility lines carried in the one or more open-topped utility channels of the two or more modular ducting sections in the closed ducting loops of the interconnected network of closed ducting loops are adapted to supply to an end user any one of the following types of utility service:

(i) power;
(ii) gas;
(iii) water; and
(iv) data/telecommunications.

46. A ducting system as claimed in claim 45, wherein the one or more utility lines adapted to supply the data/telecommunications utility service include any one of the following types of utility lines:
(i) copper cable;
(ii) optical fibre cable; or
(iii) coaxial cable.

47. A water ducting as claimed in claim 30, wherein water within the substantially aligned open-topped catchment channels of the two or more modular ducting sections lying end-to-end in use is isolated from water captured from the substantially aligned road water runoff flanges of the two or more modular ducting sections in use.

* * * * *